United States Patent
Dong et al.

(10) Patent No.: US 11,949,507 B2
(45) Date of Patent: Apr. 2, 2024

(54) DATA SENDING METHOD AND APPARATUS

(71) Applicant: HUAWEI TECHNOLOGIES CO., LTD., Guangdong (CN)

(72) Inventors: Pengpeng Dong, Shanghai (CN); Yuanjie Li, Shanghai (CN); Shengyue Dou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 561 days.

(21) Appl. No.: 17/157,109

(22) Filed: Jan. 25, 2021

(65) Prior Publication Data

US 2021/0143939 A1    May 13, 2021

Related U.S. Application Data

(63) Continuation of application No. PCT/CN2019/089803, filed on Jun. 3, 2019.

(30) Foreign Application Priority Data

Jul. 26, 2018    (CN) .......................... 201810837621.3

(51) Int. Cl.
*H04L 1/00*     (2006.01)
*H04L 1/18*     (2023.01)
*H04L 1/1867*   (2023.01)

(52) U.S. Cl.
CPC .......... *H04L 1/0069* (2013.01); *H04L 1/1896* (2013.01)

(58) Field of Classification Search
CPC . H04L 27/2627; H04L 5/0035; H04L 5/0048; H04L 1/1896; H04L 5/0044; H04W 72/04
See application file for complete search history.

(56) References Cited

U.S. PATENT DOCUMENTS

| | | | |
|---|---|---|---|
| 9,240,807 B2* | 1/2016 | Oketani | H03M 13/6525 |
| 2012/0014242 A1* | 1/2012 | Kim | H04W 72/04 |
| | | | 370/203 |
| 2012/0039234 A1 | 2/2012 | Hoshino et al. | |

(Continued)

FOREIGN PATENT DOCUMENTS

| | | |
|---|---|---|
| CN | 101686549 A | 3/2010 |
| CN | 101803442 A | 8/2010 |

(Continued)

OTHER PUBLICATIONS

3GPP TSG RAN WG1 Meeting #88bis, R1-1707837, Multi-TRP and Multi-panel transmission, MediaTek Inc, Hangzhou, China, May 15-19, 2017, total 4 pages.

(Continued)

*Primary Examiner* — Yee F Lam
(74) *Attorney, Agent, or Firm* — WOMBLE BOND DICKINSON (US) LLP

(57) ABSTRACT

A data sending method includes: performing, by a first node, rate matching to determine a first bit sequence; determining, by the first node, a first symbol sequence based on the first bit sequence, and determining some to-be-mapped symbols in the first symbol sequence; and mapping, by the first node, the symbols to a first resource, and sending the symbols.

17 Claims, 31 Drawing Sheets

(56) References Cited

U.S. PATENT DOCUMENTS

| | | | | |
|---|---|---|---|---|
| 2012/0057449 A1* | 3/2012 | Takaoka | ............... | H04B 1/713 375/E1.033 |
| 2012/0082117 A1* | 4/2012 | Lee | ............... | H04L 1/1671 370/329 |
| 2012/0099545 A1* | 4/2012 | Han | ............... | H04W 72/21 370/329 |
| 2012/0282936 A1* | 11/2012 | Gao | ............... | H04L 5/0023 455/450 |
| 2013/0107838 A1 | 5/2013 | Li et al. | | |
| 2015/0349932 A1* | 12/2015 | Onodera | ............... | H04L 1/1893 370/329 |
| 2018/0042030 A1 | 2/2018 | Xu et al. | | |
| 2018/0083751 A1* | 3/2018 | Seo | ............... | H04L 27/26 |
| 2018/0176891 A1* | 6/2018 | Kim | ............... | H04L 5/0037 |
| 2018/0359123 A1* | 12/2018 | Kimura | ............... | H04L 27/26 |

FOREIGN PATENT DOCUMENTS

| | | |
|---|---|---|
| CN | 102273298 A | 12/2011 |
| CN | 102647789 A | 8/2012 |
| CN | 103178941 A | 6/2013 |
| CN | 103841650 A | 6/2014 |
| CN | 105722056 A | 6/2016 |
| CN | 106100810 A | 11/2016 |
| CN | 106936752 A | 7/2017 |
| CN | 107241288 A | 10/2017 |
| CN | 107852234 A | 3/2018 |
| CN | 107889240 A | 4/2018 |
| KR | 20100093498 A | 8/2010 |
| WO | 2011019008 A1 | 2/2011 |
| WO | 2014067140 A1 | 5/2014 |
| WO | 2017117253 A1 | 7/2017 |
| WO | 2017198175 A1 | 11/2017 |
| WO | 2018075146 A1 | 4/2018 |

OTHER PUBLICATIONS

Huawei et al., "Discussion on over-the-air time synchronization for URLLC", 3GPP TSG RAN WG1 Meeting #91 R1-1719414, Reno, USA, Nov. 27 Dec. 1, 2017, Total 3 PAGES.

3GPP TR 22.804 V16.0.0 (Jun. 2018); 3rd Generation Partnership Project; Technical Specification Group Services and System Aspects;Study on Communication for Automation in Vertical Domains(Release 16);total 189 pages.

Qualcomm, "Discussion of LAN over 5G NR",3GPP TSG-SA WG1 Meeting #77 S1-171166,Jeju, Korea, Feb. 13-17, 2017, Total 6 PAGES.

3GPP TS 38.213 V15.2.0 (Jun. 2018); 3rd Generation Partnership Project; Technical Specification Group Radio Access Network;NR;Physical layer procedures for control(Release 15);total 99 pages.

Xiangming Li et al.,"Cooperative Communications Based On Rateless Network Coding in Distributed MIMO Systems", IEEE Wireless Communications, Jun. 2010,total 8 pages.

* cited by examiner

| RS | z(31) | z(47) | z(63) |
|---|---|---|---|
| z(14) | z(30) | z(46) | z(62) |
| z(13) | z(29) | RS | z(61) |
| z(12) | z(28) | z(44) | z(60) |
| RS | z(27) | z(43) | z(59) |
| z(10) | z(26) | z(42) | z(58) |
| z(9) | z(25) | RS | z(57) |
| z(8) | z(24) | z(40) | z(56) |
| RS | z(23) | z(39) | z(55) |
| z(6) | z(22) | z(38) | z(54) |
| z(5) | z(21) | RS | z(53) |
| z(4) | z(20) | z(36) | z(52) |
| RS | z(19) | z(35) | z(51) |
| z(2) | z(18) | z(34) | z(50) |
| z(1) | z(17) | RS | z(49) |
| z(0) | z(16) | z(32) | z(48) |

First resource

Second resource

FIG. 9B

| RS | z(27) | z(39) | z(55) |
|---|---|---|---|
| z(11) | z(26) | z(38) | z(54) |
| z(10) | z(25) | RS | z(53) |
| z(9) | z(24) | z(37) | z(52) |
| RS | z(23) | z(36) | z(51) |
| z(8) | z(22) | z(35) | z(50) |
| z(7) | z(21) | RS | z(49) |
| z(6) | z(20) | z(34) | z(48) |
| RS | z(19) | z(33) | z(47) |
| z(5) | z(18) | z(32) | z(46) |
| z(4) | z(17) | RS | z(45) |
| z(3) | z(16) | z(31) | z(44) |
| RS | z(15) | z(30) | z(43) |
| z(2) | z(14) | z(29) | z(42) |
| z(1) | z(13) | RS | z(41) |
| z(0) | z(12) | z(28) | z(40) |

First resource

Second resource

FIG. 9C

| z(15) | z(31) | z(47) | z(63) |
| z(14) | z(30) | z(46) | z(62) |
| z(13) | z(29) | z(45) | z(61) |
| z(12) | z(28) | z(44) | z(60) |
| z(11) | z(27) | z(43) | z(59) |
| z(10) | z(26) | z(42) | z(58) |
| z(9)  | z(25) | z(41) | z(57) |
| z(8)  | z(24) | z(40) | z(56) |
| z(7)  | z(23) | z(39) | z(55) |
| z(6)  | z(22) | z(38) | z(54) |
| z(5)  | z(21) | z(37) | z(53) |
| z(4)  | z(20) | z(36) | z(52) |
| z(3)  | z(19) | z(35) | z(51) |
| z(2)  | z(18) | z(34) | z(50) |
| z(1)  | z(17) | z(33) | z(49) |
| z(0)  | z(16) | z(32) | z(48) |

First resource

Second resource

FIG. 9E

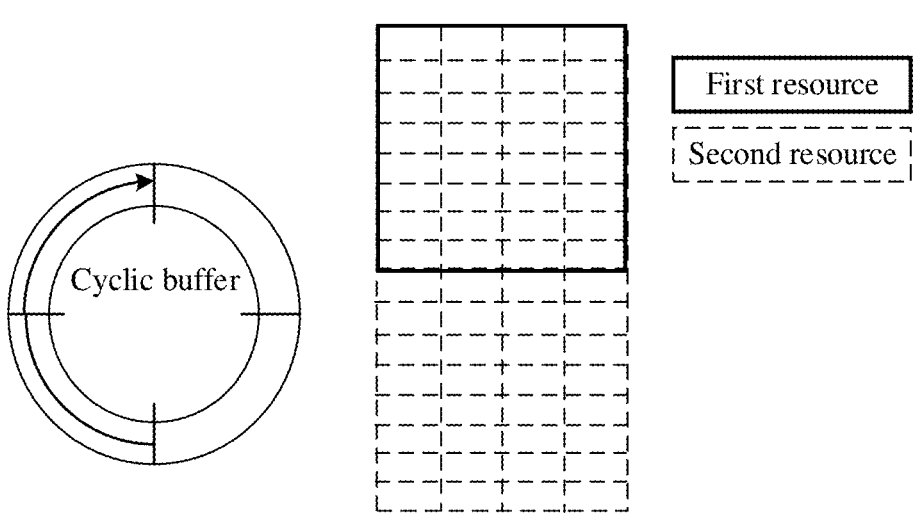
FIG. 14C
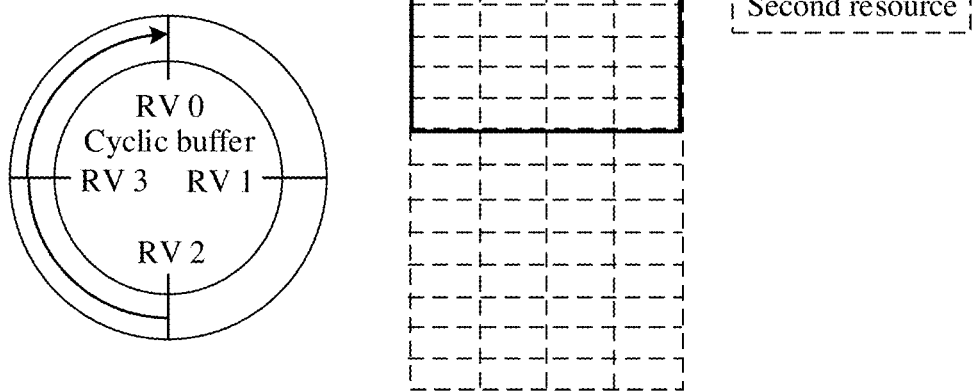
FIG. 14D
A first node receives group common information, and determines a second resource based on the group common information, where the group common information is included in physical layer control information ~1500
The first node determines a first resource, and sends data by using the first resource, where the first resource is a subset of the second resource ~1510
FIG. 15

DATA SENDING METHOD AND APPARATUS

CROSS-REFERENCE TO RELATED APPLICATIONS

This application is a continuation of International Application No. PCT/CN2019/089803, filed on Jun. 3, 2019, which claims priority to Chinese Patent Application No. 201810837621.3, filed on Jul. 26, 2018. The disclosures of the aforementioned applications are hereby incorporated by reference in their entireties.

TECHNICAL FIELD

This application relates to the field of communication technologies, and in particular, to a wireless communication data sending method and an apparatus.

BACKGROUND

In a wireless communications system, rate matching needs to be performed on a bit sequence that is output after channel coding, to select bits, so that data having a proper quantity of bits is obtained, to match a to-be-mapped resource. A long term evolution (LTE) system or a new radio (NR) system is used as an example. A bit sequence before rate matching may be represented as $\{d_0, d_1, d_2, \ldots, d_{N-1}\}$, and a bit sequence after the rate matching may be represented as $\{f_0, f_1, f_2, \ldots, f_{E-1}\}$. That is, after the rate matching is performed on the bit sequence whose length is N, the bit sequence whose length is E is obtained. In the rate matching process, the bit sequence $\{f_0, f_1, f_2, \ldots, f_{E-1}\}$ is selected based on a quantity of bits that can be actually transmitted subsequently. The quantity of bits that can be actually transmitted subsequently is determined by a plurality of factors (for example, one or more of a resource that can be occupied for data sending, a quantity of transport layers, a modulation scheme, and the like).

The bit sequence obtained after the rate matching is further preprocessed (for example, one or more of scrambled, modulated, and the like) to obtain a symbol sequence on which resource mapping is to be performed. The symbol sequence may be represented as $\{z(0), \ldots, z(M-1)\}$, and a symbol in the symbol sequence is a modulated symbol obtained after modulation, where M is a length of the symbol sequence. A symbol in the symbol sequence is mapped to a resource that can be occupied for data sending (for example, one or more of a time-frequency resource, a space domain resource, and the like).

With development of wireless communications systems, data transmission has higher requirements on latency and reliability. For example, in NR, ultra-reliable low-latency communication (URLLC) requires both ensuring 99.999% reliability and achieving a maximum latency of 1 millisecond (ms). To satisfy the foregoing requirements, a concept of coordinated multi-node sending is put forward. In this concept, a plurality of nodes may send data from a same transport block (TB) or coded block (CB). However, the foregoing concept causes data interference between the plurality of nodes. Consequently, both the reliability and the latency requirement that are of the data transmission cannot be ensured at the same time. Therefore, how to reduce data interference between the plurality of nodes in the coordinated multi-node sending and ensure the reliability and latency requirement of the data transmission is currently a problem to be urgently resolved.

SUMMARY

Embodiments of this application provide a data sending method and an apparatus, to satisfy both a data transmission reliability requirement and a latency requirement.

According to a first aspect, an embodiment of this application provides a data sending method, including:

A sending-side node performs rate matching to obtain a first bit sequence.

The sending-side node determines a first symbol sequence based on the first bit sequence, determines some to-be-mapped symbols in the first symbol sequence, and maps the symbols to a first resource.

The sending-side node sends the symbols mapped to the first resource.

In an embodiment, the sending-side node performs indexing for a second resource, maps the symbols to the first resource, and sends the symbols.

In an embodiment, the sending-side node virtually maps symbols in the first symbol sequence to the second resource, physically maps the symbols to the first resource, and sends the symbols.

It may be understood that all mappings in the embodiments of this application may be understood as physical mappings unless otherwise specified.

In an embodiment, the first resource is a proper subset of the second resource.

In an embodiment, there are one or more first resources.

In an embodiment, the sending-side node performs the rate matching based on the second resource, to obtain the first bit sequence.

In an embodiment, the sending-side node further performs the rate matching based on a redundancy version RV and/or a size of the second resource, to obtain the first bit sequence.

In an embodiment, the sending-side node maps the symbols to the first resource based on one or more of the following: the second resource, the first resource, a mapping start point, a mapping sequence, a mapping pattern, or a pilot pattern.

In an embodiment, the sending-side node determines the first resource based on first information from a control node, where the first information is included in one or more of the following messages: a physical layer message, a media access control (MAC) layer message, or a radio resource control (RRC) layer message.

In an embodiment, the sending-side node determines the first resource based on one or more of the following: the second resource, an active bandwidth part (BWP), a measurement result, or a service scheduling status.

In an embodiment, the second resource includes one or more sub-resources.

In an embodiment, a size of the sub-resource is related to one or more of the following: a size of a resource block group, a size of a mini-slot, a size of a slot, a quantity of beams, a quantity of spatial layers, the size of the second resource, a transport block size (TBS) parameter, a bit rate parameter, or a modulation and coding scheme (MCS) parameter.

In an embodiment, the sending-side node determines, based on second information from the control node, a sub-resource included in the first resource, where the second information is included in one or more of the following messages: a physical layer message, a MAC layer message, or an RRC layer message.

In an embodiment, the sending-side node determines a sub-resource included in the first resource, based on one or more of the following: the second resource, the active BWP, the measurement result, or the service scheduling status.

In an embodiment, a parameter of the sub-resource is related to a parameter of the second resource. The parameter of the sub-resource includes one or more of the following: a pilot parameter, a precoding parameter, a redundancy version parameter, a mapping start point parameter, a coding parameter, or a modulation parameter.

In an embodiment, the sending-side node determines the parameter of the sub-resource based on one or more of the following: third information from the control node, or predefined parameter information of the sub-resource. In an embodiment, the third information is included in one or more of the following messages: a physical layer message, a MAC layer message, or an RRC layer message. In an embodiment, the parameter of the sub-resource includes one or more of the following: a pilot parameter, a precoding parameter, a redundancy version parameter, a mapping start point parameter, a coding parameter, or a modulation parameter.

In an embodiment, a parameter of the first resource is related to the parameter of the second resource. In an embodiment, the parameter of the first resource includes one or more of the following: a pilot parameter, a precoding parameter, a redundancy version parameter, a mapping start point parameter, a coding parameter, or a modulation parameter.

In an embodiment, the sending-side node determines the parameter of the first resource based on one or more of the following: fourth information from the control node, or predefined parameter information of the sub-resource. In an embodiment, the fourth information is included in one or more of the following messages: a physical layer message, a MAC layer message, or an RRC layer message. In an embodiment, the parameter of the first resource includes one or more of the following: a pilot parameter, a precoding parameter, a redundancy version parameter, a mapping start point parameter, a coding parameter, or a modulation parameter.

In an embodiment, the sending-side node receives fifth information from the control node, and determines the second resource based on the fifth information. In an embodiment, the fifth information is group common information. In an embodiment, the fifth information is included in physical layer control information, a MAC layer message, or an RRC layer message.

In an embodiment, the sending-side node receives sixth information from the control node, determines a power control parameter of the first resource based on the sixth information, and sends, by using the power control parameter, data mapped to the first resource. In an embodiment, the sixth information is group common information. In an embodiment, the sixth information is included in physical layer control information, a MAC layer message, or an RRC layer message.

In an embodiment, the second resource may further include a third resource, the third resource is a proper subset of the second resource, and there is no intersection between the third resource and the first resource. In an embodiment, the sixth information further includes a power control parameter of the third resource. In an embodiment, the power control parameter of the third resource is different from the power control parameter of the first resource. In an embodiment, there may be one or more third resources.

In this embodiment of this application, a resource set for sending data is configured, some resources in the resource set are determined, to-be-sent data is mapped based on the some resources, and the data is sent. This reduces interference in coordinated multi-node sending, thereby improving reliability and latency performance of the coordinated multi-node sending.

According to a second aspect, an embodiment of this application provides a data sending method, including:

A sending-side node performs rate matching to obtain a first bit sequence. The sending-side node determines a first symbol sequence based on the first bit sequence, and determines a first resource and a second resource, where the first resource is a proper subset of the second resource. The sending-side node maps a symbol in the first symbol sequence to the second resource, and sends the symbol mapped to the first resource. In an embodiment, there are one or more first resources.

In an embodiment, the sending-side node performs the rate matching based on the second resource, to obtain the first bit sequence, and maps some symbols in the first symbol sequence to the first resource.

In an embodiment, the sending-side node further performs the rate matching based on a redundancy version RV and/or a size of the second resource, to obtain the first bit sequence, and maps the symbols in the first symbol sequence to the first resource.

In an embodiment, the sending-side node maps the symbols to the first resource based on one or more of the following: the second resource, the first resource, a mapping start point, a mapping sequence, a mapping pattern, or a pilot pattern.

In an embodiment, the sending-side node determines the first resource based on first information from a control node, where the first information is included in one or more of the following messages: a physical layer message, a media access control (MAC) layer message, or a radio resource control (RRC) layer message.

In an embodiment, the sending-side node determines the first resource based on one or more of the following: the second resource, an active bandwidth part (BWP), a measurement result, or a service scheduling status.

In an embodiment, the second resource includes one or more sub-resources.

In an embodiment, a size of the sub-resource is related to one or more of the following: a size of resource block bundling (RB bundling), a size of a mini-slot, a size of a slot, a quantity of beams, a quantity of spatial layers, the size of the second resource, a transport block size (TBS) parameter, a bit rate parameter, or a modulation and coding scheme (MCS) parameter.

In an embodiment, the sending-side node determines, based on second information from the control node, a sub-resource included in the first resource, where the second information is included in one or more of the following messages: a physical layer message, a MAC layer message, or an RRC layer message.

In an embodiment, the sending-side node determines a sub-resource included in the first resource, based on one or more of the following: the second resource, the active BWP, the measurement result, or the service scheduling status.

In an embodiment, a parameter of the sub-resource is related to a parameter of the second resource. The parameter of the sub-resource includes one or more of the following: a pilot parameter, a precoding parameter, a redundancy version parameter, a mapping start point parameter, a coding parameter, or a modulation parameter.

In an embodiment, the sending-side node determines the parameter of the sub-resource based on one or more of the following: third information from the control node, or predefined parameter information of the sub-resource. In an embodiment, the third information is included in one or more of the following messages: a physical layer message, a MAC layer message, or an RRC layer message. In an embodiment, the parameter of the sub-resource includes one or more of the following: a pilot parameter, a precoding parameter, a redundancy version parameter, a mapping start point parameter, a coding parameter, or a modulation parameter.

In an embodiment, a parameter of the first resource is related to the parameter of the second resource. In an embodiment, the parameter of the first resource includes one or more of the following: a pilot parameter, a precoding parameter, a redundancy version parameter, a mapping start point parameter, a coding parameter, or a modulation parameter.

In an embodiment, the sending-side node determines the parameter of the first resource based on one or more of the following: third information from the control node, or predefined parameter information of the sub-resource. In an embodiment, the third information is included in one or more of the following messages: a physical layer message, a MAC layer message, or an RRC layer message. In an embodiment, the parameter of the first resource includes one or more of the following: a pilot parameter, a precoding parameter, a redundancy version parameter, a mapping start point parameter, a coding parameter, or a modulation parameter.

In an embodiment, the sending-side node receives fifth information from the control node, and determines the second resource based on the fifth information. In an embodiment, the fifth information is group common information. In an embodiment, the fifth information is included in physical layer control information, a MAC layer message, or an RRC layer message.

In an embodiment, the sending-side node receives sixth information from the control node, determines a power control parameter of the first resource based on the sixth information, and sends, by using the power control parameter, data mapped to the first resource. In an embodiment, the sixth information is group common information. In an embodiment, the sixth information is included in physical layer control information, a MAC layer message, or an RRC layer message.

In an embodiment, the second resource may further include a third resource, the third resource is a proper subset of the second resource, and there is no intersection between the third resource and the first resource. In an embodiment, the sixth information further includes a power control parameter of the third resource. In an embodiment, the power control parameter of the third resource is different from the power control parameter of the first resource. In an embodiment, there may be one or more third resources.

In this embodiment of this application, a resource set for sending data is configured, some resources in the resource set are determined, to-be-sent data is mapped based on the some resources, and the data is sent. This reduces interference in coordinated multi-node sending, thereby improving reliability and latency performance of the coordinated multi-node sending.

According to a third aspect, an embodiment of this application provides a data sending method, including:

A sending-side node performs rate matching based on a second resource, to obtain a second bit sequence. The sending-side node determines a second symbol sequence based on the second bit sequence, and maps all or some symbols in the second symbol sequence to a first resource. The sending-side node sends the symbols mapped to the first resource. The first resource is a proper subset of the second resource. In an embodiment, there are one or more first resources.

In an embodiment, the sending-side node performs the rate matching based on a size of the second resource, to obtain the second bit sequence, and maps the symbols in the second symbol sequence to the first resource.

In an embodiment, the sending-side node performs the rate matching based on the second resource and the first resource, to obtain the second bit sequence, and maps all the symbols in the second symbol sequence to the first resource.

In an embodiment, the sending-side node performs the rate matching based on one or more of the following items to obtain the second bit sequence: a redundancy version RV, the size of the second resource, or a reference start point.

In an embodiment, the sending-side node performs the rate matching based on one or more of the following items to obtain the second bit sequence: a redundancy version RV, a size of the first resource, a size of the second resource, or a reference start point.

In an embodiment, the sending-side node maps the all or some symbols in the second symbol sequence to the first resource based on one or more of the following: the second resource, the first resource, a mapping start point, a mapping sequence, a mapping pattern, or a pilot pattern.

In an embodiment, the sending-side node determines the first resource based on first information from a control node, where the first information is included in one or more of the following messages: a physical layer message, a media access control (MAC) layer message, or a radio resource control (RRC) layer message.

In an embodiment, the sending-side node determines the first resource based on one or more of the following: the second resource, an active bandwidth part (BWP), a measurement result, or a service scheduling status.

In an embodiment, the second resource includes one or more sub-resources.

In an embodiment, a size of the sub-resource is related to one or more of the following: a size of a physical resource block group, a size of a mini-slot, a size of a slot, a quantity of beams, a quantity of spatial layers, the size of the second resource, a transport block size (TBS) parameter, a bit rate parameter, or a modulation and coding scheme (MCS) parameter.

In an embodiment, the sending-side node determines, based on second information from the control node, a sub-resource included in the first resource, where the second information is included in one or more of the following messages: a physical layer message, a MAC layer message, or an RRC layer message.

In an embodiment, the sending-side node determines a sub-resource included in the first resource, based on one or more of the following: the second resource, the active BWP, the measurement result, or the service scheduling status.

In an embodiment, a parameter of the sub-resource is related to a parameter of the second resource. The parameter of the sub-resource includes one or more of the following: a pilot parameter, a precoding parameter, a redundancy version parameter, a mapping start point parameter, a coding parameter, or a modulation parameter.

In an embodiment, the sending-side node determines the parameter of the sub-resource based on one or more of the following: third information from the control node, or predefined parameter information of the sub-resource. In an embodiment, the third information is included in one or more of the following messages: a physical layer message, a MAC layer message, or an RRC layer message. In an embodiment, the parameter of the sub-resource includes one or more of the following: a pilot parameter, a precoding parameter, a redundancy version parameter, a mapping start point parameter, a coding parameter, or a modulation parameter.

In an embodiment, a parameter of the first resource is related to the parameter of the second resource. In an embodiment, the parameter of the first resource includes one or more of the following: a pilot parameter, a precoding parameter, a redundancy version parameter, a mapping start point parameter, a coding parameter, or a modulation parameter.

In an embodiment, the sending-side node determines the parameter of the first resource based on one or more of the following: third information from the control node, or predefined parameter information of the sub-resource. In an embodiment, the third information is included in one or more of the following messages: a physical layer message, a MAC layer message, or an RRC layer message. In an embodiment, the parameter of the first resource includes one or more of the following: a pilot parameter, a precoding parameter, a redundancy version parameter, a mapping start point parameter, a coding parameter, or a modulation parameter.

In an embodiment, the sending-side node receives fifth information from the control node, and determines the second resource based on the fifth information. In an embodiment, the fifth information is group common information. In an embodiment, the fifth information is included in physical layer control information, a MAC layer message, or an RRC layer message.

In an embodiment, the sending-side node receives sixth information from the control node, determines a power control parameter of the first resource based on the sixth information, and sends, by using the power control parameter, data mapped to the first resource. In an embodiment, the sixth information is group common information. In an embodiment, the sixth information is included in physical layer control information, a MAC layer message, or an RRC layer message.

In an embodiment, the second resource may further include a third resource, the third resource is a proper subset of the second resource, and there is no intersection between the third resource and the first resource. In an embodiment, the sixth information further includes a power control parameter of the third resource. In an embodiment, the power control parameter of the third resource is different from the power control parameter of the first resource. In an embodiment, there may be one or more third resources.

In an embodiment, a resource set for sending data is configured, some resources in the resource set are determined, to-be-sent data is mapped based on the some resources, and the data is sent. This reduces interference in coordinated multi-node sending, thereby improving reliability and latency performance of the coordinated multi-node sending.

According to a fourth aspect, an embodiment of this application provides a data sending method, including: A sending-side node receives group common information, and determines a second resource based on the group common information, where the group common information is included in physical layer control information. The sending-side node sends data by using a first resource, where the first resource is a proper subset of the second resource. In an embodiment, there are one or more first resources.

In an embodiment, the sending-side node performs rate matching to obtain a first bit sequence. The sending-side node determines a first symbol sequence based on the first bit sequence, determines some to-be-mapped symbols in the first symbol sequence, and maps the symbols to the first resource. The sending-side node sends the symbols. In an embodiment, the sending-side node performs indexing for the second resource, maps the symbols to the first resource, and sends the symbols. In an embodiment, the sending-side node virtually maps symbols in the first symbol sequence to the second resource, physically maps the symbols to the first resource, and sends the symbols.

In an embodiment, the sending-side node performs rate matching to determine a first bit sequence. The sending-side node determines a first symbol sequence based on the first bit sequence, and determines the first resource and the second resource. The sending-side node maps a symbol in the first symbol sequence to the second resource, and sends the symbol mapped to the first resource.

In an embodiment, the sending-side node performs rate matching based on the second resource, to obtain a second bit sequence. The sending-side node determines a second symbol sequence based on the second bit sequence, and maps all or some symbols in the second symbol sequence to the first resource. The sending-side node sends the symbols mapped to the first resource.

In an embodiment, the sending-side node performs the rate matching based on a size of the second resource, to obtain the second bit sequence, and maps the symbols in the second symbol sequence to the first resource. In an embodiment, the sending-side node performs the rate matching based on one or more of the following items to obtain the second bit sequence: a redundancy version RV, the size of the second resource, or a reference start point.

In an embodiment, the sending-side node performs the rate matching based on the second resource and the first resource, to obtain the second bit sequence, and maps all the symbols in the second symbol sequence to the first resource. In an embodiment, the sending-side node performs the rate matching based on one or more of the following items to obtain the second bit sequence: a redundancy version RV, a size of the first resource, a size of the second resource, or a reference start point.

In an embodiment, the sending-side node maps the symbols in the second symbol sequence to the first resource based on one or more of the following: the second resource, the first resource, a mapping start point, a mapping sequence, a mapping pattern, or a pilot pattern.

In an embodiment, the sending-side node determines the first resource based on first information from a control node, where the first information is included in one or more of the following messages: a physical layer message, a media access control (MAC) layer message, or a radio resource control (RRC) layer message.

In an embodiment, the sending-side node determines the first resource based on one or more of the following: the second resource, an active bandwidth part (BWP), a measurement result, or a service scheduling status.

In an embodiment, the second resource includes one or more sub-resources.

In an embodiment, a size of the sub-resource is related to one or more of the following: a size of physical resource block bundling (PRB bundling), a size of a mini-slot, a size of a slot, a quantity of beams, a quantity of spatial layers, the size of the second resource, a transport block size (TBS) parameter, a bit rate parameter, or a modulation and coding scheme (MCS) parameter.

In an embodiment, the sending-side node determines, based on second information from the control node, a sub-resource included in the first resource, where the second information is included in one or more of the following messages: a physical layer message, a MAC layer message, or an RRC layer message.

In an embodiment, the sending-side node determines a sub-resource included in the first resource, based on one or more of the following: the second resource, the active BWP, the measurement result, or the service scheduling status.

In an embodiment, a parameter of the sub-resource is related to a parameter of the second resource. The parameter of the sub-resource includes one or more of the following: a pilot parameter, a precoding parameter, a redundancy version parameter, a mapping start point parameter, a coding parameter, or a modulation parameter.

In an embodiment, the sending-side node determines the parameter of the sub-resource based on one or more of the following: third information from the control node, or predefined parameter information of the sub-resource. In an embodiment, the third information is included in one or more of the following messages: a physical layer message, a MAC layer message, or an RRC layer message. In an embodiment, the parameter of the sub-resource includes one or more of the following: a pilot parameter, a precoding parameter, a redundancy version parameter, a mapping start point parameter, a coding parameter, or a modulation parameter.

In an embodiment, a parameter of the first resource is related to the parameter of the second resource. In an embodiment, the parameter of the first resource includes one or more of the following: a pilot parameter, a precoding parameter, a redundancy version parameter, a mapping start point parameter, a coding parameter, or a modulation parameter.

In an embodiment, the sending-side node determines the parameter of the first resource based on one or more of the following: third information from the control node, or predefined parameter information of the sub-resource. In an embodiment, the third information is included in one or more of the following messages: a physical layer message, a MAC layer message, or an RRC layer message. In an embodiment, the parameter of the first resource includes one or more of the following: a pilot parameter, a precoding parameter, a redundancy version parameter, a mapping start point parameter, a coding parameter, or a modulation parameter.

In an embodiment, the sending-side node receives fifth information from the control node, and determines the second resource based on the fifth information. In an embodiment, the fifth information is group common information. In an embodiment, the fifth information is included in physical layer control information, a MAC layer message, or an RRC layer message.

In an embodiment, the sending-side node receives sixth information from the control node, determines a power control parameter of the first resource based on the sixth information, and sends, by using the power control parameter, data mapped to the first resource. In an embodiment, the sixth information is group common information. In an embodiment, the sixth information is included in physical layer control information, a MAC layer message, or an RRC layer message.

In an embodiment, the second resource may further include a third resource, the third resource is a proper subset of the second resource, and there is no intersection between the third resource and the first resource. In an embodiment, the sixth information further includes a power control parameter of the third resource. In an embodiment, the power control parameter of the third resource is different from the power control parameter of the first resource. In an embodiment, there may be one or more third resources.

In this embodiment of this application, a resource set for sending data is configured, some resources in the resource set are determined, data symbols are mapped based on the some resources, and the data symbols mapped to the some resources are sent. This reduces interference in coordinated multi-node sending, thereby improving reliability and latency performance of the coordinated multi-node sending.

According to a fifth aspect, an embodiment of this application provides a data sending method, including:

A sending-side node receives fifth information from a control node, and determines a second resource based on the fifth information. The sending-side node receives sixth information from the control node, determines a power control parameter of a first resource based on the sixth information, and sends, by using the power control parameter, data mapped to the first resource. The first resource is a proper subset of the second resource. There are one or more first resources. In an embodiment, the fifth information is group common information. In an embodiment, the fifth information is included in physical layer control information, a media access control (MAC) layer message, or a radio resource control (RRC) layer message. In an embodiment, the sixth information is group common information. In an embodiment, the sixth information is included in physical layer control information, a MAC layer message, or an RRC layer message.

In an embodiment, the second resource may further include a third resource, the third resource is a proper subset of the second resource, and there is no intersection between the third resource and the first resource. In an embodiment, the sixth information includes a power control parameter of the third resource. In an embodiment, the power control parameter of the third resource is different from the power control parameter of the first resource. In an embodiment, there may be one or more third resources.

In an embodiment, the sending-side node performs rate matching to obtain a first bit sequence. The sending-side node determines a first symbol sequence based on the first bit sequence, determines some to-be-mapped symbols in the first symbol sequence, and maps the symbols to the first resource. The sending-side node sends the symbols. In an embodiment, the sending-side node performs indexing for the second resource, maps the symbols to the first resource, and sends the symbols. In an embodiment, the sending-side node virtually maps symbols in the first symbol sequence to the second resource, physically maps the symbols to the first resource, and sends the symbols.

In an embodiment, the sending-side node performs rate matching to determine a first bit sequence. The sending-side node determines a first symbol sequence based on the first bit sequence, and determines the first resource and the second resource. The sending-side node maps a symbol in the first symbol sequence to the second resource, and sends the symbol mapped to the first resource.

In an embodiment, the sending-side node performs rate matching based on the second resource, to obtain a second bit sequence. The sending-side node determines a second symbol sequence based on the second bit sequence, and maps all or some symbols in the second symbol sequence to the first resource. The sending-side node sends the symbols mapped to the first resource.

In an embodiment, the sending-side node performs the rate matching based on a size of the second resource, to obtain the second bit sequence, and maps the symbols in the second symbol sequence to the first resource. In an embodiment, the sending-side node performs the rate matching based on one or more of the following items to obtain the second bit sequence: a redundancy version RV, the size of the second resource, or a reference start point.

In an embodiment, the sending-side node performs the rate matching based on the second resource and the first resource, to obtain the second bit sequence, and maps all the symbols in the second symbol sequence to the first resource. In an embodiment, the sending-side node performs the rate matching based on one or more of the following items to obtain the second bit sequence: a redundancy version RV, a size of the first resource, a size of the second resource, or a reference start point.

In an embodiment, the sending-side node maps the symbols in the second symbol sequence to the first resource based on one or more of the following: the second resource, the first resource, a mapping start point, a mapping sequence, a mapping pattern, or a pilot pattern.

In an embodiment, the sending-side node determines the first resource based on first information from a control node, where the first information is included in one or more of the following messages: a physical layer message, a media access control (MAC) layer message, or a radio resource control (RRC) layer message.

In an embodiment, the sending-side node determines the first resource based on one or more of the following: the second resource, an active bandwidth part (BWP), a measurement result, or a service scheduling status.

In an embodiment, the second resource includes one or more sub-resources.

In an embodiment, a size of the sub-resource is related to one or more of the following: a size of physical resource block bundling (PRB bundling), a size of a mini-slot, a size of a slot, a quantity of beams, a quantity of spatial layers, the size of the second resource, a transport block size (TBS) parameter, a bit rate parameter, or a modulation and coding scheme (MCS) parameter.

In an embodiment, the sending-side node determines, based on second information from the control node, a sub-resource included in the first resource, where the second information is included in one or more of the following messages: a physical layer message, a MAC layer message, or an RRC layer message.

In an embodiment, the sending-side node determines a sub-resource included in the first resource, based on one or more of the following: the second resource, the active BWP, the measurement result, or the service scheduling status.

In an embodiment, a parameter of the sub-resource is related to a parameter of the second resource. The parameter of the sub-resource includes one or more of the following: a pilot parameter, a precoding parameter, a redundancy version parameter, a mapping start point parameter, a coding parameter, or a modulation parameter.

In an embodiment, the sending-side node determines the parameter of the sub-resource based on one or more of the following: third information from the control node, or pre-defined parameter information of the sub-resource. In an embodiment, the third information is included in one or more of the following messages: a physical layer message, a MAC layer message, or an RRC layer message. In an embodiment, the parameter of the sub-resource includes one or more of the following: a pilot parameter, a precoding parameter, a redundancy version parameter, a mapping start point parameter, a coding parameter, or a modulation parameter.

In an embodiment, a parameter of the first resource is related to the parameter of the second resource. In an embodiment, the parameter of the first resource includes one or more of the following: a pilot parameter, a precoding parameter, a redundancy version parameter, a mapping start point parameter, a coding parameter, or a modulation parameter.

In an embodiment, the sending-side node determines the parameter of the first resource based on one or more of the following: third information from the control node, or pre-defined parameter information of the sub-resource. In an embodiment, the third information is included in one or more of the following messages: a physical layer message, a MAC layer message, or an RRC layer message. In an embodiment, the parameter of the first resource includes one or more of the following: a pilot parameter, a precoding parameter, a redundancy version parameter, a mapping start point parameter, a coding parameter, or a modulation parameter.

In an embodiment, a resource set for sending data is configured, some resources in the resource set and a power control parameter of the some resources are determined, power for sending data symbols mapped to the some resources is determined based on the power control parameter, and the data symbols mapped to the some resources are sent. This reduces interference in coordinated multi-node sending, thereby improving reliability and latency performance of the coordinated multi-node sending.

According to a sixth aspect, an embodiment of this application provides a data receiving method, including: A receiving-side node receives data by using a second resource.

In an embodiment, the receiving-side node receives seventh information from a control node, and determines the second resource based on the seventh information.

In an embodiment, the seventh information is included in one or more of the following messages: a physical layer message, a MAC layer message, or an RRC layer message.

In an embodiment, the data is received on a resource set. This reduces interference in coordinated multi-node sending, thereby improving reliability and latency performance of the coordinated multi-node sending, and reducing receiving complexity on a receiving side.

According to a seventh aspect, an embodiment of this application provides a data sending method, including: A control node sends fifth information, where the fifth information is used by a first node to determine a second resource. The control node sends first information, where the first information is used to determine a first resource; and sends data mapped to the first resource. The first resource is a proper subset of the second resource. In an embodiment, the first information is included in one or more of the following messages: a physical layer message, a MAC layer message, or an RRC layer message. In an embodiment, the fifth information is included in one or more of the following messages: a physical layer message, a MAC layer message, or an RRC layer message. In an embodiment, the fifth information is group common information.

In an embodiment, the control node sends second information, where the second information is used to determine a sub-resource included in the first resource. In an embodiment, the second information is included in one or more of the following messages: a physical layer message, a MAC layer message, or an RRC layer message.

In an embodiment, the control node sends third information, where the third information is used to determine a parameter of the sub-resource. In an embodiment, the third information is included in one or more of the following messages: a physical layer message, a MAC layer message, or an RRC layer message. In an embodiment, the parameter of the sub-resource includes one or more of the following: a pilot parameter, a precoding parameter, a redundancy version parameter, a mapping start point parameter, a coding parameter, or a modulation parameter.

In an embodiment, the control node sends fourth information, where the fourth information is used to determine a parameter of the first resource. In an embodiment, the fourth information is included in one or more of the following messages: a physical layer message, a MAC layer message, or an RRC layer message. In an embodiment, the parameter of the first resource includes one or more of the following: a pilot parameter, a precoding parameter, a redundancy version parameter, a mapping start point parameter, a coding parameter, or a modulation parameter.

In an embodiment, the control node sends sixth information, where the sixth information is used to determine a power control parameter of the first resource. In an embodiment, the sixth information is included in one or more of the following messages: a physical layer message, a MAC layer message, or an RRC layer message. In an embodiment, the sixth information is group common information.

In an embodiment, the control node sends seventh information, where the seventh information is used to determine the second resource. In an embodiment, the control node receives data on the second resource. In an embodiment, the seventh information is included in one or more of the following messages: a physical layer message, a MAC layer message, or an RRC layer message.

In this embodiment of this application, a resource set for sending data is configured, some resources in the resource set are determined, to-be-sent data is mapped based on the some resources, and the data is sent. This reduces interference in coordinated multi-node sending, thereby improving reliability and latency performance of the coordinated multi-node sending.

According to an eighth aspect, this application provides a communications apparatus, to implement one or more corresponding functions of the foregoing sending-side node, receiving-side node, or control node. The communications apparatus includes a corresponding unit or component configured to perform the foregoing methods. The unit included in the communications apparatus may be implemented by software and/or hardware. For example, the communications apparatus may be a terminal, a network device (for example, a base station), or a chip, chip system, processor, or the like that can support a terminal or network device in implementing the foregoing functions.

According to a ninth aspect, this application provides a communications apparatus, including a processor. The processor is coupled to a memory, and the memory is configured to store a program. When the program is executed by the processor, the communications apparatus is enabled to implement the method in any one of the foregoing aspects.

According to a tenth aspect, this application provides a storage medium, storing a computer program. When the computer program is executed by a processor, the method in any one of the foregoing aspects is implemented.

According to an eleventh aspect, this application provides a chip system, including a processor, configured to perform the method described in any one of the foregoing aspects.

According to a twelfth aspect, this application provides a communications system, including the foregoing sending-side node and receiving-side node, or including the foregoing sending-side node, receiving-side node, and control node.

BRIEF DESCRIPTION OF DRAWINGS

FIG. 9B is a schematic diagram of a second type of symbol mapping according to an embodiment of this application;

FIG. 9C is a schematic diagram of a third type of symbol mapping according to an embodiment of this application;

FIG. 9E is a schematic diagram of a fifth type of symbol mapping according to an embodiment of this application;

FIG. 14C is a schematic diagram of a seventh type of rate matching or bit selection according to an embodiment of this application;

FIG. 14D is a schematic diagram of an eighth type of rate matching or bit selection according to an embodiment of this application;

FIG. 15 is a flowchart of a fourth type of data sending according to an embodiment of this application;

DESCRIPTION OF EMBODIMENTS

Figure 1A:
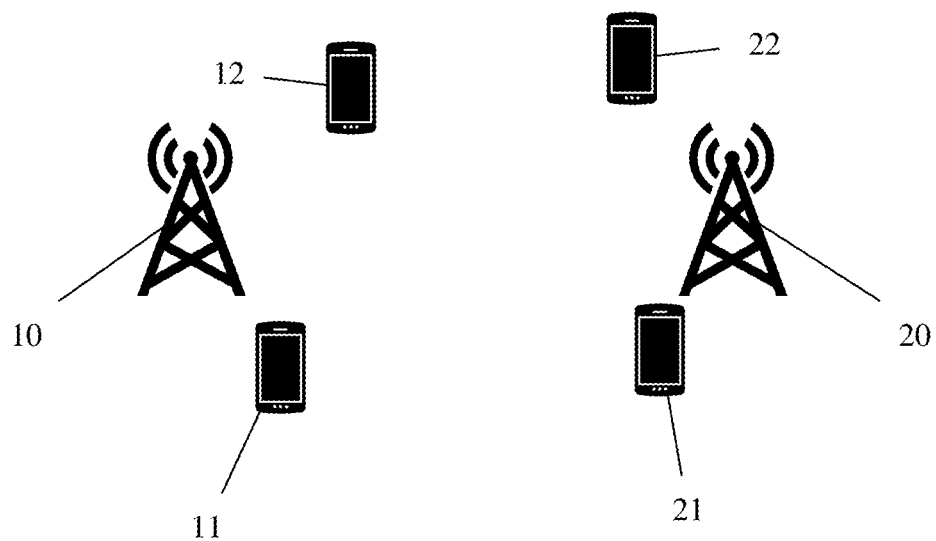
FIG. 1A is a schematic diagram of a communications system to which a data sending method according to this application is applied.

A data sending method and an apparatus provided in embodiments of this application may be applied to a communications system. FIG. 1A is a schematic structural diagram of a communications system. The communications system includes one or more network devices (where for clarity, a network device 10 and a network device 20 are shown in the figure), and one or more terminal devices that communicate with the one or more network devices. In FIG. 1A, a terminal device 11 and a terminal device 12 communicate with the network device 10, and a terminal device 21 and a terminal device 22 communicate with the network device 20.

Technologies described in the embodiments of this application may be applied to various communications systems, for example, 2G, 3G, 4G, 4.5G, and 5G communications systems, a system in which a plurality of communications systems are integrated, or a future evolved network (for example, a 6G communications system). The communications system is, for example, a code division multiple access (CDMA) system, a wideband code division multiple access (WCDMA) system, a time division multiple access (TDMA) system, a frequency division multiple access (FDMA) system, an orthogonal frequency division multiple access (OFDMA) system, a single carrier frequency division multiple access (SC-FDMA) system, a long term evolution (LTE) system, a new radio (NR) system, a wireless fidelity (Wi-Fi) system, a worldwide interoperability for microwave access (WiMAX) system, a 3rd generation partnership project (3GPP) related cellular system, and another communications system of this type.

Figure 1B:
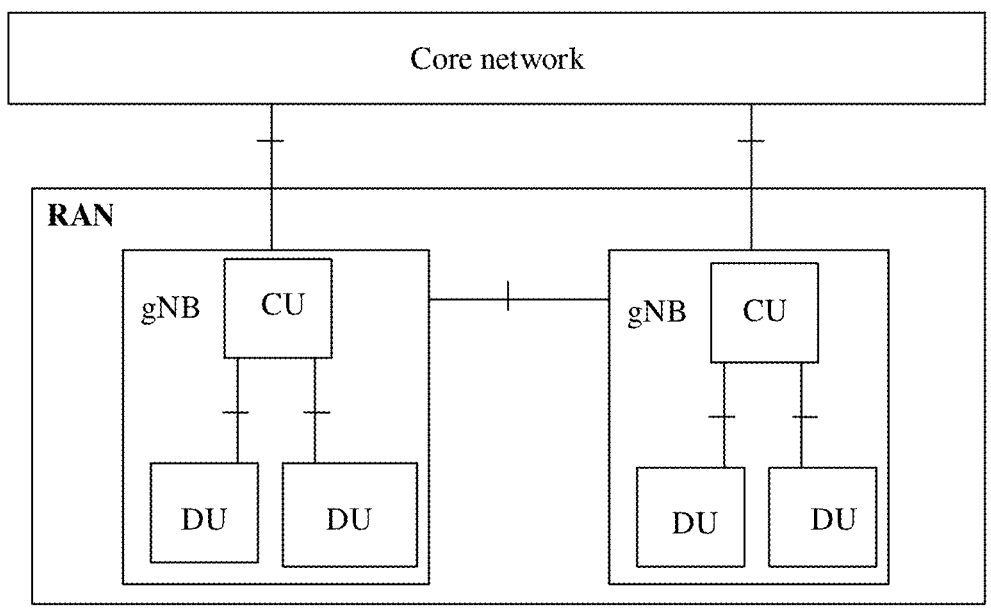
FIG. 1B is a schematic diagram of an example of an architecture of a communications system.

FIG. 1B is a schematic diagram of an example of a possible architecture of a communications system. As shown in FIG. 1B, a network device in a radio access network RAN is a base station (for example, a gNB) in a CU-DU separated architecture. The RAN may be connected to a core network (for example, an LTE core network or a 5G core network). A CU and a DU may be understood as division of the base station from a logical function perspective. The CU and the DU may be physically separated or physically deployed together. A function of the RAN is terminated on the CU. A plurality of DUs can share one CU. One DU may alternatively be connected to a plurality of CUs (not shown in the figure). The CU and the DU may be connected by using an interface, for example, an F1 interface. The CU and the DU may be divided based on protocol layers of a wireless network. For example, functions of a packet data convergence protocol (PDCP) layer and a radio resource control (RRC) layer are distributed to the CU, but functions of a radio link control (RLC) layer, a media access control (MAC) layer, and a physical layer are distributed to the DU. It may be understood that, division into processing functions of the CU and the DU based on the protocol layers is merely an example, and the processing functions of the CU and the DU may alternatively be divided in another manner. For example, the CU or the DU may be divided to have functions of more protocol layers. For example, the CU or the DU may alternatively be divided to have some processing functions of protocol layers. In a design, some functions of the RLC layer and functions of a protocol layer above the RLC layer are distributed to the CU, and remaining functions of the RLC layer and functions of a protocol layer below the RLC layer are distributed to on the DU. In another design, functions of the CU or the DU may alternatively be divided based on a service type or another system requirement. For example, division is performed based on a latency. Functions whose processing time needs to satisfy a latency requirement are distributed to the DU, and functions that do not need to satisfy the latency requirement are distributed to the CU. The network architecture shown in FIG. 1B may be applied to a 5G communications system, or may share one or more components or resources with an LTE system. In another design, the CU may alternatively have one or more functions of the core network. One or more CUs may be disposed in a centralized manner or a separated manner. For example, the CUs may be disposed on a network side for centralized management. The DU may have a plurality of radio frequency functions, and the radio frequency functions may be remotely set.

The function of the CU may be implemented by one entity, or may be used to further separate a control plane (CP) and a user plane (UP). To be specific, the control plane of the CU (CU-CP) and the user plane of the CU (CU-UP) may be implemented by different function entities, and the CU-CP and the CU-UP may be coupled to the DU to jointly implement a function of the base station.

It may be understood that the embodiments provided in this application are also applicable to an architecture in which the CU and the DU are not separated.

In this application, the network device may be any device having a wireless transceiver function. The network device includes but is not limited to: a base transceiver station (BTS) in global system for mobile communications (GSM) or CDMA, a NodeB in WCDMA, an evolved NodeB (eNB or e-NodeB) in LTE, a gNodeB (gNB) or a transmission reception point (TRP) in NR, a subsequently evolved base station in 3GPP, an access node in a Wi-Fi system, a wireless relay node, a wireless backhaul node, or the like. The base station may be a macro base station, a micro base station, a picocell base station, a small cell, a relay station, a balloon station, or the like. A plurality of base stations can support networks using a same technology mentioned above, or may support networks using different technologies mentioned above. The base station may include one or more co-site transmission reception points (TRP) or non-co-site transmission reception points. The network device may alternatively be a radio controller, a centralized unit (CU), and/or a distributed unit (DU) in a cloud radio access network (CRAN) scenario. The network device may alternatively be a server, a wearable device, a vehicle-mounted device, or the like. An example in which the network device is a base station is used for description below. The plurality of network devices may be base stations of a same type or base stations of different types. The base station may communicate with a terminal device, or may communicate with a terminal device via a relay station. The terminal device may communicate with a plurality of base stations using different technologies. For example, the terminal device may communicate with a base station supporting an LTE network, may communicate with a base station supporting a 5G network, and may further support a dual connection to a base station in an LTE network and a base station in a 5G network.

The terminal is a device having a wireless transceiver function. The terminal may be deployed on land, indoor or outdoor, or may be hand-held, wearable, or vehicle-mounted; may be deployed on a water surface (for example, on a ship); or may be deployed in the air (for example, on an airplane, a balloon, or a satellite). The terminal may be a mobile phone, a tablet computer (Pad), a computer having a wireless transceiver function, a virtual reality (VR) terminal device, an augmented reality (AR) terminal device, a wireless terminal in industrial control, a vehicle-mounted terminal device, a self driving wireless terminal, a wireless terminal in telemedicine (remote medical), a wireless terminal in a smart grid, a wireless terminal in transportation safety, a wireless terminal in a smart city, a wireless terminal in a smart home, a wearable terminal device, or the like. An application scenario is not limited in the embodiments of this application. The terminal sometimes may also be referred to as a terminal device, user equipment (UE), an access terminal device, a vehicle-mounted terminal, an industrial control terminal, a UE unit, a UE station, a mobile station, a remote station, a remote terminal device, a mobile device, a UE terminal device, a terminal device, a wireless communications device, a UE agent, a UE apparatus, or the like. The terminal may be fixed or movable.

With development of wireless communications systems, data transmission has higher requirements on latency and reliability. For example, in NR, ultra-reliable low-latency communication (URLLC) requires both ensuring 99.999% reliability and achieving a maximum latency of 1 millisecond (ms). To satisfy the foregoing requirements, a concept of coordinated multi-node sending is put forward. In this concept, a plurality of nodes may send data from a same transport block (TB) or coded block (CB). However, the foregoing concept causes data interference between the plurality of nodes. Consequently, both the reliability and the latency requirement that are of the data transmission cannot be ensured. Therefore, how to reduce data interference between the plurality of nodes in the coordinated multi-node sending and ensure the reliability and latency requirement of the data transmission is currently a problem to be urgently resolved.

According to the data sending method and the apparatus provided in the embodiments of this application, a resource set for sending data is configured, some resources in the resource set are determined, to-be-sent data is mapped based on the some resources, and the data is sent. This reduces interference in coordinated multi-node sending, thereby improving reliability and latency performance of the coordinated multi-node sending. FIG. 2C is used as an example. According to the embodiment described in the embodiments of this application, a same resource set is configured for two sending nodes. A sending node 1 communicates with a receiving node by using some resources in the resource set, and a sending node 2 communicates with the receiving node by using some resources that are in the resource set and different from those used by the sending node 1. In addition, the some resources used by the sending node 1 and the some resources used by the sending node 2 partially overlap, but the two sending nodes map and send same data or different redundancy versions of same data on the overlapping resources. The same data may also be understood as a same information bit sequence. The different redundancy versions of the same data may also be understood as different information bit sequences obtained by coding an information bit sequence to obtain one or more coded blocks, then intercepting information bits from different positions in the coded blocks or a coded block sequence, and using the intercepted information bits as start information bits. Because the same information bits are mapped to or the same information bit sequence is mapped to the partially overlapping resources, interference caused to the receiving node on the overlapping resources is reduced. It may be understood that the resource set shown in FIG. 2C may be understood as a second resource described in the embodiments of this application, and some resources shown in FIG. 2C may be understood as a first resource described in the embodiments of this application.

The following describes the technical solutions of this application in detail by using specific embodiments with reference to the accompanying drawings. The embodiments in this application may be independent of or may be combined with each other, and a same or similar concept or process may not be described again in some embodiments. It should be understood that a function explained in this application may be implemented by using an independent hardware circuit, software running in combination with a processor/microprocessor or a general-purpose computer, an application-specific integrated circuit, and/or one or more digital signal processors. When described as a method, this application may also be implemented by a computer processor and a memory coupled to the processor.

The resource in the embodiments of this application may include a time domain resource. For example, the resource includes at least one frame, at least one subframe, at least one slot, at least one mini-slot, or at least one time-domain symbol. The resource in the embodiments of this application may include a frequency domain resource. For example, the resource includes at least one carrier, at least one component carrier (CC), at least one bandwidth part (BWP), at least one resource block group (RBG), at least one physical resource block group (PRG), at least one resource block (RB), or at least one subcarrier (SC). The resource in the embodiments of this application may include a space domain resource. For example, the resource includes at least one beam, at least one port, at least one antenna port, or at least one layer/spatial layer. The resource in the embodiments of this application may include a code domain resource. For example, the resource includes at least one orthogonal cover code (OCC) or at least one non-orthogonal multiple access (NOMA) code.

Figure 2A:
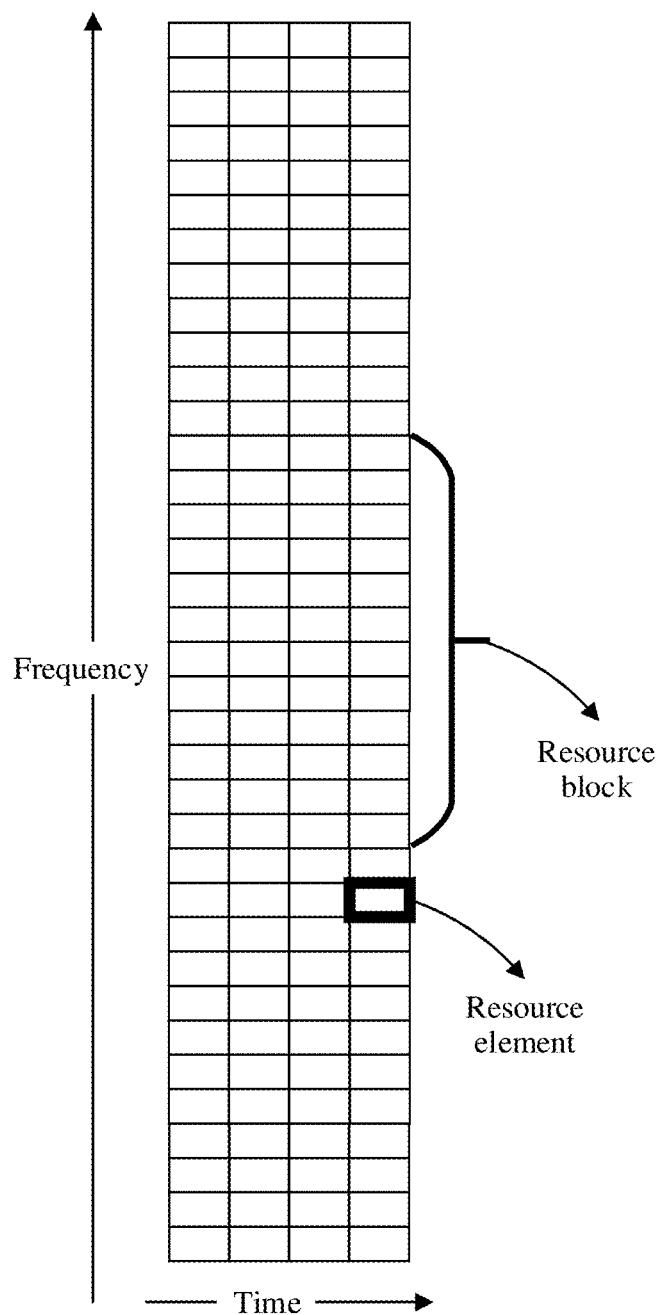
FIG. 2A is a schematic diagram of a time domain resource and a frequency domain resource.

For example, FIG. 2A is a schematic diagram of a time domain resource and a frequency domain resource. In FIG. 2A, a horizontal axis represents time (where FIG. 2A schematically shows four time-domain symbols in a time dimension), and a vertical axis represents frequency (where FIG. 2A schematically shows 36 subcarriers in a frequency dimension). For example, a small box of a minimum granularity in FIG. 2A represents a resource element (RE). The resource element includes one time-domain symbol in terms of time and one subcarrier in terms of frequency. For example, FIG. 2A further shows a resource block (RB) that includes 12 subcarriers in frequency domain.

Figure 2B:
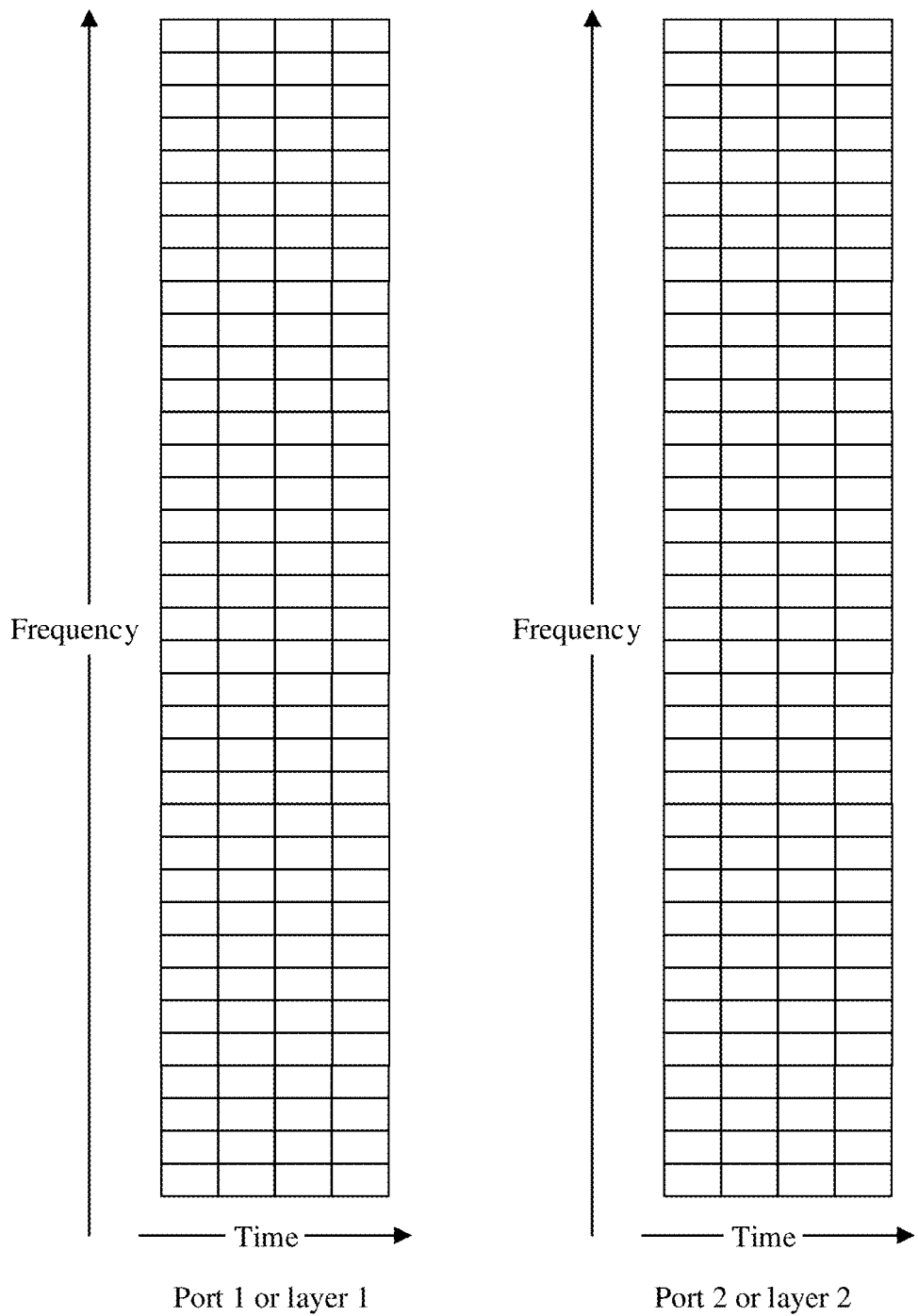
FIG. 2B is a schematic diagram of a time domain resource, a frequency domain resource, and a space domain resource.
Figure 2C:
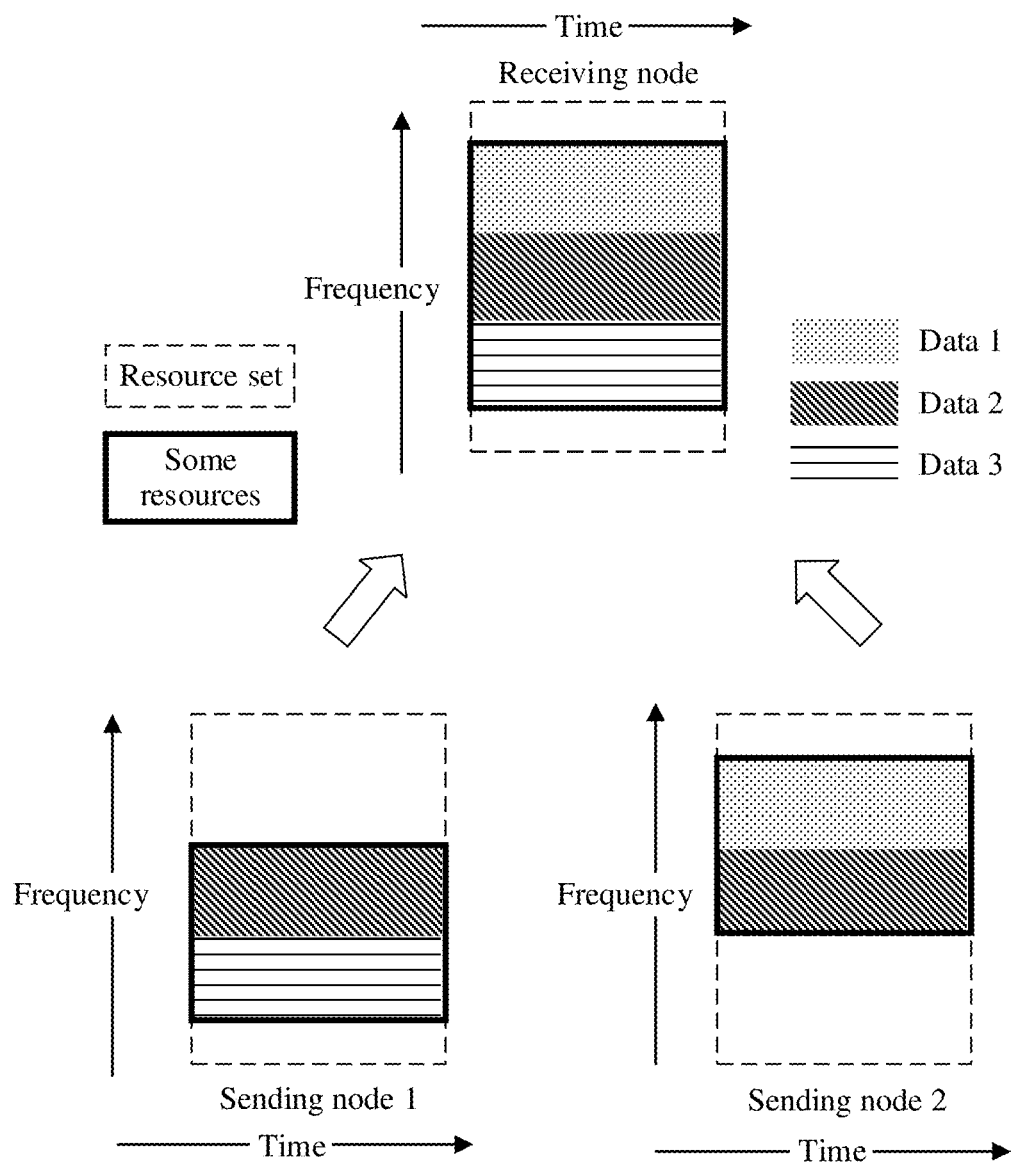
FIG. 2C is a schematic diagram of a data sending method according to this application.

For example, FIG. 2B is a schematic diagram of a time domain resource, a frequency domain resource, and a space domain resource. For the time domain resource and the frequency domain resource in FIG. 2B, refer to descriptions in FIG. 2A. For the space domain resource, schematically, two different spatial layers are respectively shown in a left drawing and a right drawing in FIG. 2B, and the two different spatial layers have a same time-frequency resource. Alternatively, it may be understood that two different ports/antenna ports are respectively shown in the left drawing and the right drawing in FIG. 2B, and the two different ports/antenna ports have a same time-frequency resource.

The resource in the embodiments of this application may further include a combination of the foregoing resource types. For example, the resource includes a time domain resource and a frequency domain resource, or the resource includes a time domain resource and a space domain resource, or the resource includes a frequency domain resource and a space domain resource, or the resource includes a time domain resource, a frequency domain resource, and a space domain resource. For the time domain resource, the frequency domain resource, and the space domain resource, refer to the foregoing descriptions of these resources. Details are not described herein again.

In the embodiments of this application, configurations of the foregoing resources are involved. A possible configuration manner is to perform configuration by using a semi-static message/semi-static information. For example, the foregoing resources are configured by using a radio resource control (RRC) message/RRC information or a media access control (MAC) message/MAC information. Another possible configuration manner is to perform configuration by using a dynamic message/dynamic information. For example, the foregoing resources are configured by using a physical layer message/physical layer information. Still another possible configuration manner is to perform configuration by using a semi-static message/semi-static information and a dynamic message/dynamic information. For example, the resources are configured by using an RRC message/RRC information and a physical layer message/physical layer information, or by using a MAC message/MAC information and a physical layer message/physical layer information.

According to the method for configuring the resources by using both the semi-static message/information and the dynamic message/information, different configuration effects may be achieved. In an embodiment, a set of the resources is configured by using a semi-static message/semi-static information, and one or more resources are further configured in the set of the resources by using a dynamic message/dynamic information, so that configuration overheads of the dynamic message can be reduced. In an embodiment, a resource that changes relatively slowly is configured by using a semi-static message/semi-static information, and a resource that changes relatively quickly is configured by using a dynamic message/dynamic information. For example, a time domain resource that is relatively fixed during data scheduling is configured by using a semi-static message/semi-static information, and a frequency domain resource whose channel condition continuously changes with time is configured by using a dynamic message/dynamic information, to obtain a compromise between configuration overheads and performance.

The resource in the embodiments of this application may alternatively be predefined. For example, the resource includes a predefined system bandwidth, CC, or BWP in frequency domain.

In an embodiment, the resource has a corresponding parameter, which may be referred to as a parameter of the resource. A specific type of the parameter of the resource includes one or more of the following: a pilot parameter, a precoding parameter, a redundancy version parameter, a mapping start point parameter, a coding parameter, a modulation parameter, a modulation and coding parameter, a power control parameter, an uplink/downlink configuration parameter, a frequency hopping parameter, a hybrid automatic repeat request (HARQ) parameter, a waveform parameter, a subcarrier spacing (SCS) parameter, or a cyclic prefix (CP) parameter.

The pilot parameter is used to determine a pilot used on the resource. For example, the pilot parameter includes a pilot sequence parameter, and the pilot sequence parameter is used to determine a pilot sequence used on the resource.

The precoding parameter is used to determine precoding used on the resource. For example, the precoding parameter includes an index of a precoding codebook, and the index of the precoding codebook is used to determine the precoding codebook used on the resource.

The redundancy version parameter is used to determine a redundancy version used on the resource. For example, the redundancy version parameter includes an index of a redundancy version, and the index of the redundancy version is used to determine the redundancy version used on the resource.

The mapping start point parameter is used to determine a mapping start point of data on the resource. For example, the mapping start point parameter includes an index or identifier of the mapping start point, and the index or identifier of the mapping start point is used to determine the mapping start point of the data on the resource.

The coding parameter is used to determine a coding scheme used on the resource. For example, the coding parameter includes a code rate, and the code rate is used to determine a code rate used for the data mapped to the resource. The modulation parameter is used to determine a modulation scheme used on the resource. For example, the modulation parameter includes a modulation order, and the modulation order is used to determine a modulation scheme used for the data mapped to the resource. It may be understood that the coding parameter and the modulation parameter may alternatively be combined to obtain a modulation and coding parameter (for example, a modulation and coding scheme (MCS)).

The power control parameter is used to determine power used on the resource. For example, the power control parameter includes a closed-loop power control parameter (for example, a sending power control command). For example, the power parameter includes an open-loop power control parameter (for example, expected received power and a path loss compensation factor).

The uplink/downlink configuration parameter is used to determine an uplink/downlink configuration of the resource, for example, resources used for uplink transmission, such as uplink slots or uplink symbols, resources used for downlink transmission, such as downlink slots or downlink symbols, or resources used as flexible resources, such as flexible slots or flexible symbols.

The frequency hopping parameter is used to determine a frequency hopping mode used on the resource. For example, the frequency hopping parameter includes a frequency hopping mode in frequency domain, and is used to determine a frequency hopping mode of the resource in frequency domain. The frequency hopping mode may also be understood as a method for determining another frequency domain resource based on a frequency domain resource.

The HARQ parameter is used to determine information related to a HARQ used on the resource. For example, the HARQ parameter includes a HARQ process, and is used to determine the HARQ process used on the resource.

The waveform parameter is used to determine a waveform used on the resource. For example, the waveform parameter is used to indicate whether the waveform used on the resource is a single-carrier waveform or a multi-carrier waveform.

The SCS parameter is used to determine an SCS used on the resource. For example, the SCS parameter is used to indicate that an SCS used on the resource is 15 kHz, 30 kHz, 60 kHz, 120 kHz, 240 kHz, or 480 kHz.

The CP parameter is used to determine a CP used on the resource. For example, the CP parameter is used to indicate that a CP used on the resource is a normal CP (NCP) or an extended CP (ECP).

Figure 3:
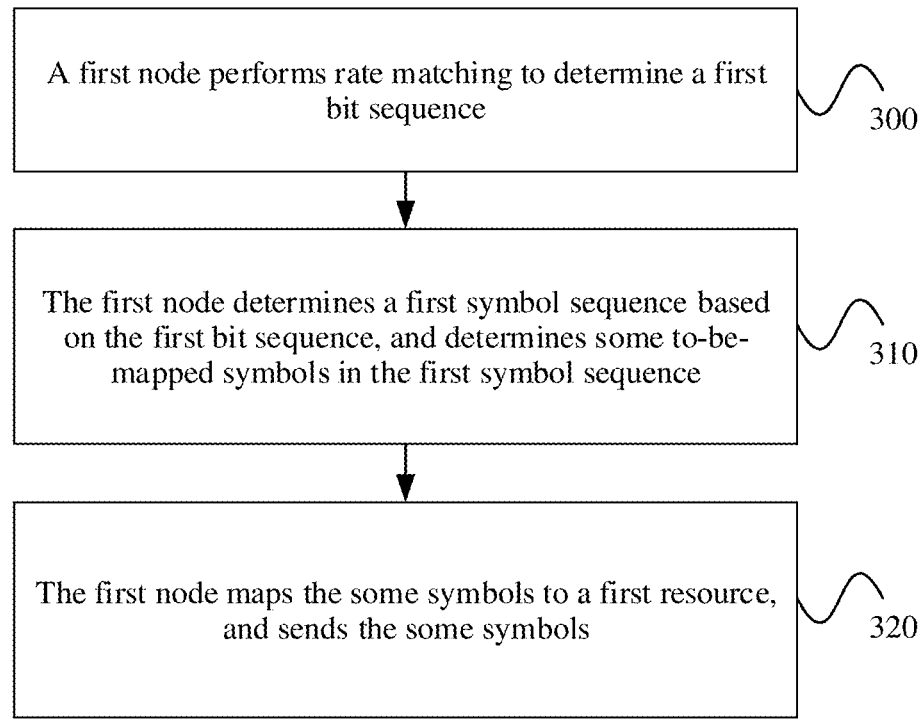
FIG. 3 is a flowchart of a first type of data sending according to an embodiment of this application.

FIG. 3 is a schematic flowchart of a data sending method according to an embodiment of this application. As shown in FIG. 3, the method in this embodiment may include the following parts.

Part 300: A first node performs rate matching to determine a first bit sequence.

Part 310: The first node determines a first symbol sequence based on the first bit sequence, and determines some to-be-mapped symbols in the first symbol sequence.

Part 320: The first node maps the symbols to a first resource, and sends the symbols.

It may be understood that the first node in part 300, part 310, and part 320 may be a terminal or a network device.

Figure 4A:
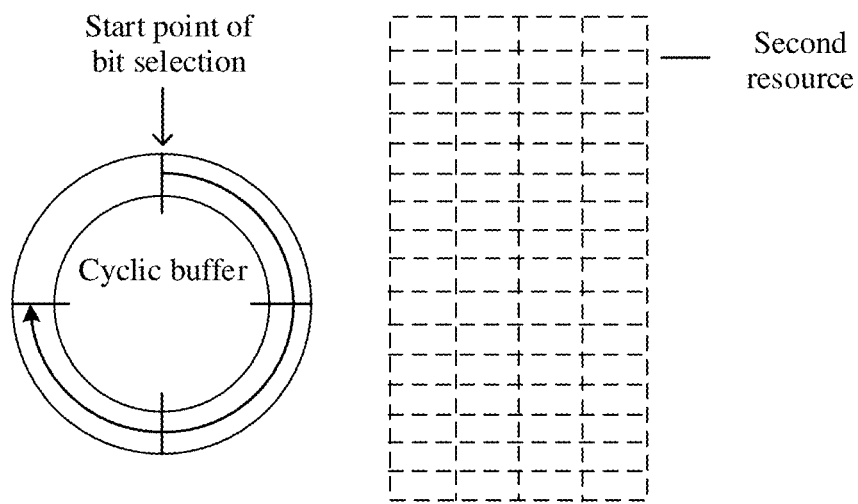
FIG. 4A is a schematic diagram of a first type of rate matching or bit selection according to an embodiment of this application.

In an embodiment of part 300, the first node performs bit selection or the rate matching based on a size of the second resource, to determine the first bit sequence. FIG. 4A is used as an example. A left diagram in FIG. 4A shows a cyclic buffer in which data bits are stored. A right diagram in FIG. 4A shows a second resource identified by dashed lines. For example, the second resource includes a time domain resource and a frequency domain resource, and includes M REs. It may be understood that the size of the second resource is M. In other words, a maximum of M modulation symbols can be mapped to the second resource. The M modulation symbols correspond to N bits. For example, a modulation order is Qm. In this case, N satisfies N=M*Qm. The first node may determine, based on M, a quantity N of bits that need to be extracted from the cyclic buffer, and the N bits are the first bit sequence. In an embodiment, a start point of the bit selection may be configured by a control node or predefined, and the first node extracts N bits from the cyclic buffer based on the start point of the bit selection and the quantity N of bits. It should be noted that the control node in this application may be a network device or a terminal. For example, in FIG. 4A, the start point of the bit selection is a 12 o'clock position of the cyclic buffer, and 4*N/3 bits are stored in the cyclic buffer. In this case, the first node selects N bits clockwise from the 12 o'clock position of the cyclic buffer to a 9 o'clock position of the cyclic buffer, and the N bits are the first bit sequence.

Figure 4B:
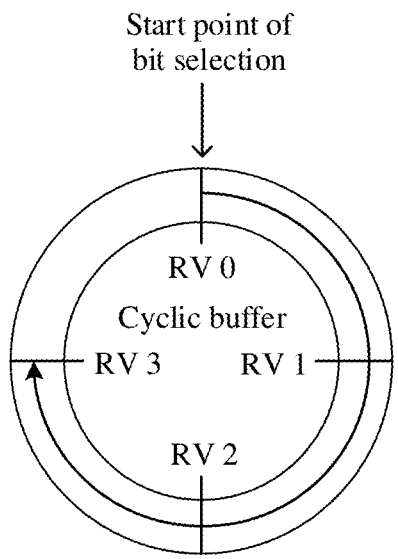
FIG. 4B is a schematic diagram of a second type of rate matching or bit selection according to an embodiment of this application.
Figure 4B:
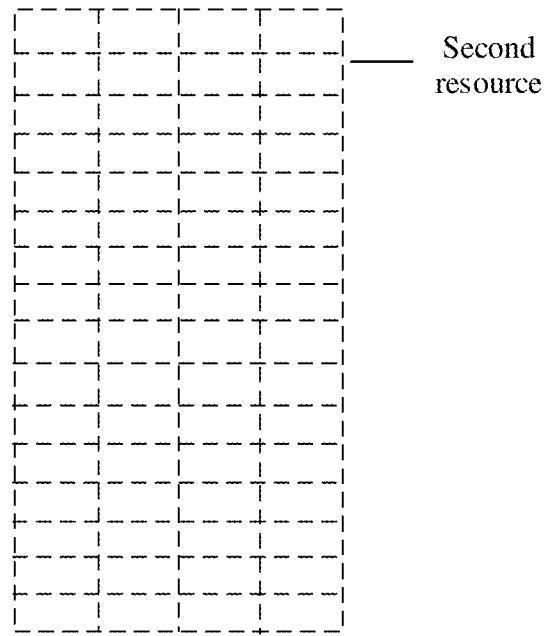

In an embodiment of part 300, the first node performs bit selection or the rate matching based on a size of the second resource and a redundancy version (RV), to determine the first bit sequence. FIG. 4B is used as an example. A left diagram in FIG. 4B shows a cyclic buffer in which data bits are stored, and also shows positions of different RVs in the cyclic buffer (for example, RV 0: 12 o'clock position of the cyclic buffer; RV 1: 3 o'clock position of the cyclic buffer; RV 2: 6 o'clock position of the cyclic buffer; RV 3: 9 o'clock position of the cyclic buffer). A right diagram in FIG. 4B shows a second resource identified by dashed lines. For example, the second resource includes a time domain resource and a frequency domain resource, and includes M REs. It may be understood that the size of the second resource is M. In other words, a maximum of M modulation symbols can be mapped to the second resource. The M modulation symbols correspond to N bits. For example, a modulation order is Qm. In this case, N satisfies N=M*Qm. The first node may determine, based on M, a quantity N of bits that need to be extracted from the cyclic buffer, and the N bits are the first bit sequence. The first node extracts the N bits from the cyclic buffer based on the RV and the quantity N of bits. For example, in FIG. 4B, the RV is RV 0, and 4*N/3 bits are stored in the cyclic buffer. In this case, the first node selects N bits clockwise from the 12 o'clock position of the cyclic buffer to the 9 o'clock position of the cyclic buffer, and the N bits are the first bit sequence. It may be understood that the foregoing specific RV (for example, RV 0 in the foregoing example) may be predefined, or may be notified by the control node to the first node. The foregoing quantity of RVs is merely an example, and a specific quantity of RVs is not limited in this embodiment of this application.

Figure 4C:
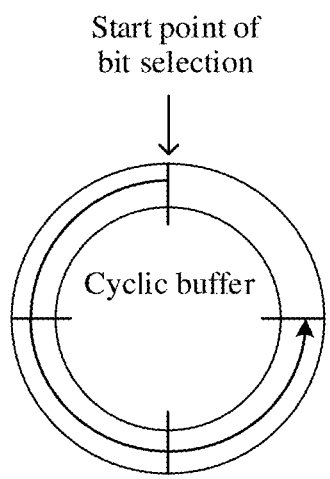
FIG. 4C is a schematic diagram of a third type of rate matching or bit selection according to an embodiment of this application.
Figure 4C:
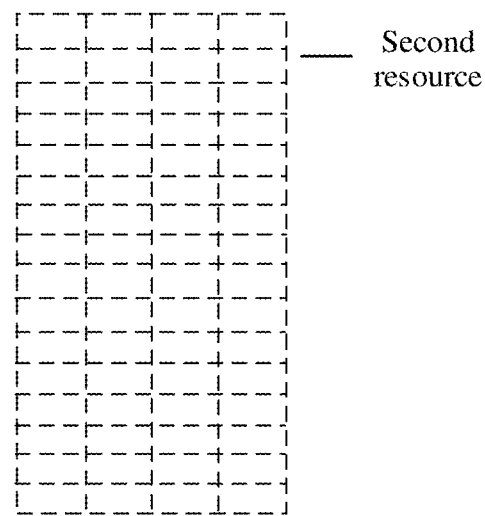
Figure 4D:
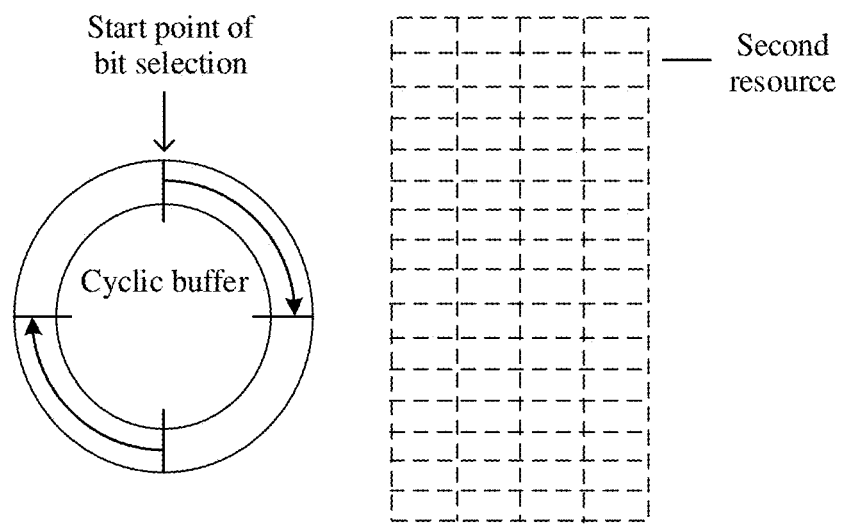
FIG. 4D is a schematic diagram of a fourth type of rate matching or bit selection according to an embodiment of this application.

It may be understood that although performing the bit selection clockwise in the cyclic buffer is described in FIG. 4A and FIG. 4B, another manner in which the bit selection is performed in the cyclic buffer is not limited in this embodiment of this application. FIG. 4C is used as an example. In an embodiment, the bit selection may be performed counterclockwise in a cyclic buffer. FIG. 4D is used as an example. In an embodiment, the bit selection may not be performed in the cyclic buffer to select continuous bits, but performed in the cyclic buffer to select discontinuous bits. In the foregoing examples, the cyclic buffer is used as an example to describe a process of the rate matching or bit selection. However, it may be understood that, in the embodiments of this application, a buffer for the rate matching or bit selection may have another type of structure (for example, an array, a queue, a container, a stack, a linear table, a pointer, a linked list, a tree, a graph, a structure, a class, a pile, or a hash table).

It may be understood that the size of the second resource is shown in only two dimensions: a time domain dimension and a frequency domain dimension. If the second resource further includes a resource in another dimension (for example, a space domain dimension or a code domain dimension), the size of the second resource further needs to include the resource in the another dimension. It may be understood that there may be one or more second resources. It may be understood that the second resource may be configured for a plurality of first nodes.

In an embodiment, the first node determines the second resource. In an embodiment, the first node receives fifth information from the control node, and determines the second resource based on the fifth information. In an embodiment, the fifth information may be included in a physical layer message. The physical layer message may be, for example, downlink control information (DCI) from the network device, or may be, for example, sidelink control information (SCI) from the terminal. The first node receives the physical layer message to obtain the second resource. In an embodiment, the fifth information may be included in a higher layer message. The higher layer message may be, for example, a MAC layer message or an RRC layer message from the network device. The first node receives the higher layer message to obtain the second resource. It may be understood that the fifth information may alternatively be included in a physical layer message and a higher layer message. For example, the first node receives the higher layer message to obtain a plurality of candidate second resources, and receives the physical layer message to determine the second resource in the plurality of candidate second resources. In an embodiment, the fifth information is group common information. In an embodiment, group common information including the fifth information is carried on a group common physical downlink control channel (GC-PDCCH). In an embodiment, group common information including the fifth information is included in a higher layer message (for example, a system message). It may be understood that the second resource may be configured for a plurality of first nodes.

In an embodiment, the second resource includes one or more sub-resources. The sub-resources may include one or more of a time domain resource, a frequency domain resource, a space domain resource, or a code domain resource. For details of the foregoing various resources, refer to the foregoing descriptions of the resources.

Figure 5A:
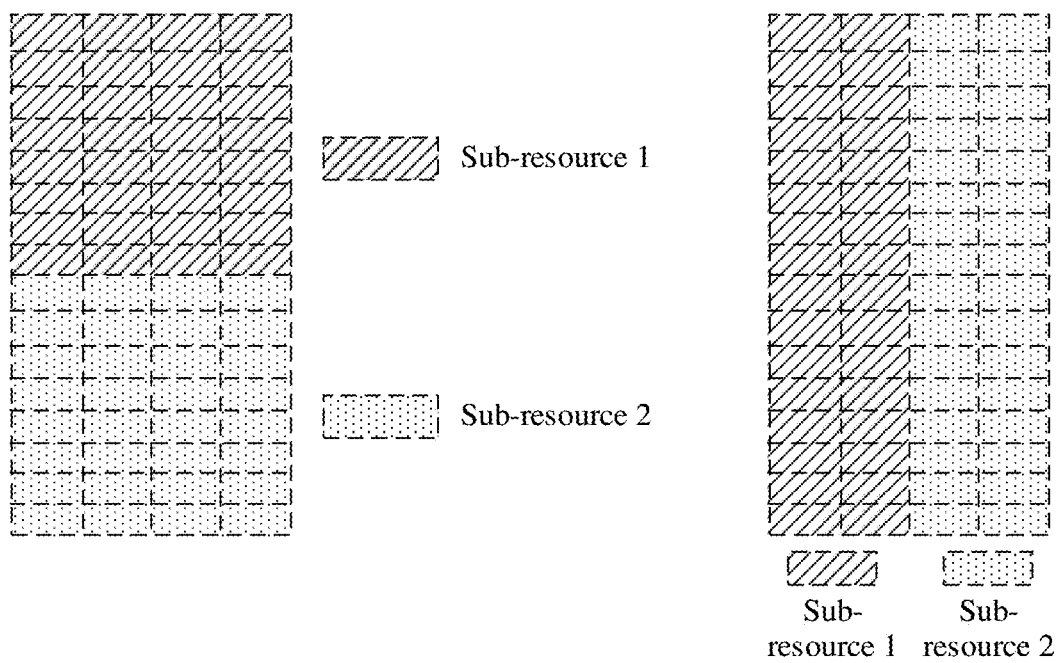
FIG. 5A is a schematic diagram of a first type of sub-resources according to an embodiment of this application.

FIG. 5A is used as an example, and shows that the second resource includes two sub-resources of a same size. For example, the second resource includes 16 subcarriers in frequency domain, and four time-domain symbols in time domain. A left diagram in FIG. 5A shows that the second resource includes two sub-resources obtained through division in frequency domain, and sizes of the two sub-resources are the same in frequency domain. For example, in the left diagram in FIG. 5A, a sub-resource 1 and a sub-resource 2 each include eight subcarriers in frequency domain. A right diagram in FIG. 5A shows that the second resource includes two sub-resources obtained through division in time domain, and sizes of the two sub-resources are the same in time domain. For example, in the right diagram in FIG. 5A, a sub-resource 1 and a sub-resource 2 each include two time-domain symbols in time domain.

Figure 5B:
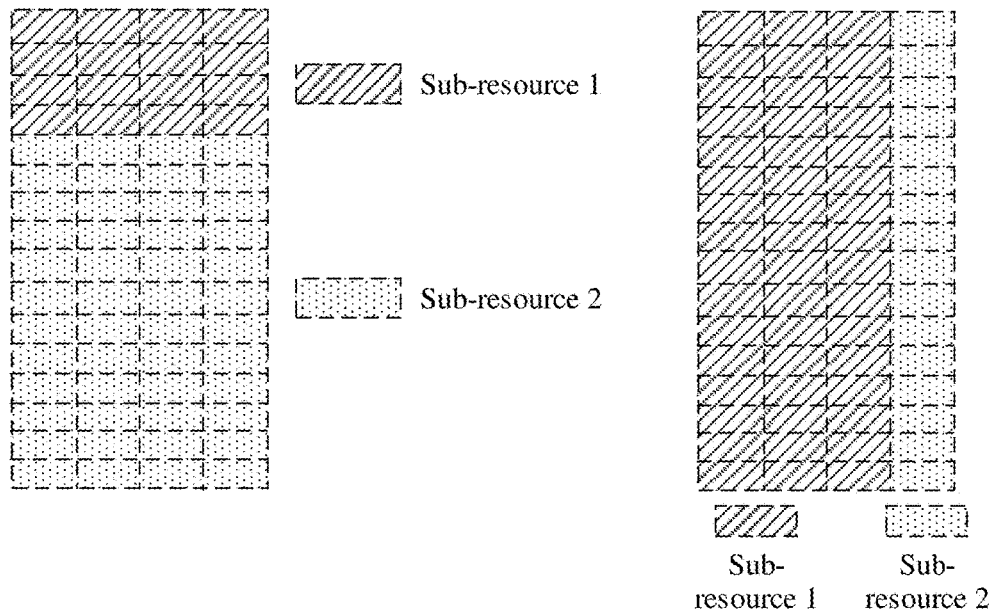
FIG. 5B is a schematic diagram of a second type of sub-resources according to an embodiment of this application.

FIG. 5B is used as an example, and shows that the second resource includes two sub-resources of different sizes. For example, the second resource includes 16 subcarriers in frequency domain, and four time-domain symbols in time domain. A left diagram in FIG. 5B shows that the second resource includes two sub-resources obtained through division in frequency domain, and sizes of the two sub-resources are different in frequency domain. For example, in the left diagram in FIG. 5B, in frequency domain, a sub-resource 1 include four subcarriers, and a sub-resource 2 includes 12 subcarriers. A right diagram in FIG. 5B shows that the second resource includes two sub-resources obtained through division in time domain, and sizes of the two sub-resources are different in time domain. For example, in the right diagram in FIG. 5B, in time domain, a sub-resource 1 includes three time-domain symbols, and a sub-resource 2 includes one time-domain symbol.

Figure 5C:
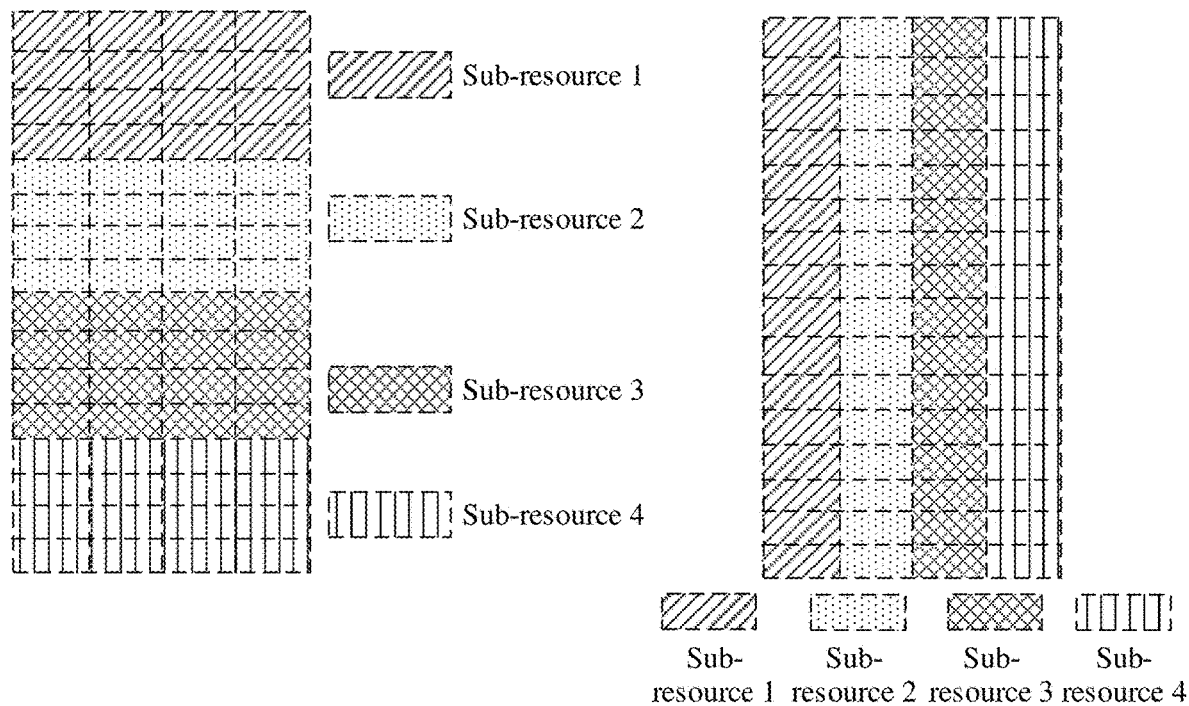
FIG. 5C is a schematic diagram of a third type of sub-resources according to an embodiment of this application.

It may be understood that a quantity of sub-resources in the second resource is not limited in this embodiment of this application. FIG. 5C is used as an example, and shows that the second resource includes four sub-resources. A left diagram in FIG. 5C shows that the second resource includes four sub-resources obtained through division in frequency domain, and a right diagram in FIG. 5C shows that the second resource includes four sub-resources obtained through division in time domain.

Figure 5D:
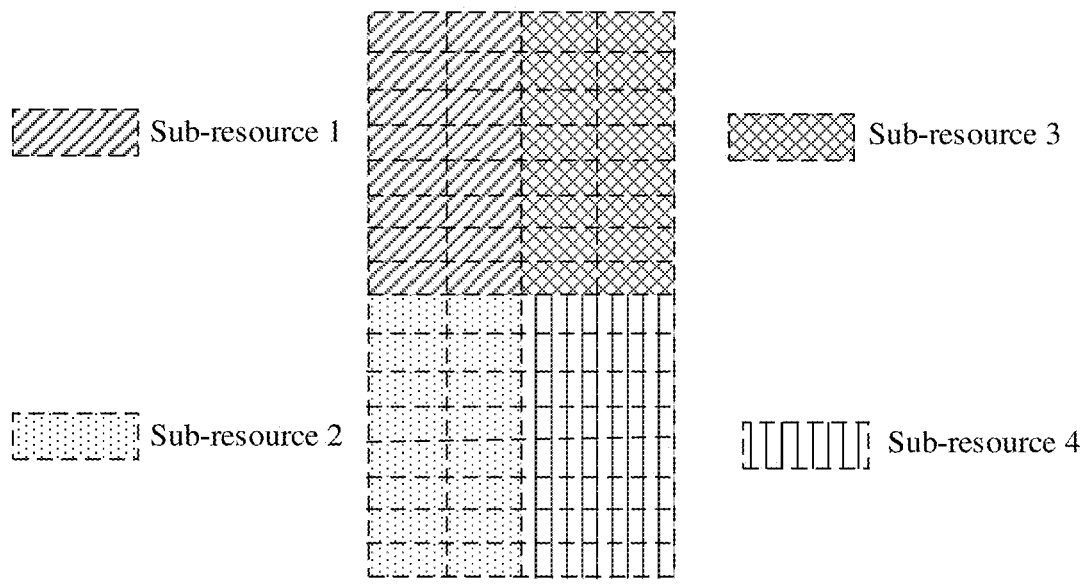
FIG. 5D is a schematic diagram of a fourth type of sub-resources according to an embodiment of this application.

It may be understood that, in the embodiments of this application, it is not specified that the foregoing sub-resources are divided only in a single dimension (for example, division performed only in frequency domain or division performed only in time domain). FIG. 5D is used as an example, and shows that the second resource includes four sub-resources obtained through division in time domain and frequency domain.

In an embodiment, a size of the sub-resource is related to one or more of the following: a size of resource block bundling (RB bundling), a size of a mini-slot, a size of a slot, a quantity of beams, a quantity of spatial layers, the size of the second resource, a transport block size (TBS) parameter, a bit rate parameter, or an MCS parameter.

In an embodiment, the size of the sub-resource in frequency domain is equal to a size of the RB bundling, and the size of the RB bundling may be understood as a quantity of bundled resource blocks. For example, if the size of the RB bundling is 2, the size of the sub-resource in frequency domain is two RBs. For example, if the size of the RB bundling is 4, the size of the sub-resource in frequency domain is four RBs.

In an embodiment, a size of the sub-resource in frequency domain is determined by a reference size of the RB bundling and a frequency domain scaling factor. The frequency domain scaling factor represents a proportional relationship between the size of the sub-resource and the reference size of the RB bundling in frequency domain. For example, if the reference size of the RB bundling is 2 and the frequency domain scaling factor is 4, the size of the sub-resource in frequency domain is eight RBs. For another example, if the reference size of the RB bundling is 4 and the frequency domain scaling factor is ½, the size of the sub-resource in frequency domain is two RBs. It may be understood that the reference size of the RB bundling and the frequency domain scaling factor may be obtained by the first node in a predefined or default manner, or may be obtained by the first node via a physical layer message and/or a higher layer message.

It may be understood that the size of the RB bundling may also be understood as a size of a physical resource block group (PRG) or a size of a resource block group (RBG).

In an embodiment, the size of the sub-resource in time domain is equal to one time-domain symbol, a plurality of time-domain symbols, one mini-slot, a plurality of mini-slots, one slot, a plurality of slots, one subframe, a plurality of subframes, one frame, or a plurality of frames. For example, in the right diagram in FIG. 5A, the sizes of the sub-resources 1 and 2 in time domain are both equal to two time-domain symbols. For another example, in the right diagram in FIG. 5C, the sizes of the sub-resources 1, 2, 3, and 4 in time domain are each equal to one time-domain symbol.

In an embodiment, the size of the sub-resource in time domain is a predefined or default size of the time domain resource, and the first node obtains the size of the sub-resource in time domain based on the predefined or default size of the time domain resource.

In an embodiment, the first node obtains the size of the sub-resource in time domain based on a reference size of the time domain resource and a time domain scaling factor. The time domain scaling factor represents a proportional relationship between the size of the sub-resource and the reference size of the time domain resource in time domain. For example, if the reference size of the time domain resource is one time-domain symbol and the time domain scaling factor is 2, the first node may determine that the size of the sub-resource in time domain is two time-domain symbols. For another example, if the reference size of the time domain resource is eight time-domain symbols and the time domain scaling factor is ½, the first node may determine that the size of the sub-resource in time domain is four time-domain symbols. It may be understood that the reference size of the time domain resource and the time domain scaling factor may be obtained by the first node in a predefined or default manner, or may be obtained by the first node via a physical layer message and/or a higher layer message.

In an embodiment, the size of the sub-resource in space domain is determined by the quantity of beams or the quantity of spatial layers.

For example, the size of the sub-resource in space domain is equal to the quantity of beams or the quantity of spatial layers.

For another example, the size of the sub-resource in space domain is determined by a reference quantity of beams and a space domain scaling factor. The space domain scaling factor represents a proportional relationship between the size of the sub-resource and the reference quantity of beams in space domain. For example, if the reference quantity of beams is 2 and the space domain scaling factor is 4, the size of the sub-resource in space domain is 8. For another example, if the reference quantity of beams is 4 and the space domain scaling factor is ½, the size of the sub-resource in space domain is 2. It may be understood that the reference quantity of beams and the space domain scaling factor may be obtained by the first node in a predefined or default manner, or may be obtained by the first node via a physical layer message and/or a higher layer message.

For still another example, the size of the sub-resource in space domain is determined by a reference quantity of spatial layers and a space domain scaling factor. The space domain scaling factor represents a proportional relationship between the size of the sub-resource and the reference quantity of spatial layers in space domain. For example, if the reference quantity of spatial layers is 4 and the space domain scaling factor is 2, the size of the sub-resource in space domain is 8. For another example, if the reference quantity of spatial layers is 4 and the space domain scaling factor is ½, the size of the sub-resource in space domain is 2. It may be understood that the reference quantity of spatial layers and the space domain scaling factor may be obtained by the first node in a predefined or default manner, or may be obtained by the first node via a physical layer message and/or a higher layer message.

In an embodiment, the size of the sub-resource is related to the size of the second resource.

In an embodiment, the size of the sub-resource in frequency domain is determined by the size of the second resource in frequency domain and a parameter Kf. The parameter Kf indicates a quantity of sub-resources included in the second resource in frequency domain. The left diagram in FIG. 5A is used as an example. If the size of the second resource in frequency domain is 16 subcarriers, the parameter Kf is 2, and sizes of the two sub-resources in frequency domain are the same, it may be determined that the sizes of the two sub-resources in frequency domain are both eight subcarriers. The left diagram in FIG. 5C is used as an example. If the size of the second resource in frequency domain is 16 subcarriers, the parameter Kf is 4, and sizes of the four sub-resources in frequency domain are the same, it may be determined that the sizes of the four sub-resources in frequency domain are each four subcarriers. The left diagram in FIG. 5B is used as an example. If the size of the second resource in frequency domain is 16 subcarriers, the parameter Kf is 2, sizes of the two sub-resources in frequency domain are different, and a ratio of the size of one sub-resource to the size of the other sub-resource in frequency domain is 1:3, it may be determined that the size of the sub-resource in frequency domain is four subcarriers and the size of the other sub-resource in frequency domain is 12 subcarriers. In an embodiment, the parameter Kf may be obtained by the first node in a predefined or default manner, or may be obtained by the first node via a physical layer message and/or a higher layer message. In an embodiment, if the second resource is shared by the plurality of first nodes, the parameter Kf may be equal to a quantity of the plurality of first nodes.

In an embodiment, the size of the sub-resource in time domain is determined by the size of the second resource in time domain and a parameter Kt. The parameter Kt indicates a quantity of sub-resources included in the second resource in time domain. The right diagram in FIG. 5A is used as an example. If the size of the second resource in time domain is four time-domain symbols, the parameter Kt is 2, and sizes of the two sub-resources in time domain are the same, it may be determined that the sizes of the two sub-resources in time domain are both two time-domain symbols. The right diagram in FIG. 5C is used as an example. If the size of the second resource in time domain is four time-domain symbols, the parameter Kt is 4, and sizes of the four sub-resources in time domain are the same, it may be determined that the sizes of the four sub-resources in time domain are each one time-domain symbol. The right diagram in FIG. 5B is used as an example. If the size of the second resource in time domain is four time-domain symbols, the parameter Kt is 2, sizes of the two sub-resources in time domain are different, and a ratio of the size of one sub-resource to the size of the other sub-resource in time domain is 3:1, it may be determined that the size of the sub-resource in time domain is three time-domain symbols and the size of the other sub-resource in time domain is one time-domain symbol. In an embodiment, the parameter Kt may be obtained by the first node in a predefined or default manner, or may be obtained by the first node via a physical layer message and/or a higher layer message. In an embodiment, if the second resource is shared by the plurality of first nodes, the parameter Kt may be equal to a quantity of the plurality of first nodes.

In an embodiment, the size of the sub-resource in space domain is determined by the size of the second resource in space domain and a parameter Ks. The parameter Ks indicates a quantity of sub-resources included in the second resource in space domain. For example, if the size of the second resource in time domain is four beams or four spatial layers, the parameter Ks is 2, and sizes of the two sub-resources in space domain are the same, it may be determined that the sizes of the two sub-resources in space domain are both two beams or two spatial layers. For another example, if the size of the second resource in space domain is four beams or four spatial layers, the parameter Ks is 2, sizes of the two sub-resources in space domain are different, and a ratio of the size of one sub-resource to the size of the other sub-resource in space domain is 3:1, it may be determined that the size of the sub-resource in space domain is three beams or three spatial layers and the size of the other sub-resource in space domain is one beam or one spatial layer. In an embodiment, the parameter Ks may be obtained by the first node in a predefined or default manner, or may be obtained by the first node via a physical layer message and/or a higher layer message. In an embodiment, if the second resource is shared by the plurality of first nodes, the parameter Ks may be equal to a quantity of the plurality of first nodes.

In an embodiment, the size of the sub-resource is determined by the TBS. In an embodiment, for example, if a TBS of to-be-transmitted data is Ntb and a modulation scheme of the to-be-transmitted data is Qm, the size of the sub-resource is greater than or equal to Ntb/Qm. In an embodiment, all system bits of a to-be-transmitted block may be included in one sub-resource, thereby ensuring that data on the sub-resource can be self-decoded, and improving robustness of data transmission.

In an embodiment, the size of the sub-resource is determined by the bit rate parameter. In an embodiment, if the size of the second resource is M and the bit rate parameter is CR, the size of the sub-resource is greater than or equal to M*CR. In an embodiment, it may be ensured that a bit rate in the sub-resource does not exceed 1, so that the sub-resource can completely include all system bits, thereby enabling self-decoding of the data on the sub-resource, and improving robustness of data transmission.

In an embodiment, the size of the sub-resource is determined by the MCS parameter. In an embodiment, if the size of the second resource is M and a bit rate corresponding to the MCS parameter is CR, the size of the sub-resource is greater than or equal to M*CR. In an embodiment, it may be ensured that a bit rate in the sub-resource does not exceed 1, so that the sub-resource can completely include all system bits, thereby enabling self-decoding of the data on the sub-resource, and improving robustness of data transmission.

In an embodiment, the sub-resource has a corresponding parameter, which may be referred to as a parameter of the sub-resource. For a specific type of the parameter of the sub-resource, refer to the foregoing specific types of the parameters of the resource. Details are not described herein again.

In an embodiment, the first node determines the parameter of the sub-resource.

In an embodiment, the parameter of the sub-resource is related to a parameter of the second resource, and the first node determines the parameter of the sub-resource based on the parameter of the second resource. For example, a unified parameter of the second resource may be configured, and the first node determines the parameter of the sub-resource based on a position of the sub-resource in the second resource. A precoding parameter is used as an example. A unified precoding parameter or a unified precoding parameter pattern may be configured for the second resource, and the first node determines a precoding parameter of the sub-resource based on a position of the sub-resource in the second resource.

Figure 6A:
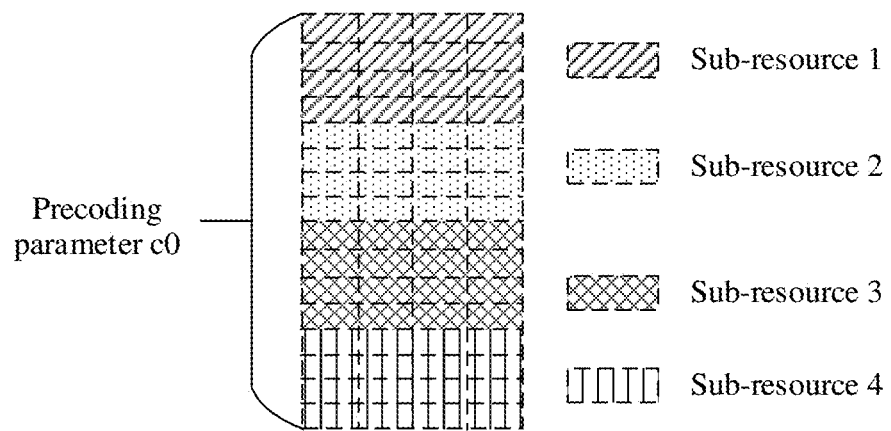
FIG. 6A is a schematic diagram of a parameter of a first type of sub-resources according to an embodiment of this application.

FIG. 6A is used as an example, and shows that the second resource includes four sub-resources that are obtained through division in frequency domain and that have a same size. The second resource includes 16 subcarriers in frequency domain, and includes four time-domain symbols in time domain. A unified precoding parameter c0 is configured for the second resource. The first node may determine a precoding parameter of an allocated sub-resource based on a correspondence shown in Table 1.

TABLE 1

| Sub-resource 1 | Sub-resource 2 | Sub-resource 3 | Sub-resource 4 |
|---|---|---|---|
| Precoding parameter c0 | Precoding parameter c0 | Precoding parameter c0 | Precoding parameter c0 |

Figure 6B:
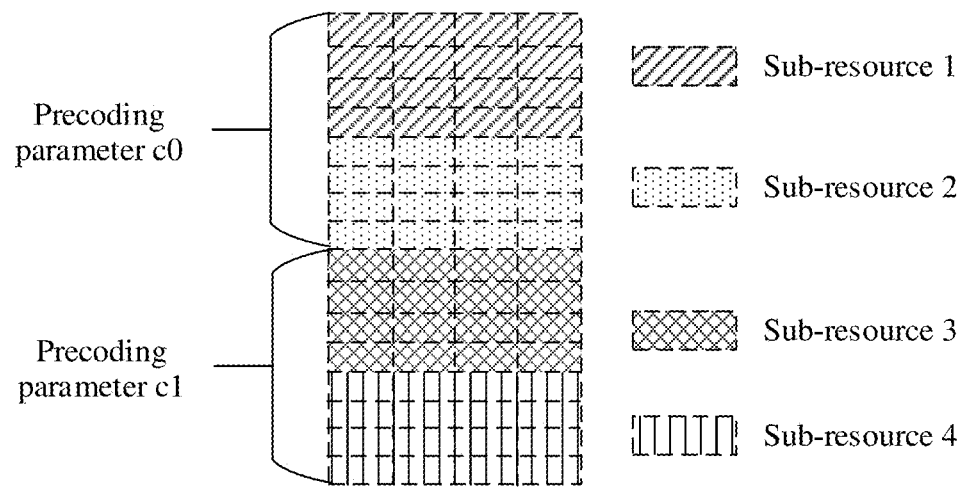
FIG. 6B is a schematic diagram of parameters of a second type of sub-resources according to an embodiment of this application.

FIG. 6B is used as an example. A unified precoding parameter pattern {precoding parameter c0, precoding parameter c1} shown in FIG. 6B is configured for the second resource. The first node may determine a precoding parameter of an allocated sub-resource based on a correspondence shown in Table 2.

TABLE 2

| Sub-resource 1 | Sub-resource 2 | Sub-resource 3 | Sub-resource 4 |
|---|---|---|---|
| Precoding parameter c0 | Precoding parameter c0 | Precoding parameter c1 | Precoding parameter c1 |

Figure 6C:
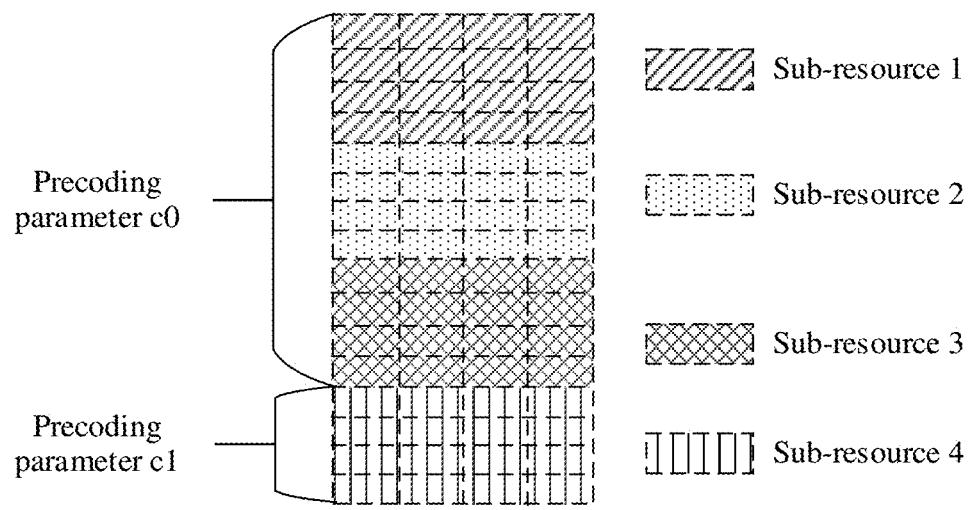
FIG. 6C is a schematic diagram of parameters of a third type of sub-resources according to an embodiment of this application.

FIG. 6C is used as an example. A unified precoding parameter pattern {precoding parameter c0, precoding parameter c1} shown in FIG. 6C is configured for the second resource. The first node may determine a precoding parameter of an allocated sub-resource based on a correspondence shown in Table 3.

TABLE 3

| Sub-resource 1 | Sub-resource 2 | Sub-resource 3 | Sub-resource 4 |
|---|---|---|---|
| Precoding parameter c0 | Precoding parameter c0 | Precoding parameter c0 | Precoding parameter c1 |

Figure 6D:
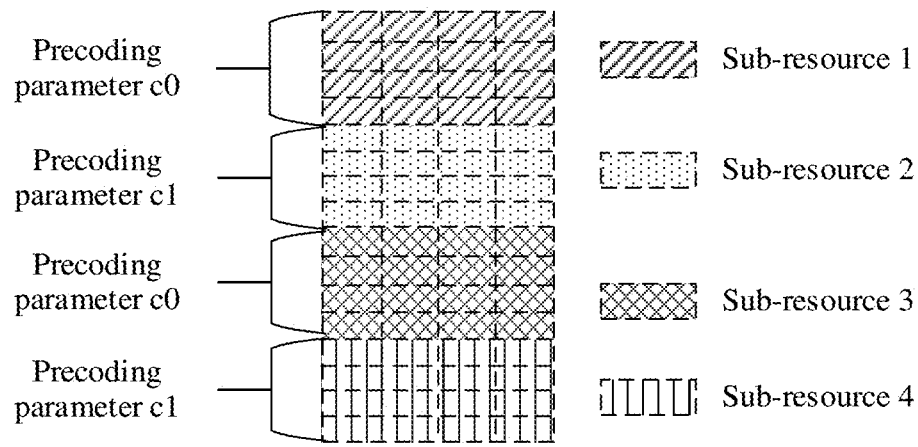
FIG. 6D is a schematic diagram of parameters of a fourth type of sub-resources according to an embodiment of this application.

FIG. 6D is used as an example. A unified precoding parameter pattern {precoding parameter c0, precoding parameter c1, precoding parameter c0, precoding parameter c1} shown in FIG. 6D is configured for the second resource. The first node may determine a precoding parameter of an allocated sub-resource based on a correspondence shown in Table 4.

TABLE 4

| Sub-resource 1 | Sub-resource 2 | Sub-resource 3 | Sub-resource 4 |
|---|---|---|---|
| Precoding parameter c0 | Precoding parameter c1 | Precoding parameter c0 | Precoding parameter c1 |

Figure 6E:
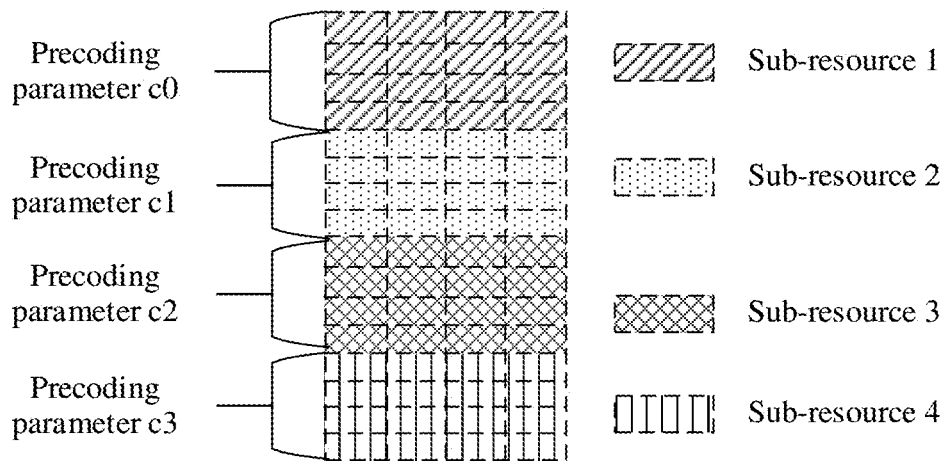
FIG. 6E is a schematic diagram of parameters of a fifth type of sub-resources according to an embodiment of this application.

FIG. 6E is used as an example. A unified precoding parameter pattern {precoding parameter c0, precoding parameter c1, precoding parameter c2, precoding parameter c3} shown in FIG. 6E is configured for the second resource. The first node may determine a precoding parameter of an allocated sub-resource based on a correspondence shown in Table 5.

TABLE 5

| Sub-resource 1 | Sub-resource 2 | Sub-resource 3 | Sub-resource 4 |
|---|---|---|---|
| Precoding parameter c0 | Precoding parameter c0 | Precoding parameter c2 | Precoding parameter c3 |

It may be understood that, in the foregoing examples, quantities of the precoding parameters, arrangements of the precoding parameter patterns, quantities of the sub-resources, sizes of the sub-resources, sizes of the second resources, and the like are merely used as examples. This is not limited in this embodiment of this application.

It may be understood that, in the foregoing descriptions, only division of sub-resources in a frequency domain dimension is used as an example to describe the embodiment in which the parameter of the sub-resource is related to the parameter of the second resource. The embodiment is also applicable to division of sub-resources in another resource dimension (for example, in time domain, space domain, or code domain). It may be understood that this embodiment is also applicable to division of sub-resources in a combination of various resource dimensions (for example, a combination of time domain and frequency domain, or a combination of time domain, frequency domain, and space domain).

It may be understood that, in the embodiment in which the parameter of the sub-resource is related to the parameter of the second resource, a specific embodiment of another type of parameter of the sub-resource is similar to the precoding parameter in the foregoing example, and details are not described herein again.

In an embodiment, the first node determines the parameter of the sub-resource based on third information from the control node and/or predefined parameter information of the sub-resource. The third information from the control node and/or the predefined parameter information of the sub-resource may also be understood as a parameter of the sub-resource dedicated to a configuration of the sub-resource.

For example, the first node may determine the parameter of the sub-resource based on the third information from the control node. The control node may be a network device or a terminal. In an embodiment, the third information may be included in a physical layer message. The physical layer message may be, for example, DCI from the network device, or may be, for example, SCI from the terminal. The first node receives the physical layer message to obtain the parameter of the sub-resource. In an embodiment, the third information may be included in a higher layer message. The higher layer message may be, for example, a MAC layer message or an RRC layer message from the network device. The first node receives the higher layer message to obtain the parameter of the sub-resource. It may be understood that the third information may alternatively be included in a physical layer message and a higher layer message. For example, the first node receives the higher layer message to obtain parameters of a plurality of candidate sub-resources, and receives the physical layer message to determine the parameter of the sub-resource in the parameters of the plurality of candidate sub-resources.

For another example, the first node may determine the parameter of the sub-resource based on the predefined parameter information of the sub-resource. It should be noted that "predefined" in this application may refer to pre-defined, stored, pre-negotiated, pre-configured, or solidified.

For still another example, the first node may determine the parameter of the sub-resource based on the third information from the control node and the predefined parameter information of the sub-resource. The first node obtains parameters of a plurality of candidate sub-resources based on the predefined parameter information of the sub-resource, and receives the third information from the control node to determine the parameter of the sub-resource in the parameters of the plurality of candidate sub-resources.

In part 310, the first node determines the first symbol sequence based on the first bit sequence. For example, the first bit sequence is $\{f_0, f_1, f_2, \ldots, f_{E-1}\}$, where E is a length of the first bit sequence. In an embodiment, preprocessing (where for example, the preprocessing includes one or more of scrambling, modulation, layer mapping, or precoding) is performed on the first bit sequence $\{f_0, f_1, f_2, \ldots, f_{E-1}\}$, to obtain the first symbol sequence $\{z(0), \ldots, z(M-1)\}$. A symbol in the first symbol sequence is a modulated symbol obtained through modulation, and may also be understood as a to-be-mapped symbol that is to be mapped to a resource, where M is a length of the first symbol sequence. It may be understood that M may also be understood as the size of the second resource (that is, the second resource includes M REs), and the M symbols in the first symbol sequence may be mapped to the M REs of the second resource. In an embodiment, a relationship between M and E may be determined based on a modulation scheme. For example, when a binary phase shift keying (BPSK) modulation scheme is used, M and E satisfy M=E; when a π/2-BPSK modulation scheme is used, M and E satisfy M=E; when a quadrature phase shift keying (QPSK) modulation scheme is used, M and E satisfy M=E/2; when a 16 quadrature amplitude modulation (16QAM) modulation scheme is used, M and E satisfy M=E/4; when a 64QAM modulation scheme is used, M and E satisfy M=E/6; and when a 256QAM modulation scheme is used, M and E satisfy M=E/8.

In part 310, the first node determines some to-be-mapped symbols in the first symbol sequence. In an embodiment, the first node determines the some to-be-mapped symbols in the first symbol sequence based on the first resource.

Figure 7A:
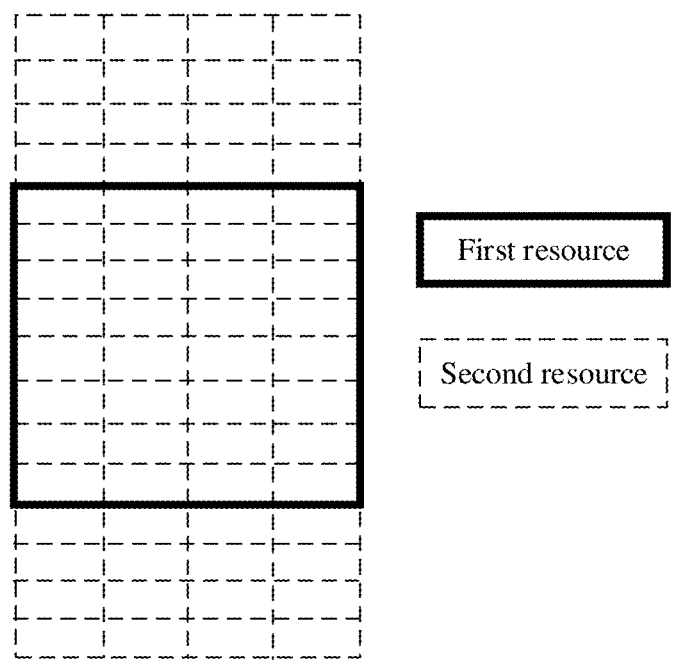
FIG. 7A is a schematic diagram of a first type of a first resource according to an embodiment of this application.
Figure 7B:
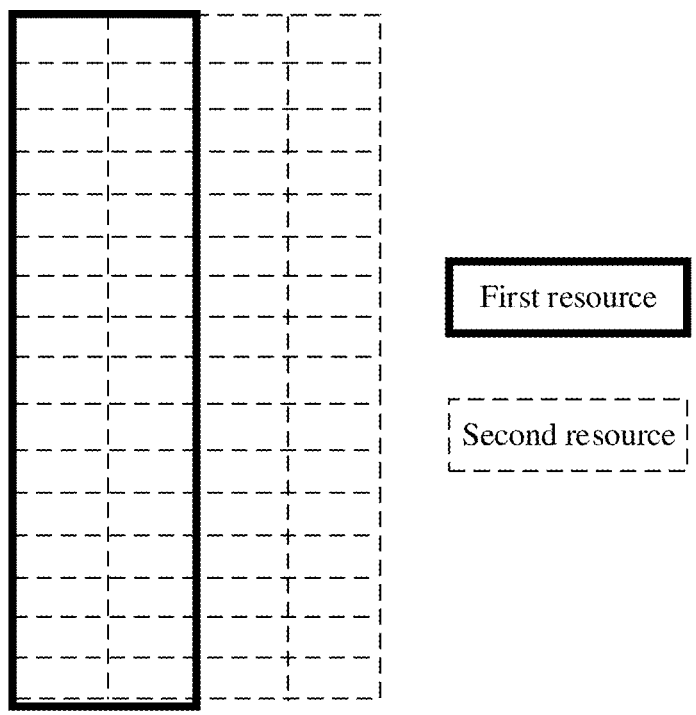
FIG. 7B is a schematic diagram of a second type of a first resource according to an embodiment of this application.
Figure 7C:
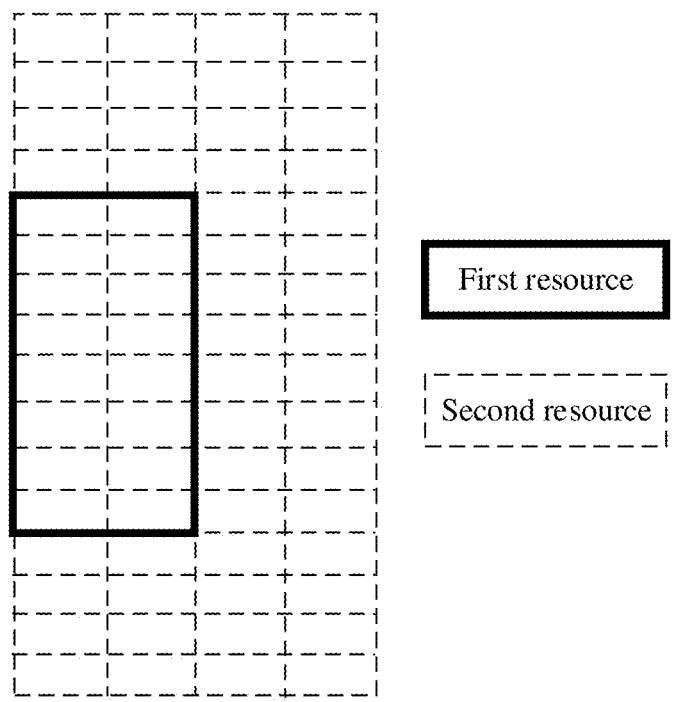
FIG. 7C is a schematic diagram of a third type of a first resource according to an embodiment of this application.

The first resource may be understood as a resource used by the first node to send data, and the second resource may be understood as a candidate resource pool of the first resource, that is, the first resource is a subset of the second resource. In an embodiment, the first resource is not equal to the second resource, that is, the first resource is a proper subset of the second resource. FIG. 7A is used as an example. Dashed lines show that the second resource includes 16 subcarriers in frequency domain, and includes four time-domain symbols in time domain. Solid lines show that the first resource includes eight middle subcarriers on the second resource in frequency domain and the four time-domain symbols on the second resource in time domain. FIG. 7B is used as an example. Solid lines show that the first resource includes first two time-domain symbols on the second resource in time domain and the 16 subcarriers on the second resource in frequency domain. FIG. 7C is used as an example. Solid lines show that the first resource includes first two time-domain symbols on the second resource in time domain and eight middle subcarriers on the second resource in frequency domain. In an embodiment, there may be one or more first resources. It may be understood that the foregoing figures are merely examples. A specific resource occupied by the first resource in the second resource is not limited in this application.

Figure 8A:
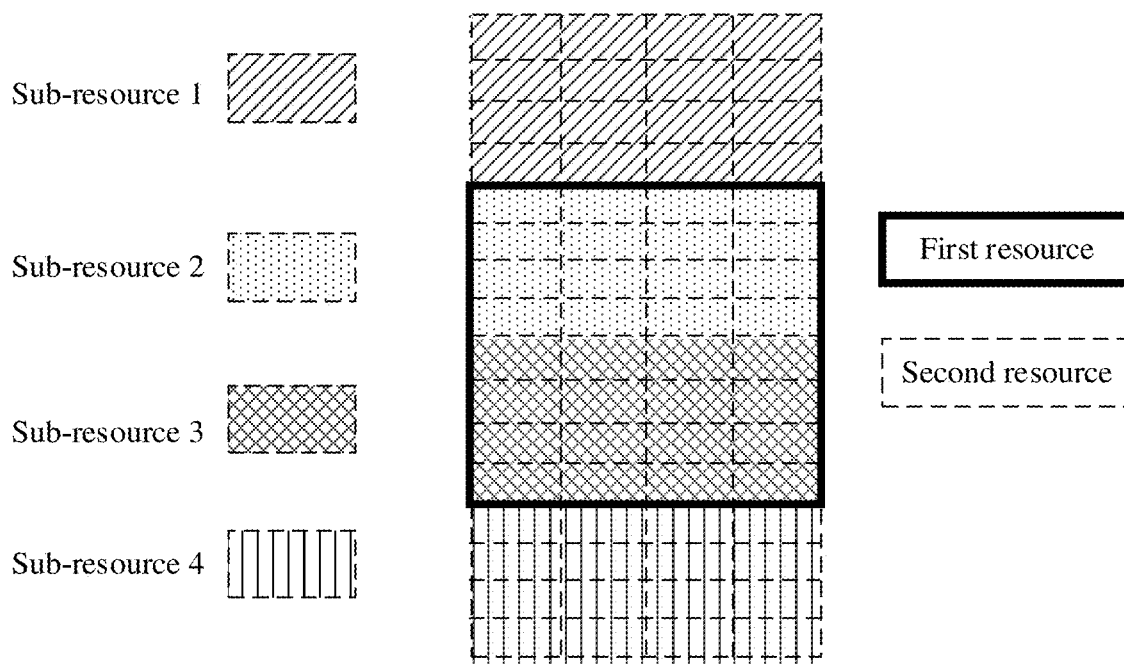
FIG. 8A is a schematic diagram of a first resource including sub-resources according to an embodiment of this application.
Figures 8B, 9A:
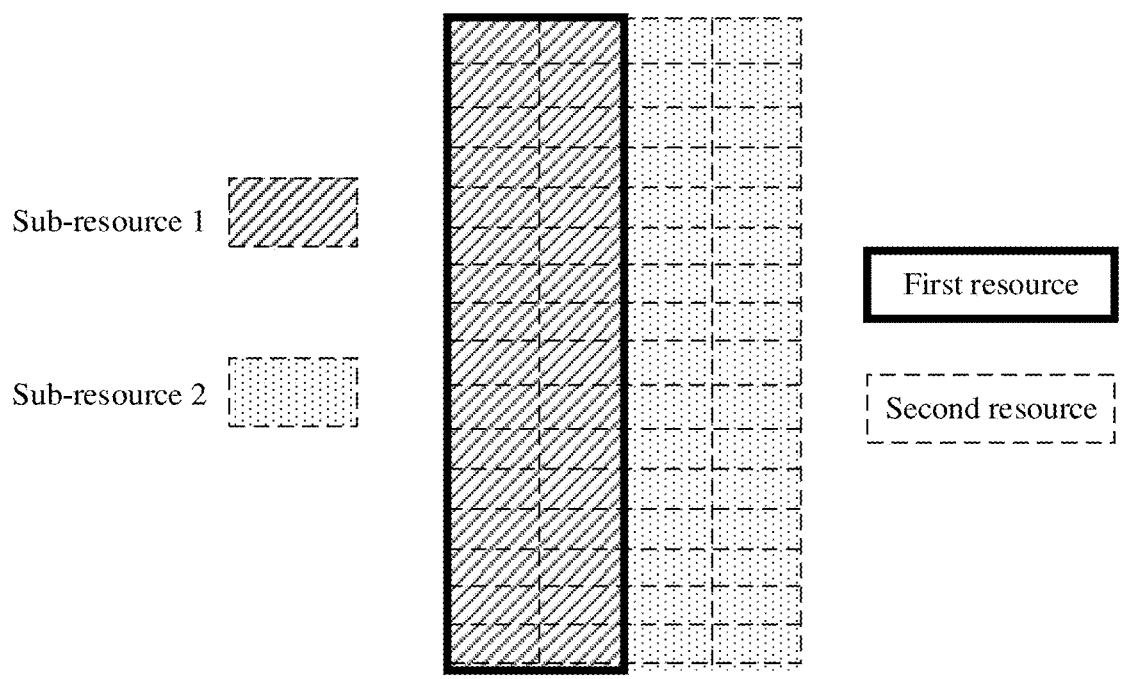
FIG. 8B is a schematic diagram of another first resource including sub-resources according to an embodiment of this application.
FIG. 9A is a schematic diagram of a first type of symbol mapping according to an embodiment of this application.

In an embodiment, the first resource may include one or more of sub-resources that are in the second resource. FIG. 8A is used as an example. Dashed lines show that the second resource includes 16 subcarriers in frequency domain, and includes four time-domain symbols in time domain. In addition, the shown second resource includes four sub-resources obtained through division in frequency domain. Solid lines show that the first resource includes sub-resources 2 and 3 that are in the shown second resource. FIG. 8B is used as an example. The second resource includes two sub-resources obtained through division in time domain. Solid lines show that the first resource includes a sub-resource 1 that is in the shown second resource. It may be understood that the foregoing figures are merely examples. A specific sub-resource included in the first resource is not limited in this application.

In an embodiment of part 310, the first node determines the some to-be-mapped symbols in the first symbol sequence based on a position of the first resource in the second resource.

FIG. 9A is used as an example. Dashed lines show that the second resource includes 16 subcarriers in frequency domain and includes four time-domain symbols in time domain, and there are a total of M=64 REs. In addition, the first symbol sequence is $\{z(0), \ldots, z(63)\}$, and symbols in the first symbol sequence may be mapped to the REs of the second resource according to the example shown in FIG. 9A. Solid lines show that the first resource includes eight middle subcarriers on the second resource in frequency domain and four time-domain symbols on the second resource in time domain. Based on the first resource shown in FIG. 9A, the first node selects symbols $\{z(4), \ldots, z(11)\}$, $\{z(20), \ldots, z(27)\}$, $\{z(36), \ldots, z(43)\}$, and $\{z(52), \ldots, z(59)\}$ from the first symbol sequence and uses the symbols as the some to-be-mapped symbols.

Figure 9D:
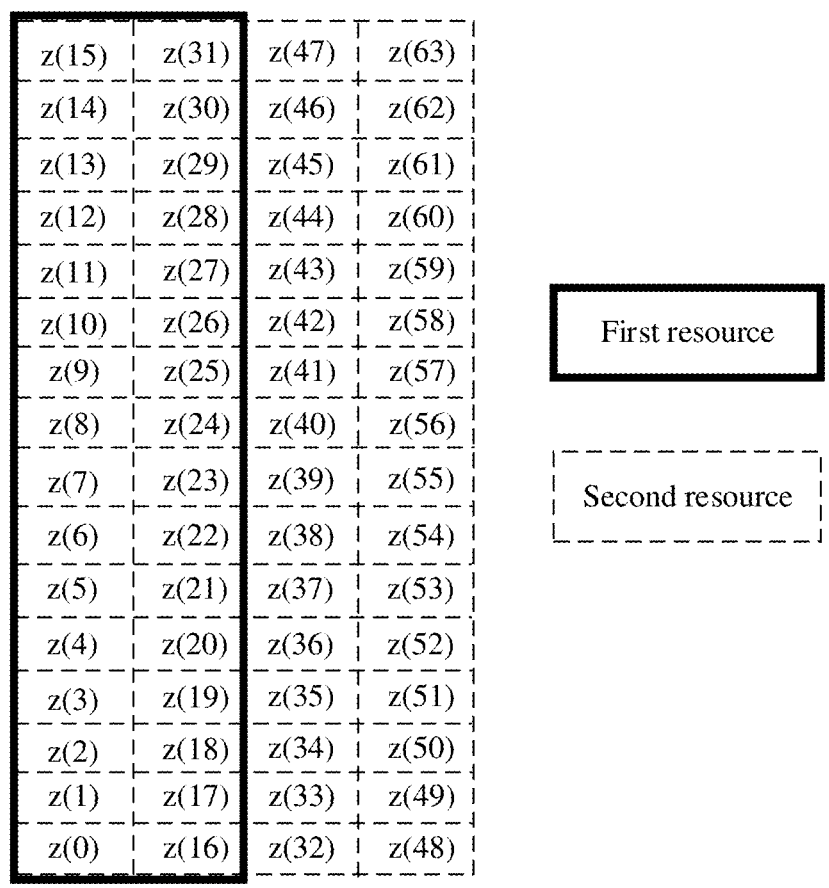
FIG. 9D is a schematic diagram of a fourth type of symbol mapping according to an embodiment of this application.

FIG. 9D is used as an example. Solid lines show that the first resource includes the 16 subcarriers on the second resource in frequency domain and first two time-domain symbols on the second resource in time domain. Based on the first resource shown in FIG. 9D, the first node selects symbols $\{z(0), \ldots, z(31)\}$ from the first symbol sequence and uses the symbols as the some to-be-mapped symbols.

FIG. 9E is used as an example. Solid lines show that the first resource includes eight middle subcarriers on the second resource in frequency domain and first two time-domain symbols on the second resource in time domain. Based on the first resource shown in FIG. 9E, the first node selects symbols $\{z(4), \ldots, z(11)\}$ and $\{z(20), \ldots, z(27)\}$ from the first symbol sequence and uses the symbols as the some to-be-mapped symbols.

In an embodiment of part 310, the first node determines the some to-be-mapped symbols in the first symbol sequence according to a symbol mapping criterion in the second resource or an indexing criterion in the second resource.

FIG. 9A is used as an example. Dashed lines show that the second resource includes 16 subcarriers in frequency domain and includes four time-domain symbols in time domain, and there are a total of M=64 REs. In addition, the first symbol sequence is $\{z(0), \ldots, z(63)\}$, and symbols in the first symbol sequence may be mapped to the REs of the second resource according to a criterion for performing indexing first in frequency domain and then in time domain. Solid lines show that the first resource includes eight middle subcarriers on the second resource in frequency domain and four time-domain symbols on the second resource in time domain. Based on the first resource shown in FIG. 9A, the first node selects symbols $\{z(4), \ldots, z(11)\}$, $\{z(20), \ldots, z(27)\}$, $\{z(36), \ldots, z(43)\}$, and $\{z(52), \ldots, z(59)\}$ from the first symbol sequence and uses the symbols as the some to-be-mapped symbols.

Figures 9F, 9G:
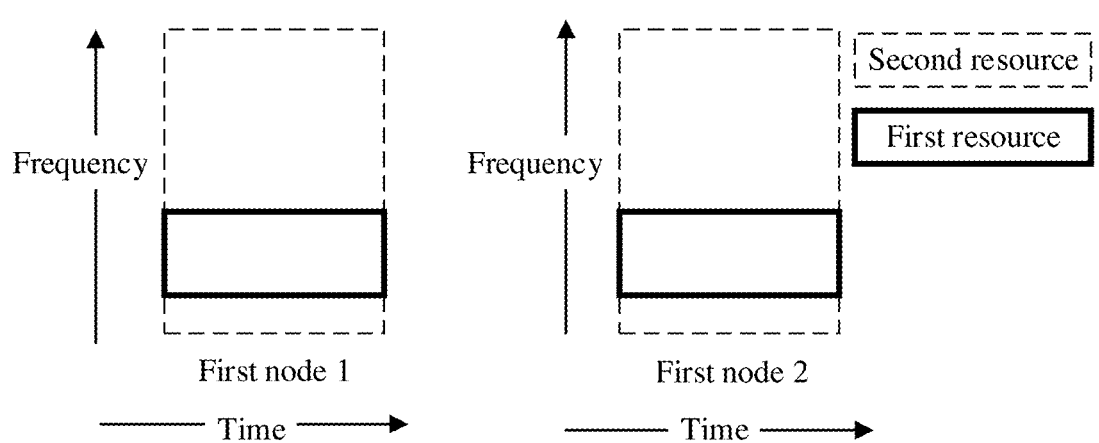
FIG. 9F is a schematic diagram of a sixth type of symbol mapping according to an embodiment of this application.
FIG. 9G is a schematic diagram of using a same first resource by a plurality of first nodes according to an embodiment of this application.

FIG. 9F is used as an example. Symbols in the first symbol sequence are mapped to the REs of the second resource according to a criterion for performing indexing first in time domain and then in frequency domain. Solid lines show that the first resource includes eight middle subcarriers on the second resource in frequency domain and the four time-domain symbols on the second resource in time domain. Based on the first resource shown in FIG. 9F, the first node selects symbols $\{z(16), \ldots, z(47)\}$ from the first symbol sequence and uses the symbols as the some to-be-mapped symbols.

It may be understood that the symbol mapping criterion or the indexing criterion in the foregoing embodiments are merely used as examples, and a specific symbol mapping criterion or indexing criterion is not limited in this application.

In an embodiment, the first node determines the first resource.

In an embodiment, the first node determines the first resource based on first information from the control node. In an embodiment, the first information may be included in a physical layer message. The physical layer message may be, for example, DCI from the network device, or may be, for example, SCI from the terminal. The first node receives the physical layer message to obtain the first resource. In an embodiment, the first information may be included in a higher layer message. The higher layer message may be, for example, a MAC layer message or an RRC layer message from the network device. The first node receives the higher layer message to obtain the first resource. It may be understood that the first information may alternatively be included in a physical layer message and a higher layer message. For example, the first node receives the higher layer message to obtain a plurality of candidate first resources, and receives the physical layer message to determine, in the plurality of candidate first resources, the first resource to which the symbols are mapped.

In an embodiment, when a same second resource is configured for a plurality of first nodes, the plurality of first nodes may use a same first resource in the same second resource. FIG. 9G is used as an example. A same second resource is configured for a first node 1 and a first node 2, and the first node 1 and the first node 2 use a same first resource in frequency domain of the second resource.

In an embodiment, when a same second resource is configured for a plurality of first nodes, the plurality of first nodes may use different first resources in the same second resource.

Figure 9H:
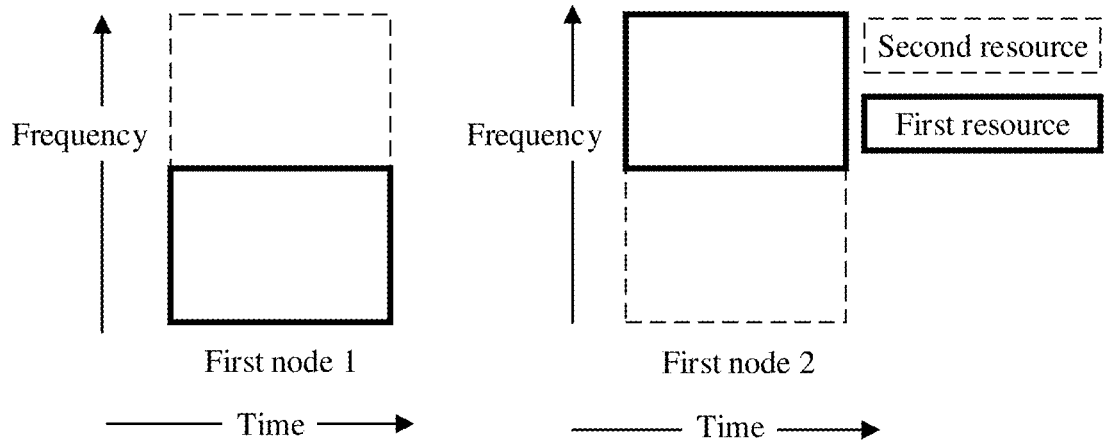
FIG. 9H is a schematic diagram of using non-overlapping first resources by a plurality of first nodes according to an embodiment of this application.

FIG. 9H is used as an example. A same second resource is configured for a first node 1 and a first node 2, and a first resource used by the first node 1 in frequency domain of the second resource and a first resource used by the first node 2 in frequency domain of the second resource do not overlap at all. In an embodiment, a union set of the first resource used by the first node 1 in frequency domain of the second resource and the first resource used by the first node 2 in frequency domain of the second resource is the second resource. In an embodiment, with reference to another part of the data sending method shown in FIG. 3, the plurality of first nodes may completely cover system bits, and also obtain an optimal space diversity gain between a plurality of nodes.

Figure 9I:
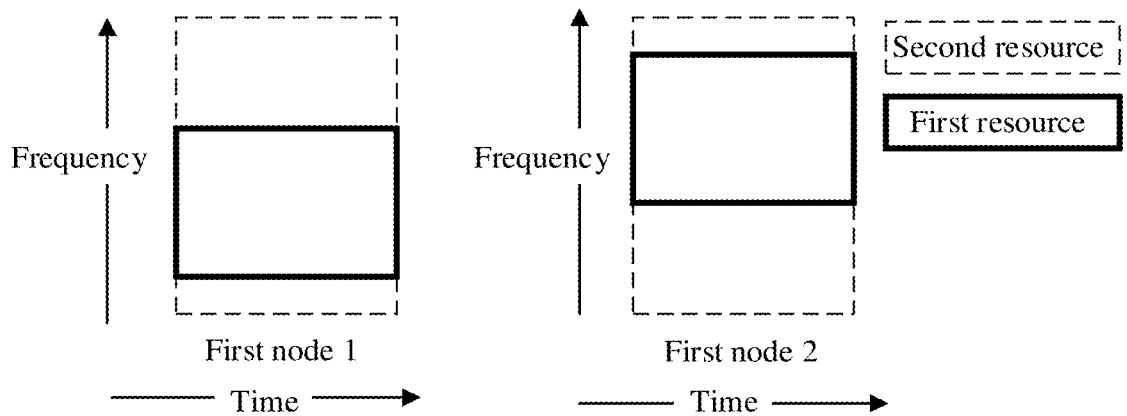
FIG. 9I is a schematic diagram of using partially overlapping first resources by a plurality of first nodes according to an embodiment of this application.

FIG. 9I is used as another example. A same second resource is configured for a first node 1 and a first node 2, and a first resource used by the first node 1 in frequency domain of the second resource and a first resource used by the first node 2 in frequency domain of the second resource partially overlap.

Figure 9J:
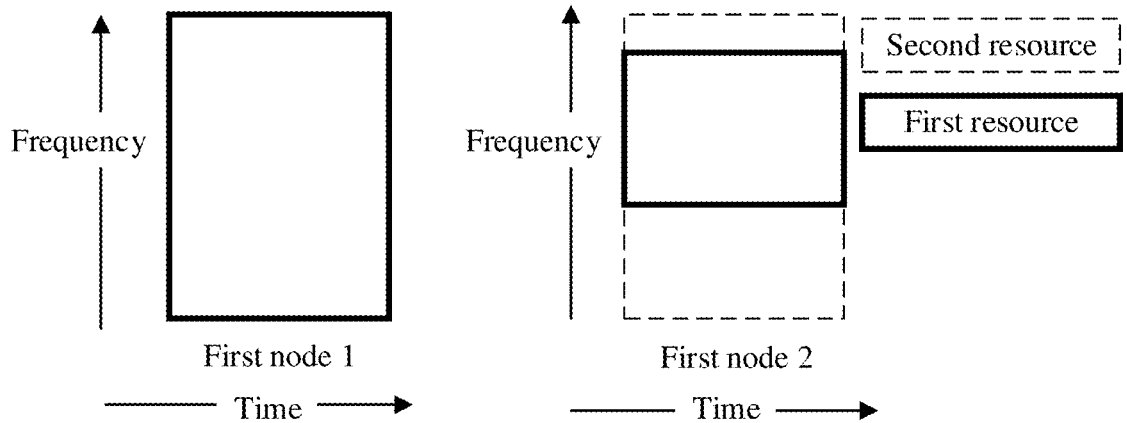
FIG. 9J is another schematic diagram of using partially overlapping first resources by a plurality of first nodes according to an embodiment of this application.

FIG. 9J is used as still another example. A same second resource is configured for a first node 1 and a first node 2, a first resource used by the first node 1 in frequency domain of the second resource is the second resource, and a first resource used by the first node 2 in frequency domain of the second resource is a proper subset of the second resource. In an embodiment, with reference to another part of the data sending method shown in FIG. 3, the plurality of first nodes can ensure that all system bits are sent, to improve data transmission reliability.

In an embodiment, when a same second resource is configured for a plurality of first nodes, an independent higher layer message or physical layer message is used to configure a first resource in the second resource for each of the plurality of first nodes.

Figures 9K, 10A:
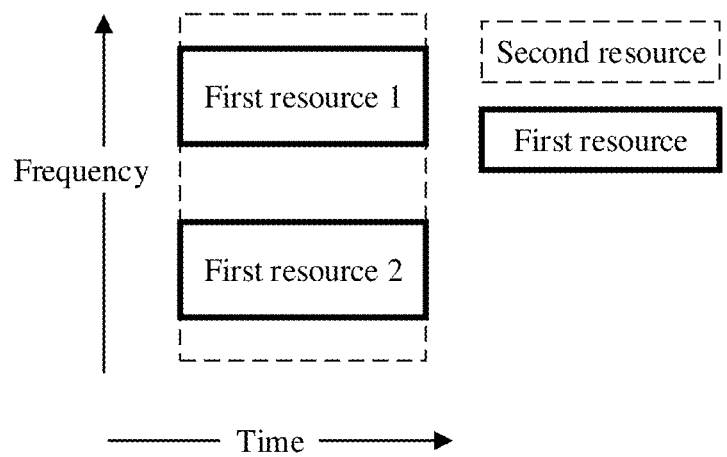
FIG. 9K is a schematic diagram of a pattern of first resources according to an embodiment of this application.
FIG. 10A is a schematic diagram of performing indexing for a second resource according to an embodiment of this application.

In an embodiment, when a same second resource is configured for a plurality of first nodes, a unified higher layer message or physical layer message is used to configure, for each of the plurality of first nodes, a first resource pattern in the second resource. FIG. 9K is used as an example. FIG. 9K shows a possible first resource pattern. The first resource pattern includes a first resource 1 and a first resource 2 that are in the second resource shown in the figure. Each of the plurality of first nodes determines, based on the first resource pattern, a first resource of the first node in the second resource. For example, each of the plurality of first node may determine a first resource of the first node in the first resource pattern based on an identifier of the first node. There is a correspondence between the identifier of the first node and an identifier of the first resource, and the correspondence may be predefined or may be configured/indicated by the network device. The first resource pattern shown in FIG. 9K and two first nodes whose identifiers are 1 and 2 are used as an example. The first node whose identifier is 1 uses a first resource 1 shown in FIG. 9K, and the first node whose identifier is 2 uses a first resource 2 shown in FIG. 9K. It may be understood that the identifier of the first node and the correspondence between the identifier of the first node and the identifier of the first resource are merely used as examples. Another possible identifier and a correspondence between the identifier and the identifier of the first resource are not limited in the present disclosure.

It may be understood that the embodiments in FIG. 9G to FIG. 9K merely show examples of the first resources in frequency domain, and these embodiments are also applicable to a time domain, a space domain, or a code domain.

In an embodiment, the first node determines the first resource based on one or more of the second resource, an active bandwidth part (BWP), an active carrier, or a measurement result.

For example, the first node may determine the first resource based on the second resource. The first node can select the first resource only in the second resource, and cannot select the first resource beyond the second resource.

For another example, the first node may determine the first resource based on the second resource and the active BWP of the first node. The first node can select the first resource only in an intersection set of the frequency domain of the second resource and the active BWP.

For still another example, the first node may determine the first resource based on the second resource and the active carrier of the first node. The first node can select the first resource only in an intersection set of the frequency domain of the second resource and the active carrier.

It may be understood that the second resource may be represented by the active bandwidth part or the active carrier. In this case, the first node may determine the first resource based on the active BWP or the active carrier of the first node.

For yet another example, the first node may determine the first resource based on the second resource and a channel quality measurement result. The first node may select, from the second resource, a resource with a relatively good channel quality measurement result as the first resource. The relatively good channel quality measurement result may be understood as that the channel quality measurement result is greater than or equal to a threshold, and the threshold may be predefined or may be configured by the control node for the first node.

For still yet another example, the first node may determine the first resource based on the second resource, the active BWP of the first node, and a channel quality measurement result. The first node may select, from an intersection of the frequency domain of the second resource and the active BWP of the first node, a resource with a relatively good channel quality measurement result as the first resource. The relatively good channel quality measurement result may be understood as that the channel quality measurement result is greater than or equal to a threshold, and the threshold may be predefined or may be configured by the control node for the first node.

For a further example, the first node may determine the first resource based on the second resource, the active carrier of the first node, and a channel quality measurement result. The first node may select, from an intersection of the frequency domain of the second resource and the active carrier of the first node, a resource with a relatively good channel quality measurement result as the first resource. The relatively good channel quality measurement result may be understood as that the channel quality measurement result is greater than or equal to a threshold, and the threshold may be predefined or may be configured by the control node for the first node.

It may be understood that the second resource may be represented by the active bandwidth part or the active carrier. In this case, the first node may determine the first resource based on the channel quality measurement result and the active BWP or the active carrier of the first node.

It may be understood that the channel quality in the foregoing embodiments may be one or more of signal quality, signal strength, signal power, or a signal to interference plus noise ratio (SINR). For example, the channel quality may be a function based on one or more of the signal quality, the signal strength, the signal power, or the SINR. A specific method for determining the channel quality is not limited in this embodiment of this application.

It may be understood that when determining the first resource, the first node may further consider a service scheduling status of the first node. For example, when determining the first resource, the first node needs to avoid a resource occupied by a service of the first node. In an embodiment, when the first node uses the first resource to send a service that is not of the first node, impact on the service of the first node can be reduced.

In an embodiment, the first node determines a sub-resource included in the first resource. It may be understood that the sub-resource is in the second resource.

In an embodiment, the first node determines, based on second information from the control node, the sub-resource included in the first resource. In an embodiment, the second information may be included in a physical layer message. The physical layer message may be, for example, DCI from the network device, or may be, for example, SCI from the terminal. The first node receives the physical layer message to obtain the sub-resource included in the first resource. In an embodiment, the second information may be included in a higher layer message. The higher layer message may be, for example, a MAC layer message or an RRC layer message from the network device. The first node receives the higher layer message to obtain the sub-resource included in the first resource. It may be understood that the second information may alternatively be included in a physical layer message and a higher layer message. For example, the first node receives the higher layer message to obtain a plurality of candidate sub-resources, and receives the physical layer message to determine, in the plurality of candidate sub-resources, the sub-resource included in the first resource.

In an embodiment, the first node determines, based on one or more of the second resource, the active BWP, or the measurement result, the sub-resource included in the first resource. For a specific embodiment, refer to the foregoing descriptions of determining the first resource based on one or more of the second resource, the active BWP, or the measurement result. Details are not described herein again.

In an embodiment, the first resource has a corresponding parameter, which may be referred to as a parameter of the first resource. For a specific type of the parameter of the first resource, refer to the foregoing specific types of the parameters of the resource. Details are not described herein again.

In an embodiment, the first node determines the parameter of the first resource.

In an embodiment, the parameter of the first resource is related to the parameter of the second resource, and the first node determines the parameter of the first resource based on the parameter of the second resource. For a specific embodiment, refer to the foregoing descriptions of determining the parameter of the sub-resource based on the parameter of the second resource. Details are not described herein again.

In an embodiment, the first node determines the parameter of the first resource based on fourth information from the control node and/or predefined parameter information of the first resource. For a specific embodiment, refer to the foregoing descriptions of determining the parameter of the sub-resource based on the third information from the control node and/or the predefined parameter information of the sub-resource. Details are not described herein again.

In part 320, the first node maps the some to-be-mapped symbols determined in part 310 to the first resource, and sends the symbols (namely, the some symbols) mapped to the first resource. It may be understood that the first resource may be a virtual resource (for example, a virtual resource block (VRB)) or a physical resource (for example, a physical resource block (PRB)). This is not limited in this embodiment of this application.

In an embodiment, in part 320, the first node maps the symbols to the first resource based on one or more of the second resource, the first resource, a mapping start point, a mapping sequence, a mapping pattern, or a pilot pattern.

In an embodiment, the first node performs indexing for the second resource, and maps the symbols to the first resource based on the indexing. In an embodiment, the first node performs the indexing for the second resource based on the size of the second resource. It may be understood that the size of the second resource limits a range of the indexing.

Figure 10B:
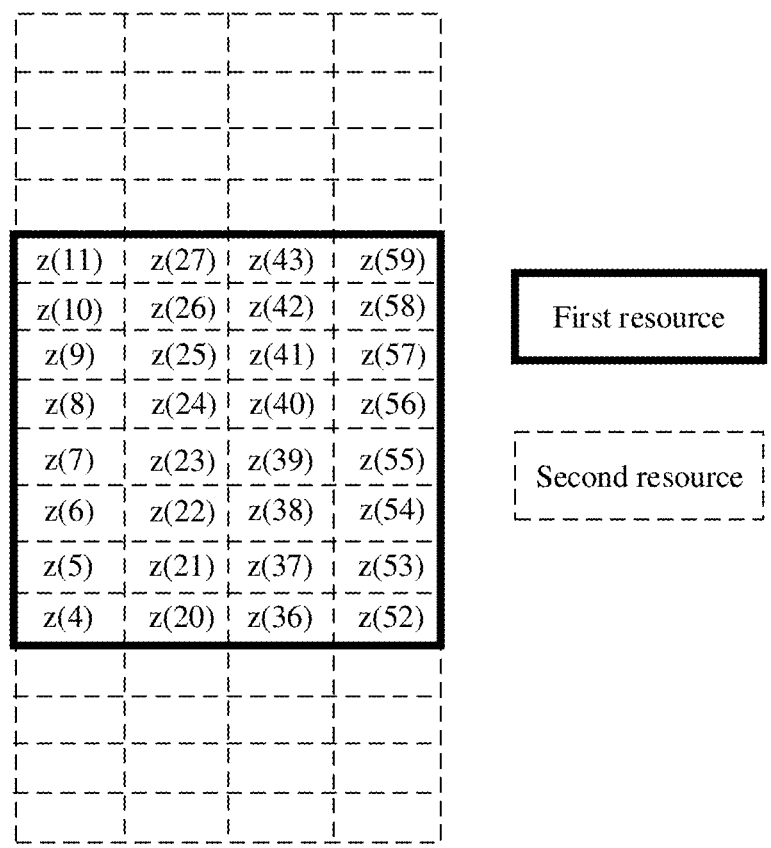
FIG. 10B is a schematic diagram of mapping some symbols to a first resource according to an embodiment of this application.

For example, in FIG. 10A and FIG. 10B, the first node selects symbols $\{z(4), \ldots, z(11)\}$, $\{z(20), \ldots, z(27)\}$, $\{z(36), \ldots, z(43)\}$, and $\{z(52), \ldots, z(59)\}$ in the first symbol sequence $\{z(0), \ldots, z(63)\}$ as the symbols. The first node performs indexing for the second resource according to the example in FIG. 10A. For example, the indexing in FIG. 10A is performed first in frequency domain and then in time domain, and resources in the second resource are indexed and numbered starting from a resource that has a smallest number and that is in the second resource. As shown in FIG. 10A, the first node maps the symbols $\{z(4), \ldots, z(11)\}$, $\{z(20), \ldots, z(27)\}$, $\{z(36), \ldots, z(43)\}$, and $\{z(52), \ldots, z(59)\}$ to the first resource. As shown in FIG. 10B, mapping of the symbols $\{z(4), \ldots, z(11)\}$, $\{z(20), \ldots, z(27)\}$, $\{z(36), \ldots, z(43)\}$, and $\{z(52), \ldots, z(59)\}$ satisfies: A symbol $z(j)$ is mapped to a resource j, where j is an index obtained through the indexing for the second resource in FIG. 10A. The foregoing embodiment may also be understood as virtually mapping symbols in the first symbol sequence $\{z(0), \ldots, z(63)\}$ to the second resource, and physically mapping the symbols $\{z(4), \ldots, z(11)\}$, $\{z(20), \ldots, z(27)\}$, $\{z(36), \ldots, z(43)\}$, and $\{z(52), \ldots, z(59)\}$ to the first resource. It may be understood that the foregoing index numbers are merely used as an example, and specific index numbers are not limited in this embodiment of this application.

In an embodiment, the first node maps the symbols to the first resource according to a symbol mapping criterion or an indexing criterion. For example, the symbol mapping criterion or the indexing criterion may be mapping of the symbols first in frequency domain and then in time domain on the first resource. Alternatively, the symbol mapping criterion or the indexing criterion may be mapping of the symbols first in time domain and then in frequency domain on the first resource. In an embodiment, the symbol mapping criterion or the indexing criterion may further include the mapping start point. The first node may map the symbols starting from the mapping start point. For example, the mapping start point may be a resource with a smallest index or number in the first resource, or the mapping start point may be a resource with a largest index or number in the first resource. For another example, the mapping start point may be in the first resource (in other words, the first resource includes a resource corresponding to the mapping start point), or may be outside the first resource (in other words, the first resource does not include a resource corresponding to the mapping start point). For still another example, the first node may receive a physical layer message (for example, DCI from the network device or SCI from the terminal) and/or a higher layer message (for example, a MAC layer message or an RRC layer message from the network device) from the control node, to obtain the mapping starting point. Alternatively, the mapping start point may be predefined.

In an embodiment of mapping the symbols to the first resource, the first node maps the symbols to the first resource according to the mapping pattern. According to the mapping pattern, the second resource is divided to obtain one or more sub-resources. In other words, the mapping pattern indicates the one or more sub-resources included in the second resource. In an embodiment, mapping modes on different sub-resources may be different or the same. In an embodiment, the mapping pattern may further indicate a plurality of blocks having different mapping modes. Each block may include one or more continuous or discontinuous sub-resources. In an embodiment, a symbol mapping criterion or an indexing criterion in the one or more sub-resources may be independently configured. For example, the symbol mapping criterion or the indexing criterion in the one or more sub-resources may be configured by the control node for the first node. In an embodiment, the symbols may be sequentially mapped on resources in the sub-resources. In an embodiment, the first node may receive a physical layer message (for example, DCI from the network device or SCI from the terminal) and/or a higher layer message (for example, a MAC layer message or an RRC layer message from the network device) from the control node, to obtain the mapping pattern. Alternatively, the mapping pattern may be predefined.

Figure 10C:
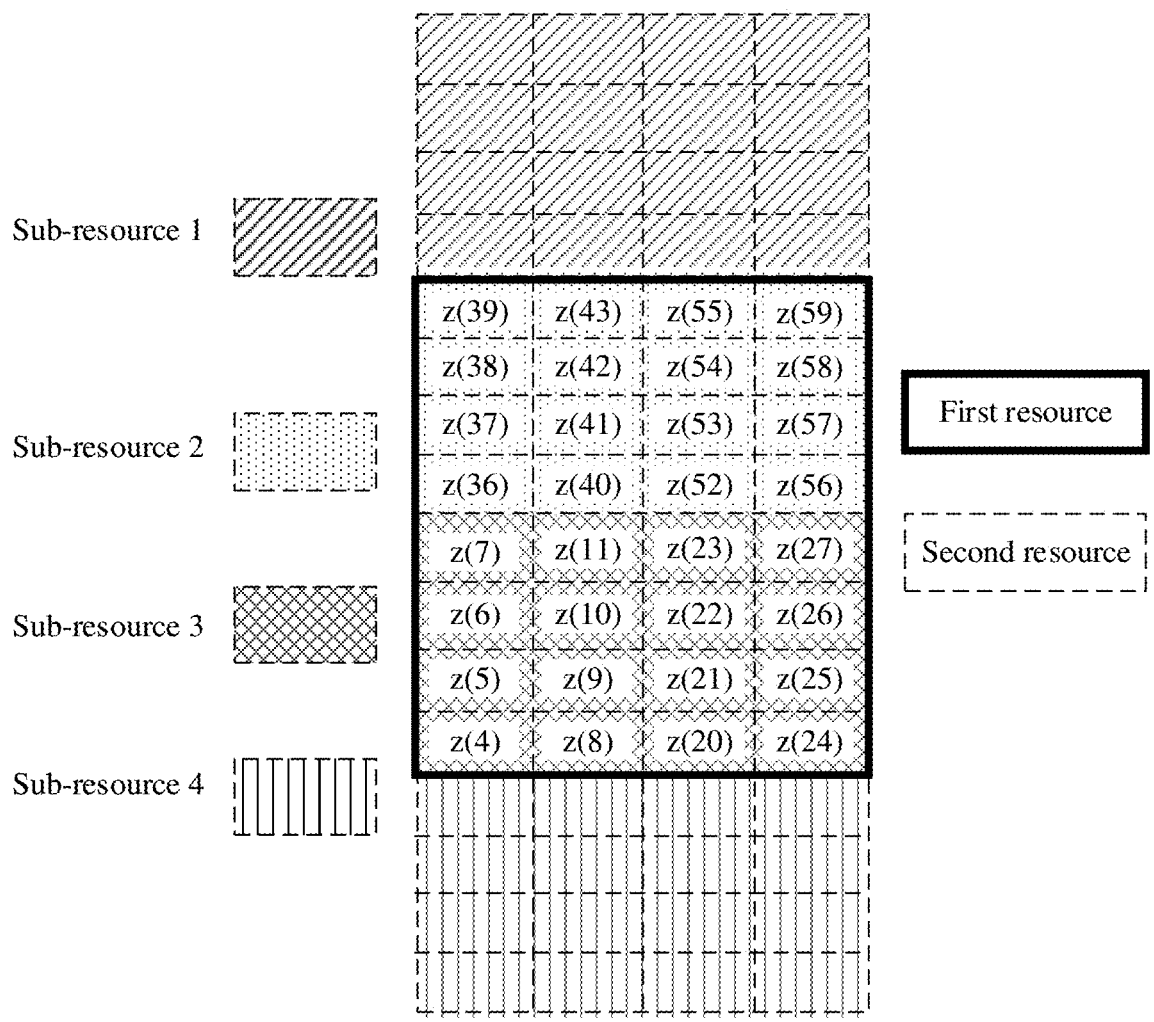
FIG. 10C is another schematic diagram of mapping some symbols to a first resource according to an embodiment of this application.

For example, in FIG. 10C, the first node selects symbols $\{z(4), \ldots, z(11)\}$, $\{z(20), \ldots, z(27)\}$, $\{z(36), \ldots, z(43)\}$, and $\{z(52), \ldots, z(59)\}$ in the first symbol sequence $\{z(0), \ldots, z(63)\}$ as the symbols. A second resource shown in FIG. 10C includes four sub-resources, and a first resource includes a sub-resource 2 and a sub-resource 3. The first half of the symbols $\{z(4), \ldots, z(11)\}$, $\{z(20), \ldots, z(27)\}$, $\{z(36), \ldots, z(43)\}$, and $\{z(52), \ldots, z(59)\}$ are sequentially mapped on resources in the sub-resource 3 (that is, the symbols $\{z(4), \ldots, z(11)\}$ and $\{z(20), \ldots, z(27)\}$ are mapped on the sub-resource 3), and the last half of the symbols are sequentially mapped on resources in the sub-resource 2 (that is, the symbols $\{z(36), \ldots, z(43)\}$ and $\{z(52), \ldots, z(59)\}$ are mapped on the sub-resource 2). In an embodiment, the four sub-resources that are included in the second resource and shown in FIG. 10C are determined through division according to the mapping pattern. It may be understood that the foregoing mapping diagram is merely used as an example.

In an embodiment, the first node maps the symbols to the first resource according to the pilot pattern. For example, the first node does not map the symbols to a resource that is in the first resource and to which a pilot symbol needs to be mapped. It may be understood that the pilot pattern may be a pattern of non-zero power pilots or a pattern of zero power pilots.

In an embodiment, the first node maps the symbols to the first resource according to a symbol mapping criterion or an indexing criterion and based on the second resource. For the symbol mapping criterion/indexing criterion, refer to the foregoing descriptions of the mapping sequence and the mapping starting point. Details are not described herein again. For example, the first node maps, according to the mapping sequence and the mapping start point, the symbols to the first resource in a range of the second resource.

Figure 10D:
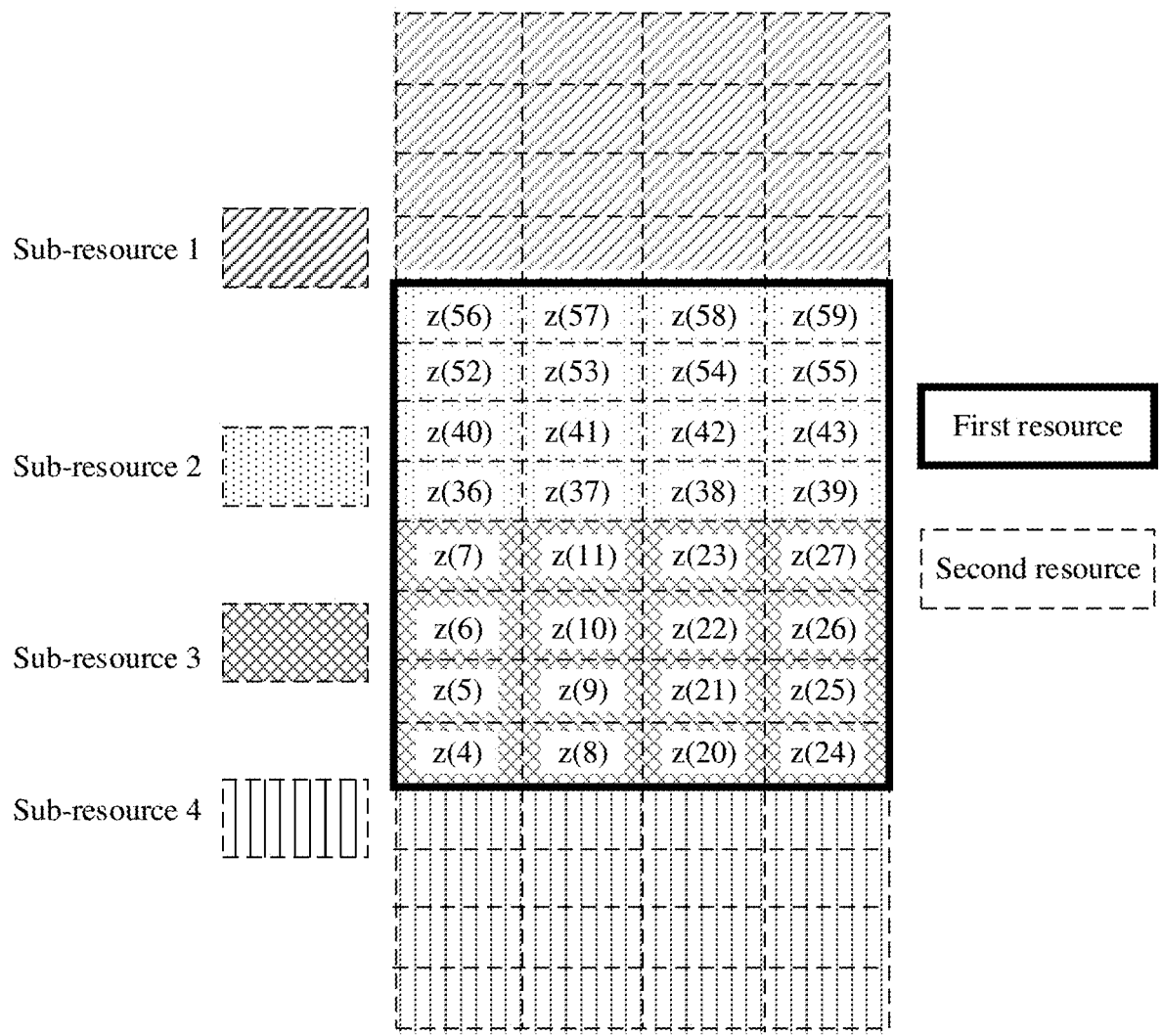
FIG. 10D is still another schematic diagram of mapping some symbols to a first resource according to an embodiment of this application.

In an embodiment, the first node maps the symbols to the first resource according to the mapping pattern and a symbol mapping criterion/an indexing criterion. For the symbol mapping criterion/indexing criterion, refer to the foregoing descriptions of the mapping sequence and the mapping starting point. Details are not described herein again. According to the mapping pattern, the second resource is divided to obtain one or more sub-resources. In an embodiment, the mapping sequence and the mapping start point are used to determine a mapping sequence and a mapping start point of the sub-resources. In an embodiment, for the one or more sub-resources, the mapping sequence and/or a rule for determining the mapping start point may be configured together. A sub-resource 2 and a sub-resource 3 in FIG. 10C are used as an example. A first mapping sequence (for example, first frequency domain and then time domain) and a rule for determining a first mapping start point (for example, an RE with a smallest index in each sub-resource) are configured for the sub-resource 2 and the sub-resource 3 together. In an embodiment, for the one or more sub-resources, the mapping sequence and/or a rule for determining the mapping start point may be configured independently. A sub-resource 2 and a sub-resource 3 in FIG. 10D are used as an example. A first mapping sequence (for example, first time domain and then frequency domain) and a rule for determining a first mapping start point (for example, an RE with a smallest index in the sub-resource 2) are configured for the sub-resource 2, and a second mapping sequence (for example, first frequency domain and then time domain) and a rule for determining a second mapping start point (for example, an RE with a smallest index in the sub-resource 3) are configured for the sub-resource 3.

It may be understood that, in the foregoing several embodiments of mapping the symbols to the first resource, each embodiment is described by using only an example in which the first resource includes a time domain resource and a frequency domain resource. For a specific embodiment in which the first resource includes a resource (for example, a space domain resource) in another dimension, refer to the foregoing several embodiments. Details are not described herein again.

In an embodiment of part 320, the first node determines a power control parameter of the first resource or of the second resource, and sends, by using the power control parameter of the first resource or of the second resource, the symbols mapped to the first resource. In an embodiment, the first node may further determine the power control parameter of the first resource based on sixth information from the control node. In an embodiment, the sixth information may be included in a physical layer message. The physical layer message may be, for example, DCI from the network device or control information carried on a group common control channel, or may be, for example, SCI from the terminal. The first node receives the physical layer message to obtain the power control parameter of the first resource. In an embodiment, the sixth information may be included in a higher layer message. The higher layer message may be, for example, a MAC layer message or an RRC layer message from the network device. The first node receives the higher layer message to obtain the power control parameter of the first resource. It may be understood that the sixth information may alternatively be included in a physical layer message and a higher layer message. For example, the first node receives the higher layer message to obtain power control parameters of a plurality of candidate first resources, receives the physical layer message to determine the power control parameter of the first resource in the power control parameters of the plurality of candidate first resources, and sends, by using the power control parameter of the first resource, the symbols mapped to the first resource.

Figure 11A:
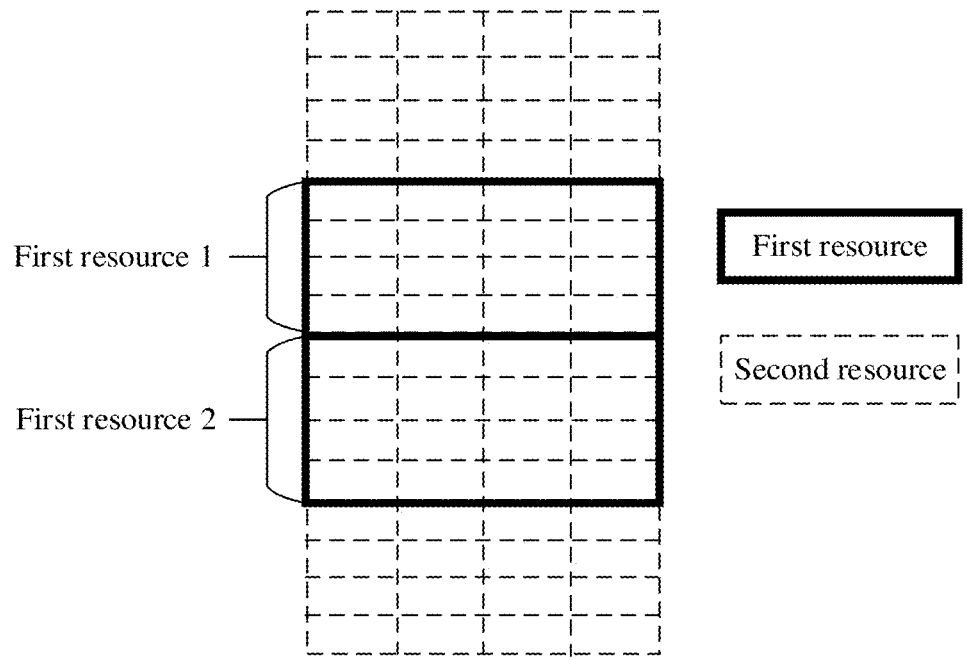
FIG. 11A is a schematic diagram of a plurality of first resources according to an embodiment of this application.

In an embodiment, there are one or more first resources. FIG. 11A is used as an example, and shows that a second resource includes two first resources: a first resource 1 and a first resource 2. The first node obtains a power control parameter of the first resource 1 based on the sixth information, and obtains a power control parameter of the first resource 2 based on the sixth information. It may be understood that the power control parameter of the first resource 1 may be the same as or different from the power control parameter of the first resource 2.

In an embodiment, the power control parameters of the plurality of first resources are configured for different first nodes. In an embodiment, the different first nodes receive the sixth information to obtain power control parameters of the first resources corresponding to the different first nodes. FIG. 11A is used as an example. The power control parameter of the first resource 1 is configured for the first node 1, and the power control parameter of the first resource 2 is configured for the first node 2. The first node 1 receives the sixth information to determine the power control parameter of the first resource 1, and the first node 2 receives the sixth information to determine the power control parameter of the first resource 2.

In an embodiment of part 320, the first node determines, based on the sixth information, a power control parameter of a sub-resource included in the first resource, and sends, by using the power control parameter of the sub-resource included in the first resource, a symbol mapped to the sub-resource included in the first resource. It may be understood that the first resource may include one or more sub-resources. FIG. 8A is used as an example. A first resource includes a sub-resource 2 and a sub-resource 3. The first node determines, based on the sixth information, power control parameters of the sub-resources 2 and 3, and sends, by using the power control parameters of the sub-resources 2 and 3, symbols mapped to the sub-resources 2 and 3.

In an embodiment of part 320, the first node determines, based on the sixth information, a power control parameter of a sub-resource included in the second resource, and sends, by using the power control parameter of the sub-resource included in the second resource, a symbol mapped to a sub-resource included in the first resource. It may be understood that the second resource may include one or more sub-resources. FIG. 8A is used as an example. A first resource includes a sub-resource 2 and a sub-resource 3. The second resource includes a sub-resource 1, the sub-resource 2, the sub-resource 3, and a sub-resource 4. The first node determines, based on the sixth information, power control parameters of the sub-resource 1, the sub-resource 2, the sub-resource 3, and the sub-resource 4, and sends, by using the power control parameters of the sub-resources 2 and 3, symbols mapped to the sub-resources 2 and 3.

In an embodiment, the sixth information may be used to configure or indicate a power pattern of the sub-resources included in the second resource.

In an embodiment, the power pattern is used to configure or indicate whether data is sent on the sub-resources included in the second resource. For example, FIG. 8A is used as an example. For example, a bit "0" represents that no data is sent, and a bit "1" represents that data is sent. The foregoing power pattern may be indicated by using a bit sequence "0110", to indicate that data is sent on the sub-resource 2 (corresponding to the second bit "1" in the bit sequence) and the sub-resource 3 (corresponding to the third bit "1" in the bit sequence) (the sub-resources 2 and 3 are sub-resources of the first resource), and no data is sent on the sub-resource 1 (corresponding to the first bit "0" in the bit sequence) and the sub-resource 4 (corresponding to the fourth bit "0" in the bit sequence) (which is alternatively understood as zero power sending).

In an embodiment, the power pattern is used to configure or indicate a power level at which data is sent on the sub-resources included in the second resource. For example, in FIG. 8A, there are a total of four power levels. For example, bits "00" represent a first power level, bits "01" represent a second power level, bits "10" represent a third power level, and bits "11" represent a fourth power level. The power pattern may be indicated by using a bit sequence "00011100", to indicate that data is sent on the sub-resource 2 (corresponding to the third and fourth bits "01" in the bit sequence) at the second power level, data is sent on the sub-resource 3 (corresponding to the fifth and sixth bits "11" in the bit sequence) at the fourth power level, and data is sent on the sub-resource 1 (corresponding to the first and second bits "00" in the bit sequence) and the sub-resource 4 (corresponding to the seventh and eighth bits "00" in the bit sequence) both at the first power level.

In an embodiment, the power pattern is used to configure or indicate a power adjustment amount used to send data on the sub-resources included in the second resource. The power adjustment amount may be understood as an adjustment amount relative to recently used power. For example, in FIG. 8A, there are a total of four levels of power adjustment amounts. For example, bits "00" represent a first level of power adjustment amount, bits "01" represent a second level of power adjustment amount, bits "10" represent a third level of power adjustment amount, and bits "11" represent a fourth level of power adjustment amount. The power pattern may be indicated by using a bit sequence "00011100", to indicate that data is sent on the sub-resource 2 (corresponding to the third and fourth bits "01" in the bit sequence) by using the second level of power adjustment amount, data is sent on the sub-resource 3 (corresponding to the fifth and sixth bits "11" in the bit sequence) by using the fourth level of power adjustment amount, and data is sent on the sub-resource 1 (corresponding to the first and second bits "00" in the bit sequence) and the sub-resource 4 (corresponding to the seventh and eighth bits "00" in the bit sequence) both by using the first level of power adjustment amount.

In an embodiment, the power pattern is used to configure or indicate power offsets/power ratios of power levels of the sub-resources included in the second resource to a power level of a reference resource. The reference resource may be a predefined/configured sub-resource or a predefined/configured pilot. The power level of the reference resource may be configured by the network device or predefined, or may be determined by the first node. For example, in FIG. 8A, there are a total of two power offsets/power ratios. For example, a bit "0" represents a first power offset/power ratio, and a bit "1" represents a second power offset/power ratio. The power pattern may be indicated by using a bit sequence "0110", to indicate that data is sent on the sub-resource 2 (corresponding to the second bit "1" in the bit sequence) and on the sub-resource 3 (corresponding to the third bit "1" in the bit sequence) by using the first power offset/power ratio, and data is sent on the sub-resource 1 (corresponding to the first bit "0" in the bit sequence) and the sub-resource 4 (corresponding to the fourth bit "0" in the bit sequence) by using the second power offset/power ratio.

Figure 11B:
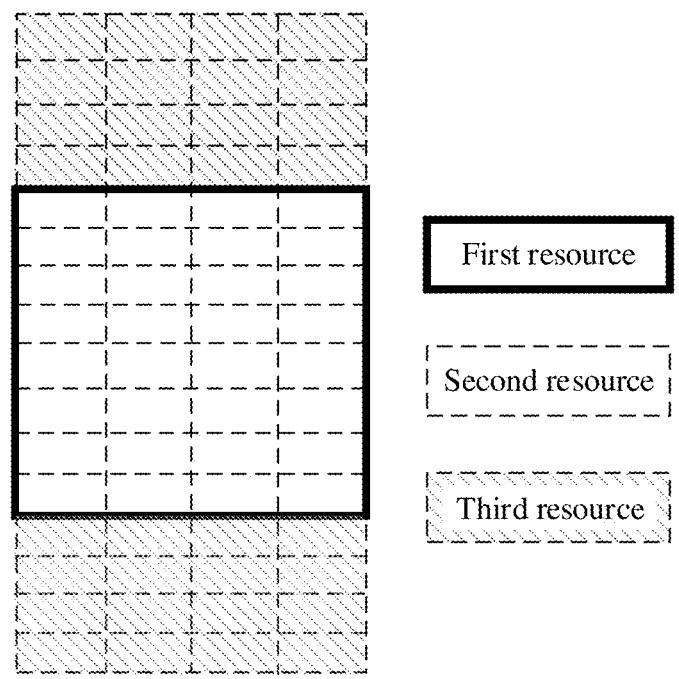
FIG. 11B is a schematic diagram of a third resource according to an embodiment of this application.

It may be understood that quantities of first resources and quantities of sub-resources in the foregoing examples are merely used as examples, and a specific meaning of a bit or bit combination in the foregoing examples is also merely used as an example. This is not limited in this embodiment of this application. In an embodiment, the second resource may further include a third resource, the third resource is a proper subset of the second resource, and there is no intersection between the third resource and the first resource. A second resource shown in FIG. 11B is used as an example. The shown second resource includes 16 subcarriers in frequency domain and four time-domain symbols in time domain. A first resource shown in FIG. 11B includes eight middle subcarriers of the shown second resource in frequency domain and the four time-domain symbols of the shown second resource in time domain. A resource other than the first resource in the second resource is the third resource. It may be understood that there may be one or more third resources.

In an embodiment, a power control parameter of the third resource is different from the power control parameter of the first resource.

In an embodiment, the first node sends, on the first resource and by using first power and the power control parameter of the first resource, the symbols mapped to the first resource, and sends, on the third resource and by using power less than the first power and the power control parameter of the third resource, a symbol mapped to the third resource.

In an embodiment, the first node sends, on the first resource and by using first power and the power control parameter of the first resource, the symbols mapped to the first resource, and determines, based on the power control parameter of the third resource, that power of the third resource is zero.

In an embodiment, the first node may obtain the power control parameter of the third resource via the sixth information, or may obtain the power control parameter of the third resource via other information that is from the control node and that is different from the sixth information. For a specific obtaining manner, refer to the foregoing method for obtaining the power control parameter of the first resource via the sixth information. Details are not described herein again.

In an embodiment, the first node reports whether the first node has a capability of performing the data sending method shown in FIG. 3. The reporting may be performed by using a physical layer message, a higher layer message, a measurement reporting message scrambled by using a specific sequence, a feedback message using a specific sequence, or a pilot using a specific sequence.

In an embodiment, the control node configures a plurality of first nodes into a group, and the plurality of first nodes included in the group perform data transmission according to the data sending method shown in FIG. 3. The plurality of first node may be configured into a group by using a physical layer message and/or a higher layer message. FIG. 2C is used as an example, and the control node may configure the sending node 1 and the sending node 2 into a group. First nodes (for example, the sending node 1 and the sending node 2 shown in FIG. 2C) that are configured into a group and in the group may perform the method in the foregoing embodiment of this application. Details are not described herein again.

In an embodiment, the control node configures or triggers the first node to perform the data sending method shown in FIG. 3. In an embodiment, the control node may also configure or trigger the first node not to perform the data sending method shown in FIG. 3. The configuration or triggering may be performed by using a physical layer message and/or a higher layer message. When the configuration or triggering is performed by using a physical layer message, the physical layer message may be scrambled by using a dedicated identifier (for example, a dedicated radio network temporary identifier (RNTI)).

In an embodiment, a resource set for sending data is configured, some resources in the resource set are determined, some to-be-mapped data symbols are determined based on the some resources, the some to-be-mapped symbols are mapped to the some resources, and the some data symbols are sent. This reduces interference in coordinated multi-node sending, thereby improving reliability and latency performance of the coordinated multi-node sending.

Figure 12:
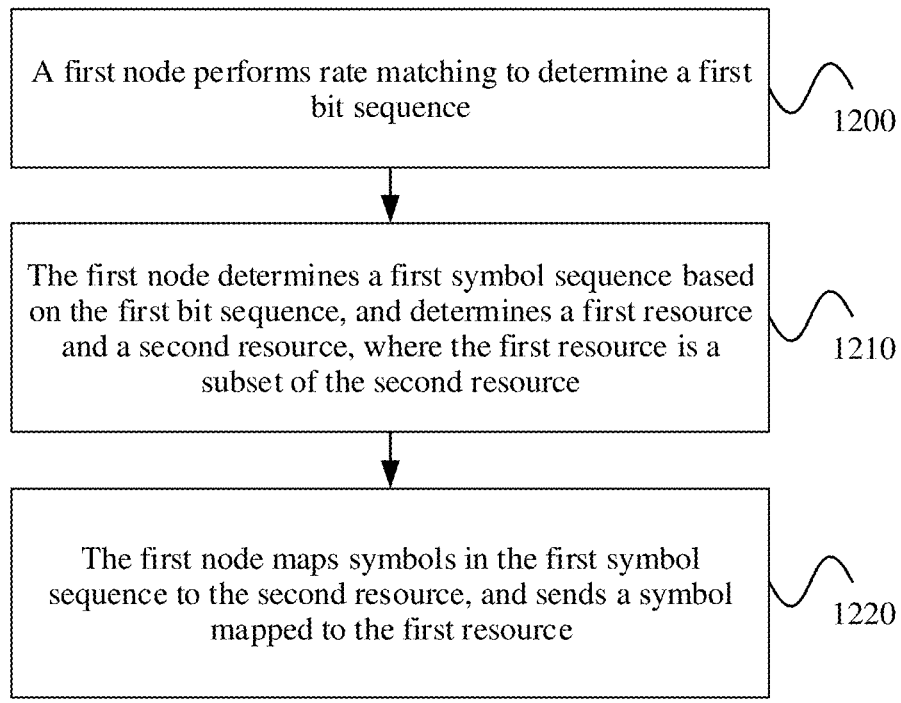
FIG. 12 is a flowchart of a second type of data sending according to an embodiment of this application.

FIG. 12 is a schematic flowchart of another data sending method according to an embodiment of this application. Differences between the embodiment corresponding to FIG. 3 and this embodiment of this application include at least the following: In the embodiment described in FIG. 3, some symbols in a first symbol sequence are mapped to a first resource, and the symbols mapped to the first resource are sent; in the embodiment described in FIG. 12, all symbols in a first symbol sequence are mapped to a second resource, but only a symbol mapped to a first resource is sent. As shown in FIG. 12, the method in this embodiment may include the following parts.

Part 1200: A first node performs rate matching to determine a first bit sequence.

Part 1210: The first node determines a first symbol sequence based on the first bit sequence, and determines a first resource and a second resource, where the first resource is a subset of the second resource. In an embodiment, the first resource is a proper subset of the second resource.

Part 1220: The first node maps symbols in the first symbol sequence to the second resource, and sends a symbol mapped to the first resource.

It may be understood that the first node in part 1200, part 1210, and part 1220 may be a terminal or a network device. The operation of determining the first resource and the second resource in part 1210 may alternatively be performed in part 1200 or part 1220.

For an embodiment of part 1200, refer to the descriptions of part 300 in FIG. 3. For an embodiment of determining the first symbol sequence by the first node based on the first bit sequence in part 1210, refer to the descriptions of determining the first symbol sequence by the first node based on the first bit sequence in the embodiment shown in FIG. 3. For the first resource and the second resource in part 1210, refer to the descriptions of the first resource and the second resource in the embodiment shown in FIG. 3. For an embodiment of determining the first resource by the first node in part 1210, refer to the descriptions of determining the first resource by the first node in the embodiment shown in FIG. 3. For an embodiment of determining the second resource by the first node in part 1210, refer to the descriptions of determining the second resource by the first node in the embodiment shown in FIG. 3. Details are not described herein again.

In an embodiment of part 1220, the first node maps the symbols in the first symbol sequence to the second resource according to a symbol mapping criterion or an indexing criterion (which may also be understood as physical mapping of the symbols in the first symbol sequence to the second resource), and sends the symbol mapped to the first resource. For an embodiment of the symbol mapping criterion or the indexing criterion, refer to the descriptions of the symbol mapping criterion or the indexing criterion in the embodiment shown in FIG. 3. Details are not described herein again.

FIG. 9A is used as an example. The first symbol sequence is $\{z(0), \ldots, z(63)\}$. The second resource includes 16 subcarriers in frequency domain and includes four time-domain symbols (a total of 64 REs) in time domain. The symbol mapping criterion includes: A mapping sequence is first frequency domain and then time domain, and a mapping start point is a resource with a smallest index or number in the second resource. The first node maps the symbols in the first symbol sequence $\{z(0), \ldots, z(63)\}$ to the REs of the second resource according to the symbol mapping rule, and sends symbols $\{z(4), \ldots, z(11)\}$, $\{z(20), \ldots, z(27)\}$, $\{z(36), \ldots, z(43)\}$, and $\{z(52), \ldots, z(59)\}$ that are mapped to the shown first resource.

FIG. 9D is used as another example. The first symbol sequence is $\{z(0), \ldots, z(63)\}$. The second resource includes 16 subcarriers in frequency domain and includes four time-domain symbols (a total of 64 REs) in time domain. The symbol mapping criterion includes: A mapping sequence is first frequency domain and then time domain, and a mapping start point is a resource with a smallest index or number in the second resource. The first node maps the symbols in the first symbol sequence $\{z(0), \ldots, z(63)\}$ to the REs of the second resource according to the symbol mapping rule, and sends symbols $\{z(0), \ldots, z(31)\}$ that are mapped to the shown first resource.

FIG. 9E is used as still another example. The first symbol sequence is $\{z(0), \ldots, z(63)\}$. The second resource includes 16 subcarriers in frequency domain and includes four time-domain symbols (a total of 64 REs) in time domain. The symbol mapping criterion includes: A mapping sequence is first frequency domain and then time domain, and a mapping start point is a resource with a smallest index or number in the second resource. The first node maps the symbols in the first symbol sequence $\{z(0), \ldots, z(63)\}$ to the REs of the second resource according to the symbol mapping rule, and sends symbols $\{z(4), \ldots, z(11)\}$ and $\{z(20), \ldots, z(27)\}$ that are mapped to the shown first resource.

FIG. 9F is used as yet another example. The first symbol sequence is $\{z(0), \ldots, z(63)\}$. The second resource includes 16 subcarriers in frequency domain and includes four time-domain symbols (a total of 64 REs) in time domain. The symbol mapping criterion includes: A mapping sequence is first time domain and then frequency domain, and a mapping start point is a resource with a smallest index or number in the second resource. The first node maps the symbols in the first symbol sequence $\{z(0), \ldots, z(63)\}$ to the REs of the second resource according to the symbol mapping rule, and sends symbols $\{z(16), \ldots, z(47)\}$ that are mapped to the shown first resource.

The foregoing examples are described by using only an example in which all symbols in the first symbol sequence are mapped to the second resource. It may be understood that in another embodiment, some symbols in the first symbol sequence may alternatively be mapped to the second resource, and the symbol mapped to the first resource is a proper subset of the symbols mapped to the second resource.

In part 1220, for an embodiment of power control used by the first node to send the symbol mapped to the first resource, refer to the descriptions of power control performed by the first node in part 320 shown in FIG. 3. Details are not described herein again.

In an embodiment, the first node reports whether the first node has a capability of performing the data sending method shown in FIG. 12. The reporting may be performed by using a physical layer message, a higher layer message, a measurement reporting message scrambled by using a specific sequence, a feedback message using a specific sequence, or a pilot using a specific sequence.

In an embodiment, the control node configures a plurality of first nodes into a group, and the plurality of first nodes included in the group perform data transmission according to the data sending method shown in FIG. 12. The plurality of first node may be configured into a group by using a physical layer message and/or a higher layer message.

In an embodiment, the control node configures or triggers the first node to perform the data sending method shown in FIG. 12. In an embodiment, the control node may also configure or trigger the first node not to perform the data sending method shown in FIG. 12. The configuration or triggering may be performed by using a physical layer message and/or a higher layer message. When the configuration or triggering is performed by using a physical layer message, the physical layer message may be scrambled by using a dedicated identifier (for example, a dedicated RNTI).

In an embodiment, a resource set for sending data is configured, some resources in the resource set are determined, data symbols are mapped based on the some resources, and the data symbols mapped to the some resources are sent. This reduces interference in coordinated multi-node sending, thereby improving reliability and latency performance of the coordinated multi-node sending.

Figure 13:
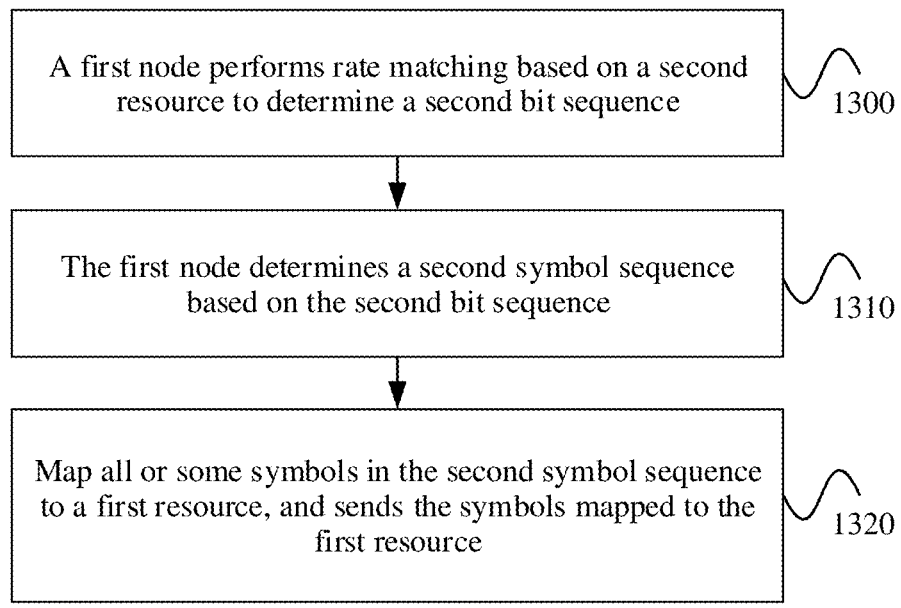
FIG. 13 is a flowchart of a third type of data sending according to an embodiment of this application.

FIG. 13 is a schematic flowchart of still another data sending method according to an embodiment of this application. A difference between the embodiments corresponding to FIG. 3 and FIG. 12 and this embodiment of this application includes at least the following: In the embodiments described in FIG. 3 and FIG. 12, how to perform rate matching to obtain a bit sequence required for a subsequent operation may not be limited; it is specified in the embodiment described in FIG. 13 that rate matching may be performed based on a second resource to obtain a bit sequence required for a subsequent operation. For example, rate matching is performed based on a size of the second resource or based on the second resource and a first resource, to obtain the bit sequence required for the subsequent operation. As shown in FIG. 13, the method in this embodiment may include the following parts.

Part 1300: A first node performs rate matching based on a second resource to determine a second bit sequence.

Part 1310: The first node determines a second symbol sequence based on the second bit sequence.

Part 1320: Map all or some symbols in the second symbol sequence to a first resource, and sends the symbols mapped to the first resource. The first resource is a subset of the second resource. In an embodiment, the first resource is a proper subset of the second resource.

It may be understood that the first node in part 1300, part 1310, and part 1320 may be a terminal or a network device.

Figure 14A:
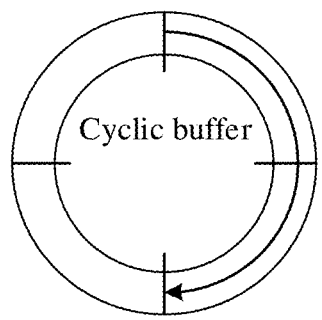
FIG. 14A is a schematic diagram of a fifth type of rate matching or bit selection according to an embodiment of this application.
Figure 14A:
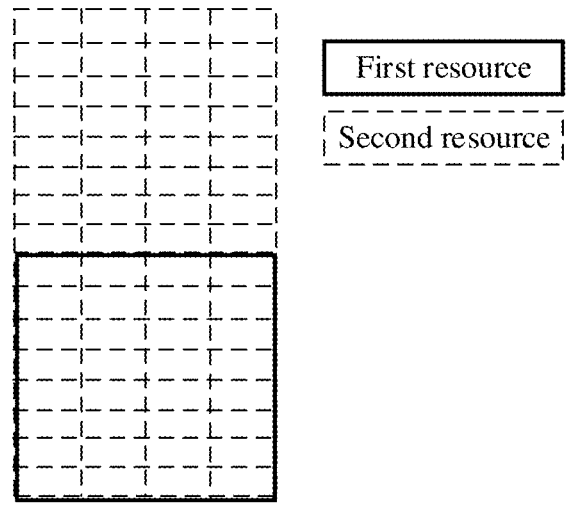

In an embodiment of part 1300, the first node performs bit selection or the rate matching based on a size of the second resource, to determine the second bit sequence. FIG. 14A is used as an example. A left diagram in FIG. 14A shows a cyclic buffer in which data bits are stored. A right diagram in FIG. 14A shows a second resource identified by dashed lines and a first resource that is in the second resource and identified by solid lines. For example, the second resource includes a time domain resource and a frequency domain resource, and includes M REs. It may be understood that the size of the second resource is M. In other words, a maximum of M modulation symbols can be mapped to the second resource, and the M modulation symbols correspond to N bits. For example, if a modulation order is Qm, N satisfies N=M*Qm. The first node may determine, based on M, a quantity N of bits that need to be extracted from the cyclic buffer, and the N bits are the second bit sequence. In an embodiment, a start point of the bit selection may be configured by a control node or predefined, and the first node extracts N bits from the cyclic buffer based on the start point of the bit selection and the quantity N of bits. For example, in FIG. 14A, the start point of the bit selection is a 12 o'clock position of the cyclic buffer, and 2*N bits are stored in the cyclic buffer. In this case, the first node selects N bits clockwise from the 12 o'clock position of the cyclic buffer to a 6 o'clock position of the cyclic buffer, and the N bits are the second bit sequence.

Figure 14B:
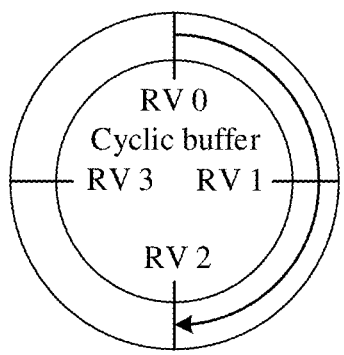
FIG. 14B is a schematic diagram of a sixth type of rate matching or bit selection according to an embodiment of this application.
Figure 14B:
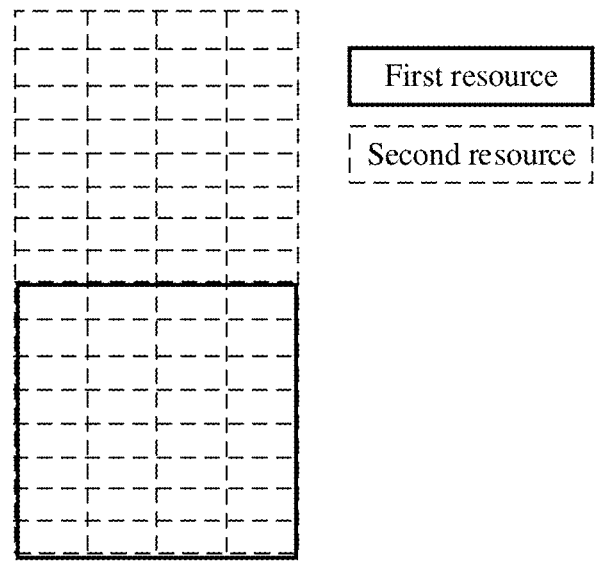

In an embodiment, the first node performs the bit selection or the rate matching based on the size of the second resource and an RV, to determine the second bit sequence. FIG. 14B is used as an example. A left diagram in FIG. 14B shows a cyclic buffer in which data bits are stored, and also shows positions of different RVs in the cyclic buffer (for example, RV 0: 12 o'clock position of the cyclic buffer; RV 1: 3 o'clock position of the cyclic buffer; RV 2: 6 o'clock position of the cyclic buffer; RV 3: 9 o'clock position of the cyclic buffer). A right diagram in FIG. 14B shows a second resource identified by dashed lines and a first resource that is in the second resource and identified by solid lines. For example, the second resource includes a time domain resource and a frequency domain resource, and includes M REs. It may be understood that the size of the second resource is M. In other words, a maximum of M modulation symbols can be mapped to the second resource, and the M modulation symbols correspond to N bits. For example, if a modulation order is Qm, N satisfies N=M*Qm. The first node may determine, based on M, a quantity N of bits that need to be extracted from the cyclic buffer, and the N bits are the second bit sequence. The first node extracts the N bits from the cyclic buffer based on the RV and the quantity N of bits. For example, in FIG. 14B, the RV is RV 0, and 2*N bits are stored in the cyclic buffer. In this case, the first node selects N bits clockwise from the 12 o'clock position of the cyclic buffer to the 6 o'clock position of the cyclic buffer, and the N bits are the second bit sequence. It may be understood that the foregoing specific RV (for example, RV 0 in the foregoing example) may be predefined, or may be notified by the control node to the first node. The quantity of RVs is merely an example, and a specific quantity of RVs is not limited in this embodiment of this application.

It may be understood that, when the embodiment of part 1300 is performed, in part 1320, the first node maps the symbols in the second symbol sequence to the first resource, and sends the symbols mapped to the first resource. For a method for determining the symbols, refer to the foregoing descriptions of part 310 in FIG. 3. Details are not described herein again.

In an embodiment of part 1300, the first node performs bit selection or the rate matching based on a position of the first resource in the second resource (which may also be understood as a relative position relationship between the first resource and the second resource), to determine the second bit sequence. FIG. 14A is used as an example. For example, if the first resource includes eight low-frequency subcarriers of the second resource in frequency domain, the first node selects the second bit sequence clockwise from the 12 o'clock position of the cyclic buffer to the 6 o'clock position of the cyclic buffer. FIG. 14C is used as another example. For example, if the first resource includes eight high-frequency subcarriers of the second resource in frequency domain, the first node selects the second bit sequence clockwise from the 6 o'clock position of the cyclic buffer to the 12 o'clock position of the cyclic buffer. It may be understood that, in the foregoing examples, the positions of the first resource in the second resource and the positions at which corresponding bits are extracted from the cyclic buffer are merely used as examples. A specific position of the first resource in the second resource and positions at which corresponding bits are extracted in the rate matching or bit selection are not limited in this embodiment of this application.

In an embodiment, the first node performs the rate matching or bit selection based on the position of the first resource in the second resource (which may also be understood as the relative position relationship between the first resource and the second resource) and an RV, to determine the second bit sequence. In an embodiment, the RV is a reference RV. For example, in FIG. 14B, the reference RV is RV 0. For example, if the first resource includes eight low-frequency subcarriers of the second resource in frequency domain, and the first node determines that a start point of the bit selection in the cyclic buffer shown in the figure is a position (namely, the 12 o'clock position) corresponding to the reference RV (RV 0), the first node selects the second bit sequence clockwise from the 12 o'clock position of the cyclic buffer to the 6 o'clock position of the cyclic buffer. For example, in FIG. 14D, the reference RV is RV 0. For example, if the first resource includes eight high-frequency subcarriers of the second resource in frequency domain, and the first node determines that a start point of the bit selection in the cyclic buffer shown in the figure is a position (namely, the 6 o'clock position) corresponding to a clockwise offset of 180 degrees from a position corresponding to the reference RV (RV 0), the first node selects the second bit sequence clockwise from the 6 o'clock position of the cyclic buffer to the 12 o'clock position of the cyclic buffer. It may be understood that, in the foregoing examples, the positions of the first resource in the second resource, the reference RV, a quantity of RVs, positions at which corresponding bits are extracted from the cyclic buffer, and a length of the bits are merely used as examples. In addition, it may be understood that the foregoing specific reference RV (for example, RV 0 in the foregoing example) may be predefined, or may be notified by the control node to the first node.

It may be understood that, when the embodiment of part 1300 is performed, in part 1320, the first node maps all the symbols in the second symbol sequence to the first resource.

It may be understood that although performing the bit selection clockwise in the cyclic buffer is described in the foregoing examples, another manner (for example, a counterclockwise order or a discontinuous manner) in which the bit selection is performed in the cyclic buffer is not limited in this embodiment of this application. In the foregoing examples, the cyclic buffer is used as an example to describe a process of the rate matching or bit selection. However, it may be understood that, in the embodiments of this application, a buffer for the rate matching or bit selection may have another type of structure (for example, an array, a queue, a container, a stack, a linear table, a pointer, a linked list, a tree, a graph, a structure, a class, a pile, or a hash table).

It may be understood that the size of the first resource and the size of the second resource are shown in only two dimensions: a time domain dimension and a frequency domain dimension. If the first resource and the second resource each further include a resource in another dimension (for example, a space domain dimension or a code domain dimension), the size of the first resource and the size of the second resource further need to include the resource in the another dimension. In addition, it may be understood that there may be one or more first resources and one or more second resources. It may be understood that the second resource may be configured for a plurality of first nodes.

For an embodiment of part 1310, refer to the descriptions of determining the first symbol sequence by the first node based on the first bit sequence in the embodiment shown in FIG. 3. Details are not described herein again.

In an embodiment of part 1320, all the symbols in the second symbol sequence are mapped to the first resource. For example, if a quantity of the symbols in the second symbol sequence is M, a quantity of symbols that can be mapped to the first resource is M1, and M is less than or equal to M1, the first node maps all the M symbols in the second symbol sequence to M REs of the first resource. For a specific mapping method, refer to the descriptions of mapping the symbols to the first resource in the embodiment shown in FIG. 3, or refer to the descriptions of mapping the symbols in the first symbol sequence to the second resource in the embodiment shown in FIG. 12. Details are not described herein again.

In an embodiment of part 1320, the first node maps the symbols in the second symbol sequence to the first resource. For example, if a quantity of the symbols in the second symbol sequence is M, a quantity of symbols that can be mapped to the first resource is M1, and M is greater than M1, the first node maps M2 symbols in the second symbol sequence to M2 REs of the first resource, where M2 is less than or equal to M1. For a specific mapping method, refer to the descriptions of mapping the symbols to the first resource in the embodiment shown in FIG. 3, or refer to the descriptions of mapping the symbols in the first symbol sequence to the second resource in the embodiment shown in FIG. 12. Details are not described herein again. In an embodiment, the first node may determine the symbols in the second symbol sequence. For a specific determining method, refer to the descriptions of determining, by the first node, the some to-be-mapped symbols in the first symbol sequence in the embodiment shown in FIG. 3. Details are not described herein again.

In part 1320, for an embodiment of power control used by the first node to send the symbol mapped to the first resource, refer to the descriptions of power control performed by the first node in part 320 shown in FIG. 3. Details are not described herein again.

For the first resource and the second resource in the foregoing embodiment, refer to the descriptions of the first resource and the second resource in the embodiment shown in FIG. 3. For a method for determining the first resource by the first node in the foregoing embodiment, refer to the descriptions of determining the first resource by the first node in the embodiment shown in FIG. 3. For a method for determining the second resource by the first node in the foregoing embodiment, refer to the descriptions of determining the second resource by the first node in the embodiment shown in FIG. 3. Details are not described herein again.

In an embodiment, the first node reports whether the first node has a capability of performing the data sending method shown in FIG. 13. The reporting may be performed by using a physical layer message, a higher layer message, a measurement reporting message scrambled by using a specific sequence, a feedback message using a specific sequence, or a pilot using a specific sequence.

In an embodiment, the control node configures a plurality of first nodes into a group, and the plurality of first nodes included in the group perform data transmission according to the data sending method shown in FIG. 13. The plurality of first node may be configured into a group by using a physical layer message and/or a higher layer message.

In an embodiment, the control node configures or triggers the first node to perform the data sending method shown in FIG. 13. In an embodiment, the control node may also configure or trigger the first node not to perform the data sending method shown in FIG. 13. The configuration or triggering may be performed by using a physical layer message and/or a higher layer message. When the configuration or triggering is performed by using a physical layer message, the physical layer message may be scrambled by using a dedicated identifier (for example, a dedicated RNTI).

In an embodiment, a resource set for sending data is configured, some resources in the resource set are determined, data symbols are mapped based on the some resources, and the data symbols mapped to the some resources are sent. This reduces interference in coordinated multi-node sending, thereby improving reliability and latency performance of the coordinated multi-node sending.

FIG. 15 is a schematic flowchart of yet another data sending method according to an embodiment of this application. A difference between this embodiment of this application and the embodiments corresponding to FIG. 3, FIG. 12, and FIG. 13 includes at least the following: In the embodiments described in FIG. 3, FIG. 12, and FIG. 13, a focus is mainly an operation of resource mapping and/or rate matching; in the embodiment described in FIG. 15, a focus is how to determine a second resource. As shown in FIG. 15, the method in this embodiment may include the following parts.

Part 1500: A first node receives group common information, and determines a second resource based on the group common information, where the group common information is included in physical layer control information. For a detailed embodiment of the group common information, refer to the descriptions of the fifth information in the embodiment shown in FIG. 3. For the second resource, refer to the descriptions of the second resource in the embodiment shown in FIG. 3. For determining of the second resource by the first node, refer to the descriptions of determining the second resource by the first node in the embodiment shown in FIG. 3. Details are not described herein again.

Part 1510: The first node determines a first resource, and sends data by using the first resource, where the first resource is a subset of the second resource. In an embodiment, the first resource is a proper subset of the second resource. For the first resource, refer to the descriptions of the first resource in the embodiment shown in FIG. 3. For determining of the first resource by the first node, refer to the descriptions of determining the first resource by the first node in the embodiment shown in FIG. 3. Details are not described herein again.

It may be understood that the first node in part 1500 and part 1510 may be a terminal or a network device. The operation of determining the first resource by the first node in part 1510 may alternatively be performed in part 1500.

In an embodiment, the first node performs rate matching or bit selection to determine a data bit. For a specific embodiment, refer to the descriptions of performing rate matching or bit selection by the first node in the embodiment shown in FIG. 3, FIG. 12, or FIG. 13. In an embodiment, the first node determines a data symbol based on the data bit. For a specific embodiment, refer to the descriptions of determining a symbol sequence by the first node based on a bit sequence in the embodiment shown in FIG. 3, FIG. 12, or FIG. 13. In an embodiment, the first node maps the data symbol to the first resource. For a specific embodiment method, refer to the descriptions of mapping symbols to the first resource by the first node in the embodiment shown in FIG. 3, FIG. 12, or FIG. 13. In an embodiment, the first node controls power for sending the data symbol mapped to the first resource. For a specific embodiment, refer to the descriptions of controlling power by the first node in the embodiment shown in FIG. 3, FIG. 12, or FIG. 13.

In an embodiment, the first node reports whether the first node has a capability of performing the data sending method shown in FIG. 15. The reporting may be performed by using a physical layer message, a higher layer message, a measurement reporting message scrambled by using a specific sequence, a feedback message using a specific sequence, or a pilot using a specific sequence.

In an embodiment, a control node configures a plurality of first nodes into a group, and the plurality of first nodes included in the group perform data transmission according to the data sending method shown in FIG. 15. The plurality of first node may be configured into a group by using a physical layer message and/or a higher layer message. In an embodiment, the group common information may be detected or received by the plurality of first nodes in the group.

In an embodiment, the control node configures or triggers the first node to perform the data sending method shown in FIG. 15. In an embodiment, the control node may also configure or trigger the first node not to perform the data sending method shown in FIG. 15. The configuration or triggering may be performed by using a physical layer message and/or a higher layer message. When the configuration or triggering is performed by using a physical layer message, the physical layer message may be scrambled by using a dedicated identifier (for example, a dedicated RNTI).

In an embodiment, a resource set for sending data is configured, some resources in the resource set are determined, data symbols are mapped based on the some resources, and the data symbols mapped to the some resources are sent. This reduces interference in coordinated multi-node sending, thereby improving reliability and latency performance of the coordinated multi-node sending.

Figure 16:
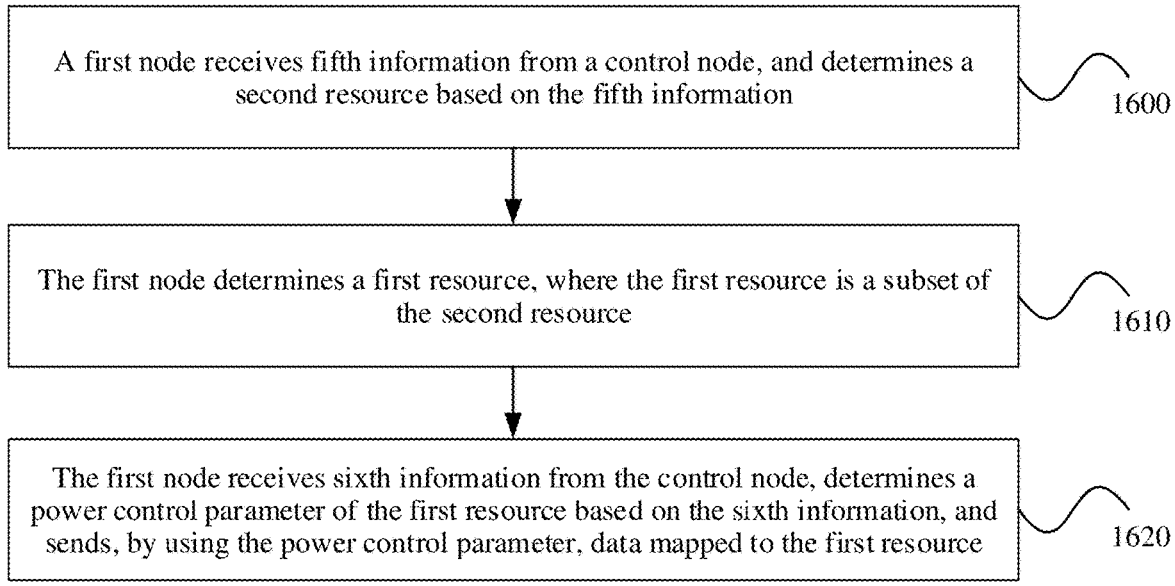
FIG. 16 is a flowchart of a fifth type of data sending according to an embodiment of this application.

FIG. 16 is a schematic flowchart of still yet another data sending method according to an embodiment of this application. A difference between this embodiment of this application and the embodiments corresponding to FIG. 3, FIG. 12, FIG. 13, and FIG. 15 includes at least the following: In the embodiment described in FIG. 16, a focus is how to control power to send data mapped to the first resource. As shown in FIG. 16, the method in this embodiment may include the following parts.

Part 1600: A first node receives fifth information from a control node, and determines a second resource based on the fifth information. In an embodiment, the fifth information is included in physical layer control information. For a detailed embodiment of the fifth information, refer to the descriptions of the fifth information in the embodiment shown in FIG. 3. For the second resource, refer to the descriptions of the second resource in the embodiment shown in FIG. 3. For determining of the second resource by the first node, refer to the descriptions of determining the second resource by the first node in the embodiment shown in FIG. 3. Details are not described herein again.

Part 1610: The first node determines a first resource, where the first resource is a subset of the second resource. In an embodiment, the first resource is a proper subset of the second resource. In an embodiment, there are one or more first resources. In an embodiment, when there are a plurality of first resources, the plurality of first resources may constitute the second resource, and the plurality of first resources do not overlap each other. For the first resource, refer to the descriptions of the first resource in the embodiment shown in FIG. 3. For determining of the first resource by the first node, refer to the descriptions of determining the first resource by the first node in the embodiment shown in FIG. 3. Details are not described herein again.

Part 1620: The first node receives sixth information from the control node, determines a power control parameter of the first resource or of the second resource based on the sixth information, and sends, by using the power control parameter, data mapped to the first resource. In an embodiment, there may be one or more first nodes. For a detailed embodiment of the sixth information, refer to the descriptions of the sixth information in the embodiment shown in FIG. 3. For a detailed embodiment of determining the power control parameter of the first resource or of the second resource by the first node based on the sixth information, refer to the descriptions of obtaining the power control parameter of the first resource or of the second resource by the one or more first nodes based on the sixth information in the embodiment shown in FIG. 3. Details are not described herein again.

It may be understood that the first node in part 1600, part 1610, and part 1620 may be a terminal or a network device.

It may be understood that an execution sequence of part 1600 and part 1610 is not limited in this embodiment of this application. Part 1600 may be performed first, and then part 1610 is performed. Alternatively, part 1610 may be performed first, and then part 1600 is performed. The part 1600 and the part 1610 may alternatively be performed at the same time. The operation of receiving the sixth information by the first node and determining the power control parameter of the first resource by the first node based on the sixth information in part 1620 may alternatively be performed in part 1600 or part 1610.

In an embodiment, the second resource may further include a third resource, the third resource is a proper subset of the second resource, and there is no intersection between the third resource and the first resource. In an embodiment, a power control parameter of the third resource is different from the power control parameter of the first resource. For detailed descriptions of the third resource, refer to the descriptions of the third resource in the embodiment shown in FIG. 3. For detailed descriptions of the power control parameter of the third resource, refer to the descriptions of the power control parameter of the third resource in the embodiment shown in FIG. 3.

In an embodiment, the first node may obtain the power control parameter of the third resource via the sixth information, or may obtain the power control parameter of the third resource via other information that is from the control node and that is different from the sixth information. For a specific obtaining manner, refer to the foregoing method for obtaining the power control parameter of the first resource via the sixth information. Details are not described herein again.

In an embodiment, the first node performs rate matching or bit selection to determine a data bit. For a specific embodiment, refer to the descriptions of performing rate matching or bit selection by the first node in the embodiment shown in FIG. 3, FIG. 12, or FIG. 13. In an embodiment, the first node determines a data symbol based on the data bit. For a specific embodiment, refer to the descriptions of determining a symbol sequence by the first node based on a bit sequence in the embodiment shown in FIG. 3, FIG. 12, or FIG. 13. In an embodiment, the first node maps the data symbol to the first resource. For a specific embodiment, refer to the descriptions of mapping symbols to the first resource by the first node in the embodiment shown in FIG. 3, FIG. 12, or FIG. 13.

In an embodiment, the first node reports whether the first node has a capability of performing the data sending method shown in FIG. 16. The reporting may be performed by using a physical layer message, a higher layer message, a measurement reporting message scrambled by using a specific sequence, a feedback message using a specific sequence, or a pilot using a specific sequence.

In an embodiment, a control node configures a plurality of first nodes into a group, and the plurality of first nodes included in the group perform data transmission according to the data sending method shown in FIG. 16. The plurality of first node may be configured into a group by using a physical layer message and/or a higher layer message.

In an embodiment, the control node configures or triggers the first node to perform the data sending method shown in FIG. 16. In an embodiment, the control node may also configure or trigger the first node not to perform the data sending method shown in FIG. 16. The configuration or triggering may be performed by using a physical layer message and/or a higher layer message. When the configuration or triggering is performed by using a physical layer message, the physical layer message may be scrambled by using a dedicated identifier (for example, a dedicated RNTI).

In an embodiment, a resource set for sending data is configured, some resources in the resource set and a power control parameter of the some resources are determined, power for sending data symbols mapped to the some resources is determined based on the power control parameter, and the data symbols mapped to the some resources are sent. This reduces interference in coordinated multi-node sending, thereby improving reliability and latency performance of the coordinated multi-node sending.

Figure 17:
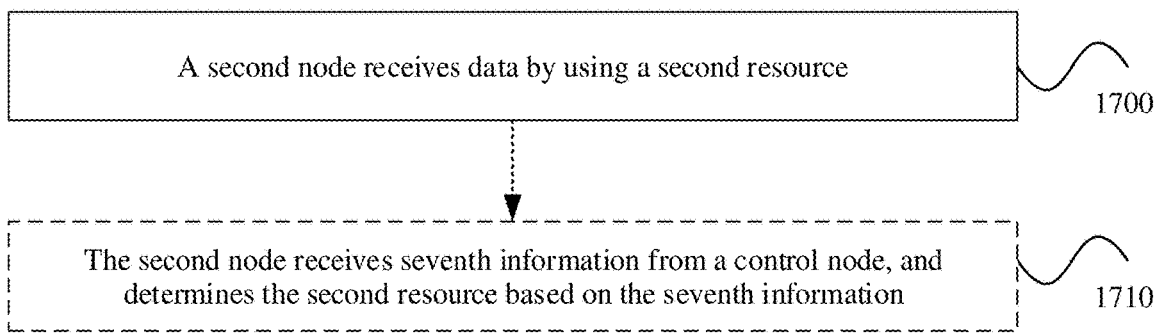
FIG. 17 is a flowchart of data receiving according to an embodiment of this application.

FIG. 17 is a schematic flowchart of a data receiving method according to an embodiment of this application. A difference between this embodiment of this application and the foregoing embodiments includes at least the following: In an embodiment, related methods of this application are described mainly from a perspective of a sending-side node; in this embodiment of this application, a related method of this application is described mainly from a perspective of a receiving-side node. As shown in FIG. 17, the method in this embodiment may include the following parts.

Part 1700: A second node receives data by using a second resource.

In an embodiment, in part 1710, the second node receives seventh information from a control node, and determines the second resource based on the seventh information. In an embodiment, the seventh information may be included in a physical layer message. The physical layer message may be, for example, DCI from a network device, or may be, for example, SCI from a terminal. The second node receives the physical layer message to obtain the second resource. In an embodiment, the seventh information may be included in a higher layer message. The higher layer message may be, for example, a MAC layer message or an RRC layer message from the network device. The second node receives the higher layer message to obtain the second resource. It may be understood that the seventh information may alternatively be included in a physical layer message and a higher layer message. For example, the second node receives the higher layer message to obtain a plurality of candidate second resources, and receives the physical layer message to determine the second resource in the plurality of candidate second resources. In an embodiment, the seventh information is group common information. In an embodiment, group common information including the seventh information is carried on a GC-PDCCH. In an embodiment, group common information including the seventh information is included in a higher layer message (for example, a system message). It may be understood that the second resource may be configured for a plurality of second nodes.

For the second resource in the foregoing embodiment, refer to the descriptions of the second resource in the embodiment shown in FIG. 3. Details are not described herein again.

It may be understood that the second node in part 1700 and part 1710 may be a terminal or a network device.

It may be understood that an execution sequence of part 1700 and part 1710 is not limited in this embodiment of this application. Part 1700 may be performed first, and then part 1710 is performed. Alternatively, part 1710 may be performed first, and then part 1700 is performed. The part 1700 and the part 1710 may alternatively be performed at the same time.

In an embodiment, the second node reports whether the second node has a capability of performing the data receiving method shown in FIG. 17. The reporting may be performed by using a physical layer message, a higher layer message, a measurement reporting message scrambled by using a specific sequence, a feedback message using a specific sequence, or a pilot using a specific sequence.

In an embodiment, the control node configures a plurality of second nodes into a group, and the plurality of second nodes included in the group receive data according to the data receiving method shown in FIG. 17. The plurality of second node may be configured into a group by using a physical layer message and/or a higher layer message.

In an embodiment, the control node configures or triggers the second node to perform the data receiving method shown in FIG. 17. In an embodiment, the control node may also configure or trigger the second node not to perform the data receiving method shown in FIG. 17. The configuration or triggering may be performed by using a physical layer message and/or a higher layer message. When the configuration or triggering is performed by using a physical layer message, the physical layer message may be scrambled by using a dedicated identifier (for example, a dedicated RNTI).

In an embodiment, the data is received on a resource set. This reduces interference in coordinated multi-node sending, thereby improving reliability and latency performance of the coordinated multi-node sending, and reducing receiving complexity on a receiving side.

Figure 18:
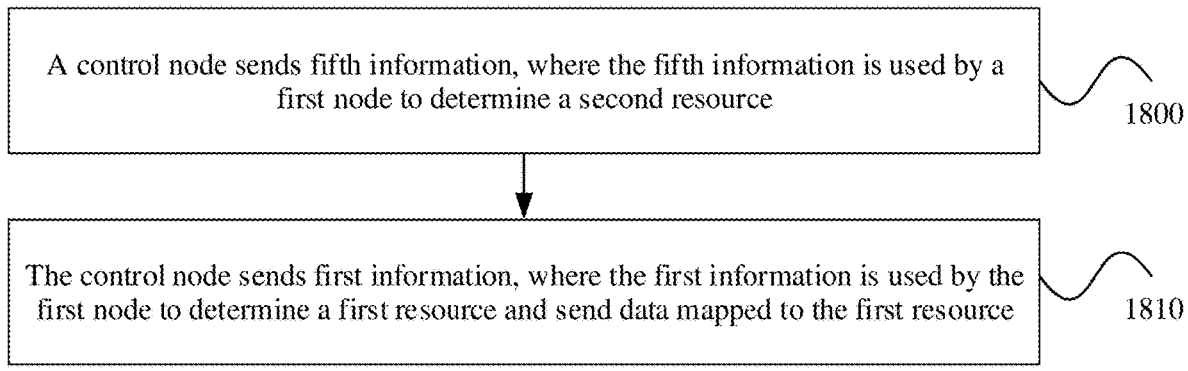
FIG. 18 is a flowchart of a sixth type of data sending according to an embodiment of this application.

FIG. 18 is a schematic flowchart of a data sending method according to an embodiment of this application. A difference between this embodiment of this application and the foregoing embodiments includes at least the following: In an embodiment, a related method of this application is described mainly from a perspective of a control node. As shown in FIG. 18, the method in this embodiment may include the following parts.

Part 1800: The control node sends fifth information, where the fifth information is used to determine a second resource. For a detailed method of the fifth information, refer to the descriptions of the fifth information in the embodiment shown in FIG. 3. For the second resource, refer to the descriptions of the second resource in the embodiment shown in FIG. 3. For determining of the second resource by the first node, refer to the descriptions of determining the second resource by the first node in the embodiment shown in FIG. 3. Details are not described herein again.

Part 1810: The control node sends first information, where the first information is used to determine a first resource. In an embodiment, the control node receives data on the second resource. In an embodiment, the first resource is a proper subset of the second resource. For a detailed method of the first information, refer to the descriptions of the first information in the embodiment shown in FIG. 3. For the first resource, refer to the descriptions of the first resource in the embodiment shown in FIG. 3. For determining of the first resource by the first node, refer to the descriptions of determining the first resource by the first node in the embodiment shown in FIG. 3. Details are not described herein again.

It may be understood that the control node in this embodiment of this application may be a network device or a terminal.

It may be understood that an execution sequence of part 1800 and part 1810 is not limited in this embodiment of this application. Part 1800 may be performed first, and then part 1810 is performed. Alternatively, part 1810 may be performed first, and then part 1800 is performed. The part 1800 and the part 1810 may alternatively be performed at the same time.

In an embodiment, the control node sends second information, where the second information is used to determine a sub-resource included in the first resource. For a detailed method of the second information, refer to the descriptions of the second information in the embodiment shown in FIG. 3. For a detailed method of determining, by the first node, the sub-resource included in the first resource, refer to the descriptions of determining, by the first node, the sub-resource included in the first resource in the embodiment shown in FIG. 3. Details are not described herein again.

In an embodiment, the control node sends third information, where the third information is used to determine a parameter of the sub-resource. For a detailed method of the third information, refer to the descriptions of the third information in the embodiment shown in FIG. 3. For a detailed method of determining the parameter of the sub-resource by the first node, refer to the descriptions of determining the parameter of the sub-resource by the first node in the embodiment shown in FIG. 3. Details are not described herein again.

In an embodiment, the control node sends fourth information, where the fourth information is used to determine a parameter of the first resource. For a detailed method of the fourth information, refer to the descriptions of the fourth information in the embodiment shown in FIG. 3. For a detailed method of determining the parameter of the first resource by the first node, refer to the descriptions of determining the parameter of the first resource by the first node in the embodiment shown in FIG. 3. Details are not described herein again.

In an embodiment, the control node sends sixth information, where the sixth information is used to determine a power control parameter of the first resource. For a detailed method of the sixth information, refer to the descriptions of the sixth information in the embodiment shown in FIG. 3. For a detailed method of determining the power control parameter of the first resource by the first node, refer to the descriptions of determining the power control parameter of the first resource by the first node in the embodiment shown in FIG. 3. Details are not described herein again.

In an embodiment, the control node sends seventh information, where the seventh information is used to determine the second resource. For a detailed method of the seventh information, refer to the descriptions of the seventh information in the embodiment shown in FIG. 17. For a detailed method of determining second resource by the second node, refer to the descriptions of determining the second resource by the second node in the embodiment shown in FIG. 17. Details are not described herein again.

In an embodiment, a resource set for sending data is configured, some resources in the resource set are determined, to-be-sent data is mapped based on the some resources, and the data is sent. This reduces interference in coordinated multi-node sending, thereby improving reliability and latency performance of the coordinated multi-node sending.

In an embodiment, in the accompanying drawings, the first resource, the second resource, and the sub-resource are all shown by using continuous resources in time domain or frequency domain as examples. However, a person skilled in the art may understand that specific distribution of the first resource, the second resource, or the sub-resource in various resource dimensions is not limited in the embodiments of this application. In the embodiments of this application, the first resource, the second resource, or the sub-resource may alternatively be discontinuous resources in various resource dimensions.

In an embodiment, the first resource, the second resource, or the sub-resource may not include a resource to which one or more of a pilot (RS), a synchronization signal (SS), a physical broadcast channel (PBCH), or an SS/PBCH block are mapped. FIG. 9B or FIG. 9C is used as an example. Considering mapping of a pilot (RS) on a resource, resources in the first resource or the second resource may be discontinuously distributed in time domain or frequency domain.

In an embodiment, the first resource, the second resource, or the sub-resource may alternatively include a resource to which one or more of an RS, an SS, a PBCH, or an SS/PBCH block are mapped. FIG. 9B is used as an example. The first resource shown in FIG. 9B includes REs to which RSs are mapped. Resource positions to which the RSs are mapped may be skipped, and symbols in the first symbol sequence or in the second symbol sequence may be discontinuously mapped. FIG. 9C is used as another example. The first resource shown in FIG. 9C includes REs to which RSs are mapped. Resource positions to which the RSs are mapped may be skipped, and symbols in the first symbol sequence or in the second symbol sequence may be continuously mapped.

It may be understood that the resource positions to which the RS s in FIG. 9B and FIG. 9C are mapped are merely used as examples, and an RS may alternatively be mapped to another resource position. This is not limited in the embodiments of this application.

In an embodiment, mapping of symbols to the first resource, to the second resource, or to the sub-resource may include mapping of the symbols to all or a part of the first resource, to all or a part of the second resource, or to all or a part of the sub-resource.

Descriptions in which A is related to B in this application are merely used to describe a correspondence between A and B, and are not used to limit a specific embodiment of the correspondence between A and B in the embodiments of this application. For example, the correspondence between A and B may be implemented in a specific manner such as by using a function or a mapping table.

The correspondences shown in the tables in this application may be configured, or may be predefined, stored, pre-negotiated, pre-configured, or fixed. Values of indication information in the tables are merely examples, and may alternatively be other values. This is not limited in this application. In an embodiment, all correspondences shown in the tables are not necessarily provided. For example, in the foregoing tables, correspondences shown in some rows may neither be configured nor pre-defined. For another example, proper deformations and adjustments such as splitting and combination may be performed based on the foregoing tables. Names of the parameters shown in headers of the foregoing tables may also be other names that can be understood by a communications device, and values or representation manners of the parameters may also be other values or representation manners that can be understood by the communications device. In an embodiment, another data structure, such as an array, a queue, a container, a stack, a linear table, a pointer, a linked list, a tree, a graph, a structure, a class, a pile, or a hash table, may be used.

It may be understood that the methods implemented by the communications device in the foregoing method embodiments may alternatively be implemented by a component (for example, an integrated circuit or a chip) that can be used in the communications device. The first node, the second node, or the control node in the foregoing method embodiments may be understood as a communications device.

Corresponding to the wireless communication method provided in the foregoing method embodiments, an embodiment of this application further provides a corresponding communications apparatus (which is sometimes also referred to as a communications device). The communications apparatus includes a corresponding module configured to perform each part in the foregoing embodiments. The module may be software, hardware, or a combination of software and hardware.

Figure 19:
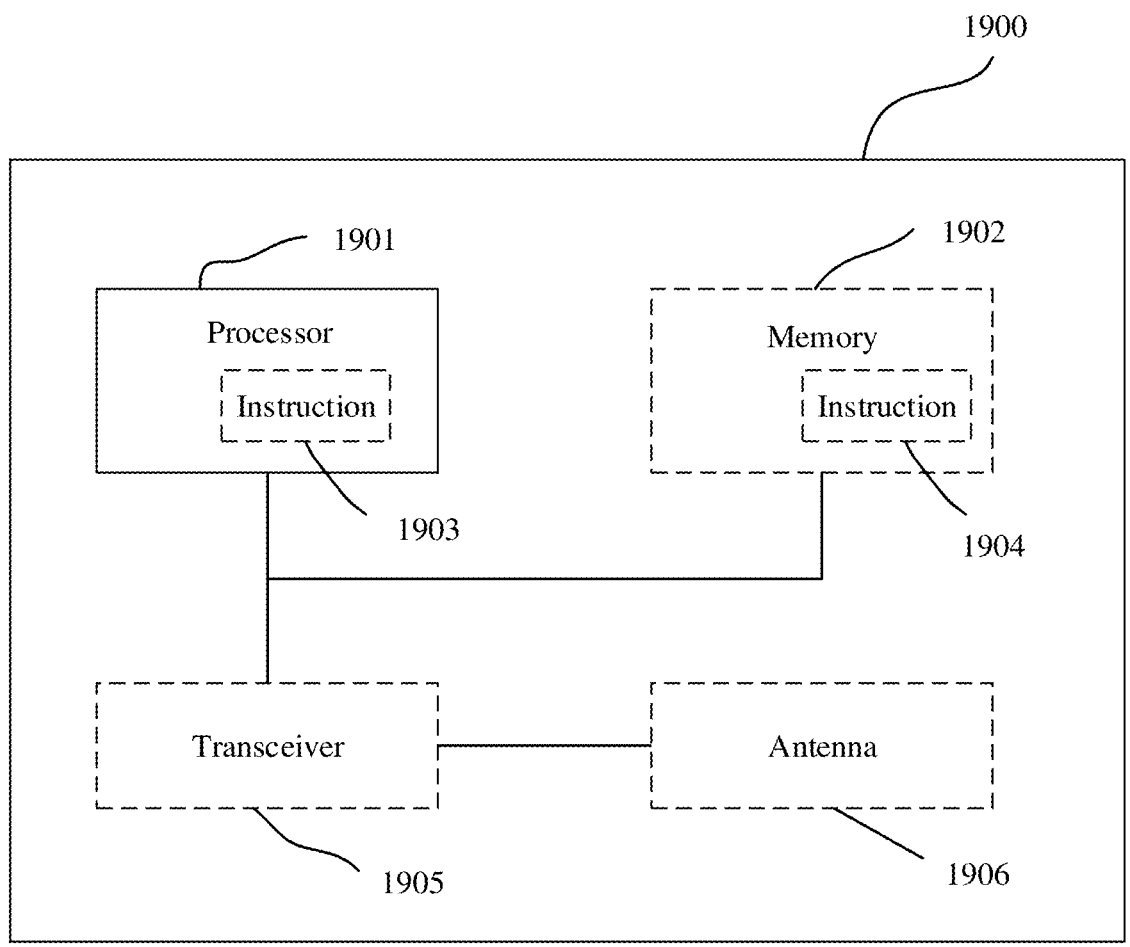
FIG. 19 is a schematic structural diagram of a communications apparatus according to an embodiment of this application.

FIG. 19 is a schematic structural diagram of a communications apparatus. The communications apparatus 1900 may be the network device 10 or 20 in FIG. 1A, a chip disposed in the network device, the terminal 11, 12, 21, or 22 in FIG. 1A, or a chip disposed in the terminal. The communications apparatus may be configured to implement the methods that correspond to the communications device and that are described in the foregoing method embodiments. For details, refer to the descriptions in the foregoing method embodiments.

The communications apparatus 1900 may include one or more processors 1901. The processor 1901 may also be referred to as a processing unit, and may implement a specific control function. The processor 1901 may be a general-purpose processor, a dedicated processor, or the like. For example, the processor may be a baseband processor or a central processing unit. The baseband processor may be configured to process a communication protocol and communication data. The central processing unit may be configured to control the communications apparatus (for example, a base station, a baseband chip, a distributed unit (DU), or a centralized unit (CU)), execute a software program, and process data of the software program.

In an embodiment, the processor 1901 may also store an instruction and/or data 1903. The instruction and/or data 1903 may be run by the processor, so that the communications apparatus 1900 performs the methods that correspond to the communications device and that are described in the foregoing method embodiments.

In an embodiment, the processor 1901 may include a transceiver unit configured to implement a receiving function and a sending function. For example, the transceiver unit may be a transceiver circuit or an interface. A circuit or an interface configured to implement the receiving function and a circuit or an interface configured to implement the sending function may be separated or may be integrated together.

In an embodiment, the communications apparatus 1900 may include a circuit. The circuit may implement the sending, receiving, or communication function in the foregoing method embodiments.

In an embodiment, the communications apparatus 1900 may include one or more memories 1902. The memory may store an instruction 1904. The instruction may be run on the processor, so that the communications apparatus 1900 performs the methods described in the foregoing method embodiments. In an embodiment, the memory may further store data. In an embodiment, the processor may further store an instruction and/or data. The processor and the memory may be disposed separately, or may be integrated together. For example, various correspondences described in the foregoing method embodiments may be stored in the memory, or may be stored in the processor.

In an embodiment, the communications apparatus 1900 may further include a transceiver 1905 and an antenna 1906. The processor 1901 may be referred to as a processing unit, and controls the communications apparatus (a terminal or a network device). The transceiver 1905 may be referred to as a transceiver unit, a transceiver machine, a transceiver circuit, a transceiver, or the like, and is configured to implement a transceiver function of the communications apparatus.

In an embodiment, a communications apparatus 1900 (for example, an integrated circuit, a wireless device, a circuit module, a network device, or a terminal) may include a processor 1901 and a transceiver 1905. The processor 1901 performs rate matching to determine a first bit sequence, determines a first symbol sequence based on the first bit sequence, determines some to-be-mapped symbols in the first symbol sequence, and maps the symbols to a first resource. The transceiver 1905 sends the symbols.

The processor and the transceiver described in this application may be implemented on an integrated circuit (IC), an analog IC, a radio frequency integrated circuit RFIC, a hybrid signal IC, an application-specific integrated circuit (ASIC), a printed circuit board (PCB), an electronic device, or the like. The processor and the transceiver may alternatively be manufactured by using various IC process technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

In the descriptions of the foregoing embodiments, the communications apparatus is described by using the network device or the terminal as an example. However, a scope of the communications apparatus described in this application is not limited to the example, and the structure of the communications apparatus may not be limited by FIG. 19. The communications apparatus may be an independent device or may be a part of a relatively large device. For example, the device may be:

(1) an independent integrated circuit IC, a chip, or a chip system or subsystem;
(2) a set including one or more ICs, where the IC set may further include a storage component configured to store data and/or an instruction;
(3) an ASIC, for example, a modem (MSM);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; and
(6) another device or the like.

Figure 20:
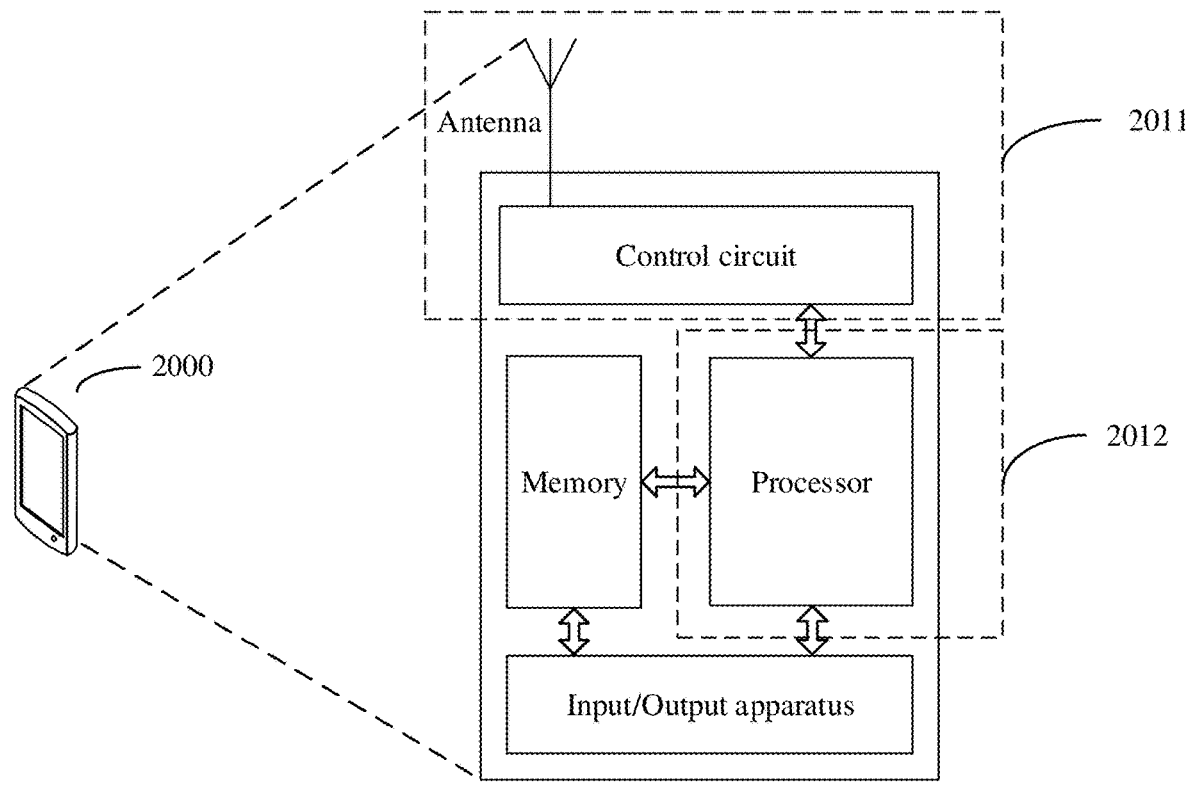
FIG. 20 is a schematic structural diagram of a terminal according to an embodiment of this application.

FIG. 20 is a schematic structural diagram of a terminal. The terminal may be applicable to the system shown in FIG. 1A. For ease of description, FIG. 20 shows only main components of the terminal. As shown in FIG. 20, the terminal 2000 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to: receive data entered by a user and output data to the user.

After user equipment is turned on, the processor may read a software program stored in a storage unit, parse and execute an instruction of the software program, and process data of the software program. When data needs to be sent wirelessly, after performing baseband processing on the to-be-sent data, the processor outputs a baseband signal to a radio frequency circuit. After processing the baseband signal, the radio frequency circuit obtains a radio frequency signal and sends the radio frequency signal to the outside through an antenna in a form of an electromagnetic wave. When data is sent to the user equipment, the radio frequency circuit receives a radio frequency signal by using the antenna, further converts the radio frequency signal into a baseband signal, and outputs the baseband signal to the processor, and the processor converts the baseband signal into data and processes the data.

A person skilled in the art may understand that for ease of description, FIG. 20 shows only one memory and only one processor. An actual terminal may include a plurality of processors and a plurality of memories. The memory may also be referred to as a storage medium, a storage device, or the like. This is not limited in the embodiments of this application.

In an embodiment, the processor may include a baseband processor and a central processing unit. The baseband processor is mainly configured to process a communication protocol and communication data, and the central processing unit is mainly configured to: control the entire terminal, execute a software program, and process data of the software program. The processor in FIG. 20 integrates functions of the baseband processor and the central processing unit. The person skilled in the art may understand that, alternatively, the baseband processor and the central processing unit may be independent processors, and interconnected by using a technology such as a bus. The person skilled in the art may understand that the terminal may include a plurality of baseband processors to adapt to different network standards, and the terminal may include a plurality of central processing units to enhance a processing capability of the terminal. All components of the terminal may be connected by using various buses. The baseband processor may also be expressed as a baseband processing circuit or a baseband processing chip. The central processing unit may also be expressed as a central processing circuit or a central processing chip. A function of processing the communication protocol and communication data may be embedded into the processor, or may be stored in the storage unit in a form of a software program, so that the processor executes the software program to implement a baseband processing function.

In an example, the antenna and the control circuit that have the transceiver function may be considered as a transceiver unit 2011 of the terminal 2000, and the processor having the processing function may be considered as a processing unit 2012 of the terminal 2000. As shown in FIG. 20, the terminal 2000 includes the transceiver unit 2011 and the processing unit 2012. The transceiver unit may also be referred to as a transceiver, a transceiver machine, a transceiver apparatus, or the like. In an embodiment, a component that is in the transceiver unit 2011 and configured to implement a receiving function may be considered as a receiving unit, and a component that is in the transceiver unit 2011 and configured to implement a sending function may be considered as a sending unit. In other words, the transceiver unit 2011 includes the receiving unit and the sending unit. For example, the receiving unit may also be referred to as a receiver, a receiver machine, a receiving circuit, or the like, and the sending unit may be referred to as a transmitter, a transmitter machine, a transmitting circuit, or the like. In an embodiment, the receiving unit and the sending unit may be integrated into one unit, or may be a plurality of units independent of each other. The receiving unit and the sending unit may be located at one geographical location, or may be scattered at a plurality of geographical locations.

Figure 21:
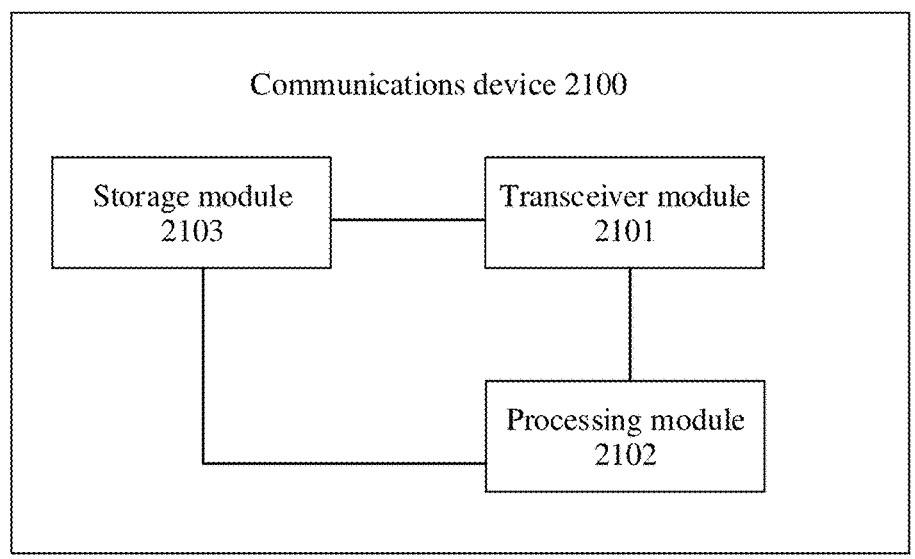
FIG. 21 is a schematic diagram of a communications device according to an embodiment of this application.

As shown in FIG. 21, another embodiment of this application provides a communications apparatus (a communications device) 2100. The communications apparatus may be a terminal (for example, a terminal in the system shown in FIG. 1A) or a component (for example, an integrated circuit or a chip) of a terminal. Alternatively, the communications apparatus may be a network device (where for example, the communications apparatus is a base station device that can be applied to the systems in FIG. 1A and FIG. 1B) or a component (for example, an integrated circuit or a chip) of a network device. Alternatively, the communications apparatus may be another communications module, configured to implement an operation corresponding to a communications device in the method embodiments of this application. The communications apparatus 2100 may include a processing module 2102 (a processing unit). In an embodiment, the communications apparatus 2100 may further include a transceiver module 2101 (a transceiver unit) and a storage module 2103 (a storage unit).

In an embodiment, one or more modules in FIG. 21 may be implemented by one or more processors, may be implemented by one or more processors and memories, may be implemented by one or more processors and transceivers, or may be implemented by one or more processors, memories, and transceivers. This is not limited in this embodiment of this application. The processor, the memory, and the transceiver may be separately disposed, or may be integrated together.

The communications apparatus has a function of implementing the terminal described in the embodiments of this application. For example, the communications apparatus includes modules, units, or means that are of the terminal and that correspond to the operations performed by the terminal described in the embodiments of this application, and the functions, units, or means may be implemented by software, may be implemented by hardware, or may be implemented by hardware executing corresponding software. For details, refer to corresponding descriptions in the foregoing corresponding method embodiments.

Alternatively, the communications apparatus has a function of implementing the network device described in the embodiments of this application. For example, the communications apparatus includes modules, units, or means that are of the network device and that correspond to the operations performed by the network device described in the embodiments of this application, and the functions, units, or means may be implemented by software, may be implemented by hardware, or may be implemented by hardware executing corresponding software. For details, refer to corresponding descriptions in the foregoing corresponding method embodiments.

In an embodiment, the modules in the communications apparatus 2100 in this embodiment of this application may be configured to perform the method described in the embodiment of this application shown in FIG. 3.

The processing module 2102 performs rate matching to obtain a first bit sequence. The processing module 2102 determines a first symbol sequence based on the first bit sequence, determines some to-be-mapped symbols in the first symbol sequence, and maps the symbols to a first resource. The transceiver module 2101 sends the symbols mapped to the first resource.

In an embodiment, the processing module 2102 performs indexing for a second resource, and maps the symbols to the first resource. The transceiver module 2101 sends the symbols.

In an embodiment, the processing module 2102 virtually maps symbols in the first symbol sequence to the second resource, and physically maps the symbols to the first resource. The transceiver module 2101 sends the symbols.

It may be understood that all mappings in this embodiment of this application are understood as physical mappings unless otherwise specified.

In an embodiment, the first resource is a proper subset of the second resource.

In an embodiment, there are one or more first resources.

In an embodiment, the processing module 2102 performs the rate matching based on the second resource, to obtain the first bit sequence.

In an embodiment, the processing module 2102 performs the rate matching based on a redundancy version RV and/or a size of the second resource, to obtain the first bit sequence.

In an embodiment, the processing module 2102 maps the symbols to the first resource based on one or more of the following: the second resource, the first resource, a mapping start point, a mapping sequence, a mapping pattern, or a pilot pattern.

In an embodiment, the processing module 2102 determines the first resource based on first information from a control node, where the first information is included in one or more of the following messages: a physical layer message, a media access control (MAC) layer message, or a radio resource control (RRC) layer message.

In an embodiment, the processing module 2102 determines the first resource based on one or more of the following: the second resource, an active bandwidth part (BWP), a measurement result, or a service scheduling status.

In an embodiment, the second resource includes one or more sub-resources.

In an embodiment, a size of the sub-resource is related to one or more of the following: a size of a resource block group, a size of a mini-slot, a size of a slot, a quantity of beams, a quantity of spatial layers, the size of the second resource, a transport block size (TBS) parameter, a bit rate parameter, or a modulation and coding scheme (MCS) parameter.

In an embodiment, the processing module 2102 determines, based on second information from the control node, a sub-resource included in the first resource, where the second information is included in one or more of the following messages: a physical layer message, a MAC layer message, or an RRC layer message.

In an embodiment, the processing module 2102 determines a sub-resource included in the first resource based on one or more of the following: the second resource, an active BWP, a measurement result, or a service scheduling status.

In an embodiment, a parameter of the sub-resource is related to a parameter of the second resource. The parameter of the sub-resource includes one or more of the following: a pilot parameter, a precoding parameter, a redundancy version parameter, a mapping start point parameter, a coding parameter, or a modulation parameter.

In an embodiment, the processing module 2102 determines the parameter of the sub-resource based on one or more of the following: third information from the control node, or predefined parameter information of the sub-resource. In an embodiment, the third information is included in one or more of the following messages: a physical layer message, a MAC layer message, or an RRC layer message.

In an embodiment, the parameter of the sub-resource includes one or more of the following: a pilot parameter, a precoding parameter, a redundancy version parameter, a mapping start point parameter, a coding parameter, or a modulation parameter.

In an embodiment, a parameter of the first resource is related to the parameter of the second resource. In an embodiment, the parameter of the first resource includes one or more of the following: a pilot parameter, a precoding parameter, a redundancy version parameter, a mapping start point parameter, a coding parameter, or a modulation parameter.

In an embodiment, the processing module 2102 determines the parameter of the first resource based on one or more of the following: fourth information from the control node, or predefined parameter information of the sub-resource. In an embodiment, the fourth information is included in one or more of the following messages: a physical layer message, a MAC layer message, or an RRC layer message. In an embodiment, the parameter of the first resource includes one or more of the following: a pilot parameter, a precoding parameter, a redundancy version parameter, a mapping start point parameter, a coding parameter, or a modulation parameter.

In an embodiment, the transceiver module 2101 receives fifth information from the control node, and the processing module 2102 determines the second resource based on the fifth information. In an embodiment, the fifth information is group common information. In an embodiment, the fifth information is included in physical layer control information, a MAC layer message, or an RRC layer message.

In an embodiment, the transceiver module 2101 receives sixth information from the control node, the processing module 2102 determines a power control parameter of the first resource based on the sixth information, and the transceiver module 2101 sends, by using the power control parameter, data mapped to the first resource. In an embodiment, the sixth information is group common information. In an embodiment, the sixth information is included in physical layer control information, a MAC layer message, or an RRC layer message.

In an embodiment, the second resource may further include a third resource, the third resource is a proper subset of the second resource, and there is no intersection between the third resource and the first resource. In an embodiment, the sixth information further includes a power control parameter of the third resource. In an embodiment, the power control parameter of the third resource is different from the power control parameter of the first resource. In an embodiment, there may be one or more third resources.

In an embodiment, a resource set for sending data is configured, some resources in the resource set are determined, to-be-sent data is mapped based on the some resources, and the data is sent. This reduces interference in coordinated multi-node sending, thereby improving reliability and latency performance of the coordinated multi-node sending.

In an embodiment, the modules in the communications apparatus 2100 in this embodiment of this application may further be configured to perform the method described in the embodiment of this application shown in FIG. 12, FIG. 13, FIG. 15, FIG. 16, FIG. 17, or FIG. 18. For descriptions of performing a method corresponding to another accompanying drawing by the modules, refer to the descriptions of performing the method corresponding to FIG. 3 by the modules. Details are not described herein again.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, an apparatus provided in the embodiments of this application may also correspondingly implement these features or functions. Details are not described herein.

A person skilled in the art may further understand that various illustrative logical blocks and operations that are listed in the embodiments of this application may be implemented by using electronic hardware, computer software, or a combination thereof. Whether the functions are implemented by using hardware or software depends on particular applications and a design requirement of the entire system. The person skilled in the art may use various methods to implement the described functions for each particular application, but it should not be considered that the embodiment goes beyond the scope of the embodiments of this application.

The technologies described in this application may be implemented in various manners. For example, these technologies may be implemented by using hardware, software, or a combination of hardware and software. For hardware implementation, a processing unit configured to perform these technologies at a communications apparatus (for example, a base station, a terminal, a network entity, or a chip) may be implemented in one or more general purpose processors, a digital signal processor (DSP), a digital signal processing device (DSPD), an application-specific integrated circuit (ASIC), a programmable logic device (PLD), a field-programmable gate array (FPGA), or another programmable logic apparatus, a discrete gate or transistor logic, a discrete hardware component, or any combination thereof. The general purpose processor may be a microprocessor. In an embodiment, the general purpose processor may alternatively be any conventional processor, controller, microcontroller, or state machine. The processor may also be implemented by a combination of computing apparatuses, such as a digital signal processor and a microprocessor, a plurality of microprocessors, one or more microprocessors in combination with a digital signal processor core, or any other similar configuration.

A person of ordinary skill in the art may understand that numbers such as first and second in this application are merely used for differentiation for ease of description, are not used to limit the scope of the embodiments of this application, and also indicate a sequence. "And/or" describes an association relationship between associated objects and represents that three relationships may exist. For example, A and/or B may represent the following three cases: Only A exists, both A and B exist, and only B exists. The character "/" or "\" generally represents an "or" relationship between the associated objects. "At least one" means one or more. The at least two means two or more. "At least one", "any one", or a similar expression thereof means any combination of these items, including a singular item (piece) or any combination of plural items (pieces). For example, at least one (piece, or type) of a, b, or c may indicate: a, b, c, a-b, a-c, b-c, or a-b-c, where a, b, and c may be singular or plural.

Operations of the methods or algorithms described in the embodiments of this application may be directly embedded in hardware, an instruction executed by a processor, or a combination thereof. The memory may be a RAM memory, a flash memory, a ROM memory, an EPROM memory, an EEPROM memory, a register, a hard disk, a removable magnetic disk, a CD-ROM, or a storage medium of any other form in the art. For example, the memory may connect to a processor, so that the processor may read information from the memory and write information to the memory. Alternatively, the memory may alternatively be integrated into a processor. The processor and the memory may be disposed in an ASIC, and the ASIC may be disposed in a terminal. In an embodiment, the processor and the memory may alternatively be disposed in different components of the terminal.

All or some of the foregoing embodiments may be implemented by using software, hardware, firmware, or any combination thereof. When being implemented by using the software, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data packet center to another website, computer, server, or data packet center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data packet storage device, such as a server or a data packet center, integrating one or more usable media. The usable medium may be a magnetic medium (for example, a floppy disk, a hard disk, or a magnetic tape), an optical medium (for example, a DVD), a semiconductor medium (for example, a Solid State Disk (SSD)), or the like. The foregoing combination shall also be included in the protection scope of the computer-readable medium.

For same or similar parts in the embodiments of this specification, refer to each other. The foregoing embodiments of this application are not intended to limit the protection scope of this application.

What is claimed is:

1. An apparatus, comprising:
one or more processors;
a non-transitory memory storing a program, which when executed by the one or more processors, cause the one or more processors to perform operations, the operations comprising:
performing rate matching to determine a first bit sequence;
determining a first symbol sequence based on the first bit sequence;
determining to-be-mapped symbols in the first symbol sequence; and
mapping the to-be-mapped symbols to a first resource, and sending the to-be-mapped symbols to a receiving node, wherein the apparatus, operating as a part of a first node, communicates with the receiving node using a first subset of the first resource based on the mapping, wherein the receiving node communicates with a second node using a second subset of the first resource based on mapping determined by the second node, and wherein the first subset of the first resource and the second subset of the first resource are partially overlapping, wherein mapping the to-be-mapped symbols to the first resource, and sending the to-be-mapped symbols, comprises:
performing indexing for a second resource, mapping the to-be-mapped symbols to the first resource, and sending the to-be-mapped symbols.

2. The apparatus according to claim 1, wherein the first resource is a proper subset of the second resource.

3. The apparatus according to claim 1, wherein performing the rate matching to determine the first bit sequence comprises:
performing the rate matching based on the second resource to determine the first bit sequence.

4. The apparatus according to claim 3, wherein performing the rate matching based on the second resource to determine the first bit sequence, comprises: performing the rate matching further based on a redundancy version (RV) and a size of the second resource to determine the first bit sequence.

5. The apparatus according to claim 1, wherein mapping the to-be-mapped symbols to the first resource, comprises: mapping the to-be-mapped symbols to the first resource further based on one or more of the following:
a mapping start point, a mapping sequence, a mapping pattern, or a pilot pattern.

6. The apparatus according to claim 1, wherein the second resource comprises one or more sub-resources.

7. A method, comprising:
performing, by a first node, rate matching to determine a first bit sequence;
determining, by the first node, a first symbol sequence based on the first bit sequence;
determining, by the first node, to-be-mapped symbols in the first symbol sequence; and
mapping, by the first node the to-be-mapped symbols to a first resource, and sending the to-be-mapped symbols to a receiving node, wherein the first node communicates with the receiving node using a first subset of the first resource based on the mapping, wherein the receiving node communicates with a second node using a second subset of the first resource based on mapping determined by the second node, and wherein the first subset of the first resource and the second subset of the first resource are partially overlapping, wherein mapping the to-be-mapped symbols to the first resource, and sending the to-be-mapped symbols, comprises:
performing indexing for a second resource, mapping the to-be-mapped symbols to the first resource, and sending the to-be-mapped symbols.

8. The method according to claim 7, wherein the first resource is a proper subset of the second resource.

9. The method according to claim 7, wherein performing the rate matching to determine the first bit sequence comprises:
performing the rate matching based on the second resource to determine the first bit sequence.

10. The method according to claim 9, wherein performing the rate matching based on the second resource to determine the first bit sequence, comprises: performing the rate matching further based on a redundancy version (RV) and a size of the second resource to determine the first bit sequence.

11. The method according to claim 7, wherein mapping the to-be-mapped symbols to the first resource, comprises:

mapping the to-be-mapped symbols to the first resource further based on one or more of the following:

a mapping start point, a mapping sequence, a mapping pattern, or a pilot pattern.

12. The method according to claim 7, wherein the second resource comprises one or more sub-resources.

13. A non-transitory computer readable medium storing instructions, which when executed by a computer, cause the computer to perform operations, the operations comprising:

performing rate matching to determine a first bit sequence;

determining a first symbol sequence based on the first bit sequence;

determining to-be-mapped symbols in the first symbol sequence; and mapping the to-be-mapped symbols to a first resource, and sending the to-be-mapped symbols to a receiving node, wherein the computer, operating as a part of a first node, communicates with the receiving node using a first subset of the first resource based on the mapping, wherein the receiving node communicates with a second node using a second subset of the first resource based on mapping determined by the second node, and wherein the first subset of the first resource and the second subset of the first resource are partially overlapping, wherein mapping the to-be-mapped symbols to the first resource, and sending the to-be-mapped symbols, comprises:

performing indexing for a second resource, mapping the to-be-mapped symbols to the first resource, and sending the to-be-mapped symbols.

14. The non-transitory computer readable medium according to claim 13, wherein the first resource is a proper subset of the second resource.

15. The non-transitory computer readable medium according to claim 13, wherein performing the rate matching to determine the first bit sequence, comprises:

performing the rate matching based on the second resource to determine the first bit sequence.

16. The non-transitory computer readable medium according to claim 15, wherein performing the rate matching based on the second resource to determine the first bit sequence, comprises: performing the rate matching further based on a redundancy version (RV) and a size of the second resource to determine the first bit sequence.

17. The non-transitory computer readable medium according to claim 13, wherein mapping the to-be-mapped symbols to the first resource, comprises: mapping the to-be-mapped symbols to the first resource further based on one or more of the following:

a mapping start point, a mapping sequence, a mapping pattern, or a pilot pattern.

\* \* \* \* \*